United States Patent [19]
Levine et al.

[11] Patent Number: 6,167,439
[45] Date of Patent: Dec. 26, 2000

[54] DATA RETRIEVAL, MANIPULATION AND TRANSMISSION WITH FACSIMILE IMAGES

[75] Inventors: Stephen R. Levine, North Andover, Mass.; Alex J. Harui, Derry, N.H.; Michael W. Schirpke, Tewksbury, Mass.; Stephen P. Boylan, Somerville, Mass.; Karen Donoghue, Melrose, Mass.; Mary Jane Boyd, Chelmsford, Mass.; Donna Ajgaonkar, Carlisle, Mass.; Charles Paress, Nashua; David J. Angel, Hudson, both of N.H.; Chia-Chuan Hsiao, Lincoln, Mass.; Kenneth C. Knowlton, Merrimack, N.H.; Bruce Eric Brown, El Granada, Calif.

[73] Assignee: Kodak Limited, Herts, United Kingdom

[21] Appl. No.: 08/150,744

[22] Filed: Nov. 12, 1993

Related U.S. Application Data

[63] Continuation of application No. 07/920,813, Jul. 24, 1992, abandoned, which is a continuation of application No. 07/427,692, Oct. 27, 1989, abandoned, which is a continuation of application No. 07/396,739, Aug. 18, 1989, abandoned, which is a continuation of application No. 07/200,019, May 27, 1988, abandoned, and a continuation of application No. 07/245,419, Sep. 16, 1988, abandoned, which is a continuation-in-part of application No. 07/200,091, May 27, 1988, abandoned.

[51] Int. Cl.$^7$ .................................................. G06F 15/16
[52] U.S. Cl. ...................... 709/217; 379/100.01; 358/408
[58] Field of Search ............................ 395/800; 379/100, 379/100.01; 358/442, 468; 709/217

[56] References Cited

U.S. PATENT DOCUMENTS

| | | |
|---|---|---|
| 3,558,811 | 1/1971 | Montevecchioo et al. ............. 358/410 |
| 4,424,575 | 1/1984 | Clarke et al. . |
| 4,475,239 | 10/1984 | Raamsdonk . |
| 4,514,818 | 4/1985 | Walker . |
| 4,589,111 | 5/1986 | Adachi . |
| 4,633,416 | 12/1986 | Walker . |
| 4,649,380 | 3/1987 | Penna . |
| 4,652,933 | 3/1987 | Koshiishi ............................... 358/426 |
| 4,677,428 | 6/1987 | Bartholow . |
| 4,688,031 | 8/1987 | Haggerty . |
| 4,714,918 | 12/1987 | Barker et al. . |
| 4,734,619 | 3/1988 | Havel . |
| 4,755,809 | 7/1988 | Ikegami et al. . |
| 4,885,576 | 12/1989 | Pennebaker et al. .................... 345/147 |
| 4,937,036 | 6/1990 | Beard ...................................... 340/706 |
| 4,991,200 | 2/1991 | Lin ......................................... 379/100 |
| 5,022,072 | 6/1991 | Sakakibara et al. .................... 379/100 |

FOREIGN PATENT DOCUMENTS

| | | |
|---|---|---|
| 0096178 | 12/1983 | European Pat. Off. . |
| 159400 | 10/1985 | European Pat. Off. . |
| 0251237 | 1/1988 | European Pat. Off. . |
| 0262603 | 4/1988 | European Pat. Off. . |
| 60-218128 | 10/1985 | Japan . |

OTHER PUBLICATIONS

"Macintosh MacPaint," copyright 1983, by Apple Computer, Inc., Cupertino, CA, pp. 1–32.

"Method for Creating Annotation Data," IBM Technical Disclosure Bulletin, vol. 28, No. 4, Sep. 1985, pp. 1623–1628.

"The Complete Book of Macintosh Assembly Language Programming," Weston, D., published 1987 by Scott, Foresman and Co., IL, pp. 27–147.

(List continued on next page.)

*Primary Examiner*—John A. Follansbee
*Attorney, Agent, or Firm*—Kenneth L. Milik; Allegretti & Witcoff, Ltd.

[57] ABSTRACT

A data processing system is coupled to a facsimile device which receives and transmits facsimile images between the data processing system and a telephone line. The data processing system includes the capability to receive a facsimile image, interpret certain images as specified commands for the data processor, and to retrieve, manipulate and transmit data in response to the specified commands.

16 Claims, 29 Drawing Sheets

OTHER PUBLICATIONS

"The Small talk Environment" by Tesler, L., Byte Magazine, Aug. 1981, pp. 90–144.

"The Lisa Computer System: Apple Designs a New Kind of Machine," by Williams, G., Byte Magazine, Feb. 1983, pp. 33–50.

"The Apple Macintosh Computer: Mouse–window–desktop Technology Arrives for Under $2500," by Williams, G., Byte Magazine, Feb. 1984, pp. 30–54.

"Method of Multiple Selection of Icons On a Computer Display By Using a Pointing Device," IBM Technical Disclosure Bulletin, vol. 31 No. 1, Jun. 1988, pp. 19–20.

"Macintosh," published 1983 by Apple Computer, Inc., Cupertino, CA pp. 13–109 & 147–154.

"System for Integrating and Collating Audio and Text, and For Text Creation and Editing," by P.D. Welch, IBM Technical Disclosure Bulletin, vol. 16, No. 2, Jul. 1973, pp. 500–503.

"A Pair of Digitizing Tablets," Macworld, published Mar. 1987 by PCW Communications, Inc., San Francisco, CA, pp. 143–144.

Goodman, Danny, *The Complete HyperCard Handbook* (Bantam Books 1987), pp. 32–34.

Microsoft Corporation, *Show Partner User's Guide* (1986), Chaps. 3, 4, pp. 27–48.

W. Horak, Experimental Text and Facsimile Integrated Workstation, 1982 International Zurich Seminar on Digital Communications, Mar. 9, 1982, pp. 93–100.

Macintosh, Apple Computer, Inc. Copyright 1983.

Calender/Reminder  Stephen R. Levin        Thursday 05/26/88  11:52 am
Position cursor and press RETURN
Thursday, May 26, 1988                              scheduled by

| | | | | |
|---|---|---|---|---|
|08:00 am| — |08:30 am|Jeff|Stephen|
|08:45 am| — |09:00 am|To H.T. for Amy w/ Karen B.|Stephen| GO TO DESK |
|09:00 am| — |10:00 am|Mtg. @ Pat H. office|Stephen| BLANK PAPER |
|10:00 am| — |12:00 pm|Mary Lou here|Stephen| RULED PAPER |
|10:30 am| — |12:00 pm|MEGASCAN at Burlington Marrit|Mary An| ERASE NOTES |
|12:00 pm| — |01:00 pm|Rick Shriner|Stephen| SHRINK MENU |
|01:30 pm| — |02:00 pm|Block time with Ellen Francik|Stephen| SHOW RULER |
|02:00 pm| — |03:00 pm|Block time with Alex and Mike|Mary An| PLAY BACK |
|03:00 pm| — |04:00 pm|(Sammie) *Please Cancel This*|Mary An| ALL DONE | 78
|03:30 pm| — |04:00 pm|Alex + inventions *Meeting*|Stephen R. Levine|
|04:00 pm| — |05:00 pm|Sr. Staff Mtg. here|Stephen R. Levine|
| | | | |Mary Ann Karabatsos|

300

163                                                      (–End–)

This is sample key board annotation of an OFFICE screen (1) Change Day   (5) Next Day↑        (9) Week      (13) Instructions
(2) First Item   (6) Add Event/↑Reminder (10) Month  (14) Reminders
                 (7) Invitations      (11) Year     (15) Print
(4) Prev. Day    (8) Delete Item(s)   (12) Change Name (16) Exit

FIG. 2a

```
Calender/Reminder   Stephen R. Levin      Thursday 05/26/88   11:52 am
Position cursor and press RETURN
        Thursday, May 26, 1988                      scheduled by 08:00 am  —  08:30 am  Jeff                              Stephen R. Levine
08:45 am  —  09:00 am  To H.T. for Amy w/ Karen B.       Stephen R. Levine
09:00 am  —  10:00 am  Mtg. @ Pat H. office              Stephen R. Levine
10:00 am  —  12:00 pm  Mary Lou here                     Mary Ann Karabatsos
10:30 am  —  12:00 pm  MEGASCAN at Burlington Marrit     Stephen R. Levine
12:00 pm  —  01:00 pm  Rick Shriner                      Stephen R. Levine
01:30 pm  —  02:00 pm  Block time with Ellen Francik     Mary Ann Karabatsos
02:00 pm  —  03:00 pm  Block time with Alex and Mike     Mary Ann Karabatsos
03:00 pm  —  04:00 pm  Sammie                            Stephen R. Levine
03:30 pm  —  04:00 pm  Alex + inventions                 Stephen R. Levine
04:00 pm  —  05:00 pm  Sr. Staff Mtg. here               Mary Ann Karabatsos (–End–)

(1) Change Day   (5) Next Day           (9) Week        (13) Instructions
(2) First Item   (6) Add Event/↑Reminder (10) Month     (14) Reminders
                 (7) Invitations        (11) Year       (15) Print
(4) Prev. Day    (8) Delete Item(s)     (12) Change Name (16) Exit
```

Calender/Reminder  Stephen R. Levin          Thursday 05/26/88   11:52 am
Position cursor and press RETURN
         Thursday, May 26, 1988                    scheduled by 08:00 am — 08:30 am  Jeff                                  Stephen R. Levine
08:45 am — 09:00 am  To H.T. for Amy w/ Karen B.           Stephen R. Levine
09:00 am — 10:00 am  Mtg. @ Pat H. office                  Stephen R. Levine
10:00 am — 10:30 am  Mary Lou here                         Mary Ann Karabatsos
10:30 am — 12:00 pm  MEGASCAN at Burlington Marrit         Stephen R. Levine
12:00 pm — 01:00 pm  Rick Shriner                          Stephen R. Levine
01:00 pm — 02:00 pm  Block time with Ellen Francik         Mary Ann Karabatsos
02:00 pm — 03:00 pm  Block time with Alex and Mike         Mary Ann Karabatsos
03:00 pm — 04:00 pm  Sammie                                Stephen R. Levine
03:30 pm — 04:00 pm  Alex + inventions                     Stephen R. Levine
04:00 pm — 05:00 pm  Sr. Staff Mtg. here                   Mary Ann Karabatsos ·Type erasure  uses white characters This is sample key board annotation of an OFFICE screen          (—End—)

(1) Change Day  (5) Next Day          (9) Week          (13) Instructions
(2) First Item  (6) Add Event/↑Reminder (10) Month      (14) Reminders
                (7) Invitations       (11) Year         (15) Print
(4) Prev. Day   (8) Delete Item(s)    (12) Change Name  (16) Exit

FIG. 2c

Calender/Reminder  Stephen R. Levin    Thursday 05/26/88  11:52 am
Position cursor and press RETURN
    Thursday, May 26, 1988                    scheduled by 08:00 am — 08:30 am  Jeff
08:45 am — 09:00 am  To H.T. for Amy w/ Karen B.              Stephen R. Levine
09:00 am — 10:00 am  Mtg. @ Pat H. office                     Stephen R. Levine
10:00 am — 12:00 pm  Mary Lou here                            Stephen R. Levine
10:30 am — 12:00 pm  MEGASCAN at Burlington Marrit            Mary Ann Karabatsos
12:00 pm — 01:00 pm  Rick Shriner                             Stephen R. Levine
01:30 pm — 02:00 pm  Block time with Ellen Francik            Stephen R. Levine
02:00 pm — 03:00 pm  Block time with Alex and Mike            Mary Ann Karabatsos
03:00 pm — 04:00 pm  (Sammie)  *Please Cancel This Meeting*   Mary Ann Karabatsos
03:30 pm — 04:00 pm  Alex + inventions                        Stephen R. Levine
04:00 pm — 05:00 pm  Sr. Staff Mtg. here                      Stephen R. Levine
                                                              Mary Ann Karabatsos
Type erasure [uses] white characters 280
            163

This is sample key board annotation of an OFFICE screen   (—End—)

(1) Change Day   (5) Next Day            (9)  Week         (13) Instructions
(2) First Item   (6) Add Event/↑Reminder (10) Month        (14) Reminders
                 (7) Invitations         (11) Year         (15) Print
(4) Prev. Day    (8) Delete Item(s)      (12) Change Name  (16) Exit

FIG. 2d

Calender/Reminder   Stephen R. Levin   Thursday 05/26/88   11:52 am
Position cursor and press RETURN
Thursday, May 26, 1988                              scheduled by 08:00 am  —  08:30 am  Jeff                                         Stephen R. Levine
08:45 am  —  09:00 am  To H.T. for Amy w/ Karen B.                  Stephen R. Levine
09:00 am  —  10:00 am  Mtg. @ Pat H. office                         Stephen R. Levine
10:00 am  —  12:00 pm  Mary Lou here                                Mary Ann Karabatsos
10:30 am  —  12:00 pm  MEGASCAN at Burlington Marrit                Stephen R. Levine
12:00 pm  —  01:00 pm  Rick Shriner                                 Stephen R. Levine
01:30 pm  —  02:00 pm  Block time with Ellen Francik                Mary Ann Karabatsos
02:00 pm  —  03:00 pm  Block time with Alex and Mike                Mary Ann Karabatsos
03:00 pm  —  04:00 pm  *(Sammie)* *Please Cancel This Meeting*      Stephen R. Levine
03:30 pm  —  04:00 pm  Alex + inventions                            Stephen R. Levine
04:00 pm  —  05:00 pm  Sr. Staff Mtg. here                          Mary Ann Karabatsos

100

This is sample key board annotation of an OFFICE screen     (—End—)

(1) Change Day   (5) Next Day          (9)  Week         (13) Instructions
(2) First Item   (6) Add Event/↑Reminder (10) Month       (14) Reminders
                 (7) Invitations       (11) Year         (15) Print
(4) Prev. Day    (8) Delete Item(s)    (12) Change Name  (16) Exit

61

FIG. 2e

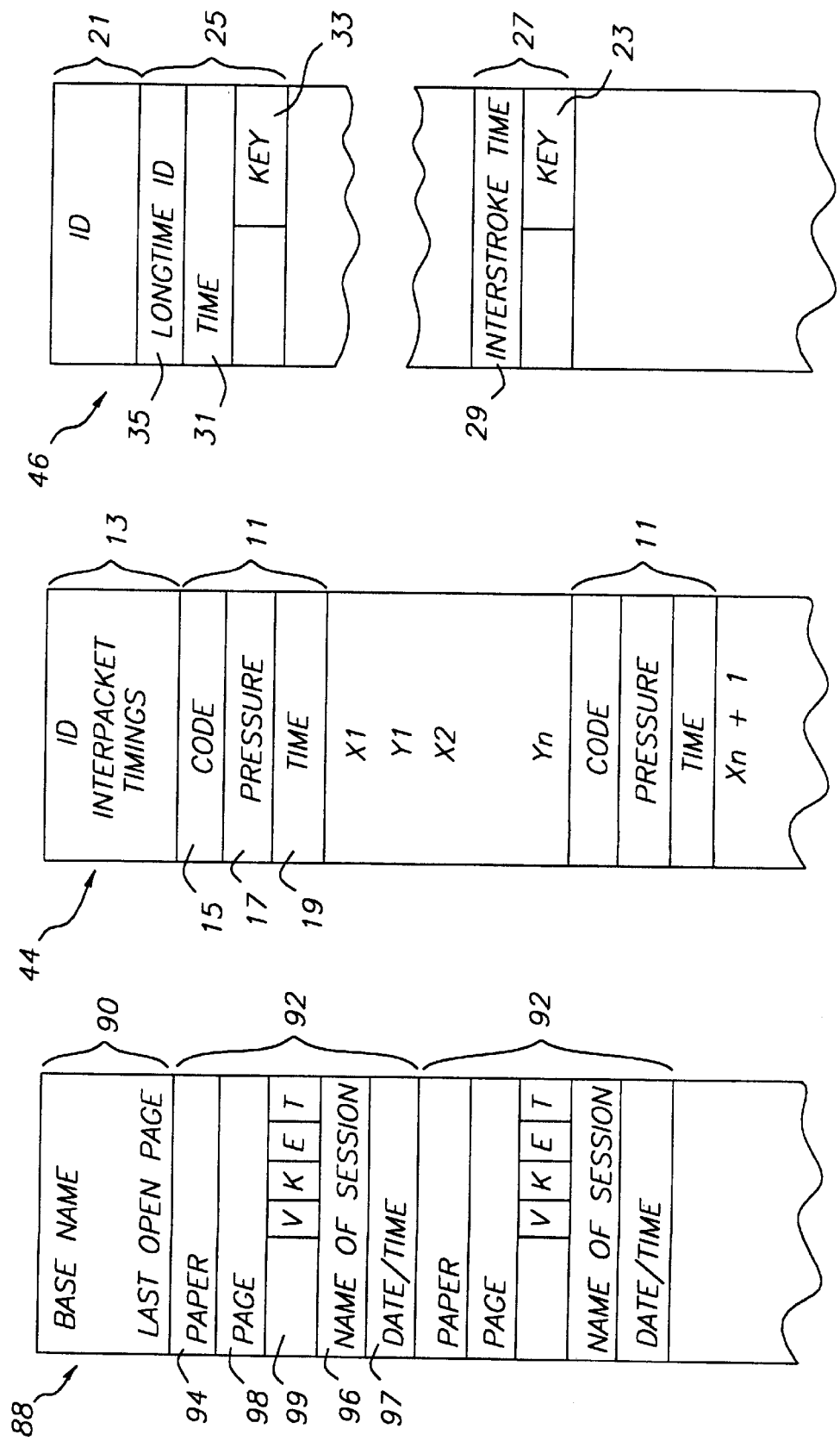

REMOTE FAX # : 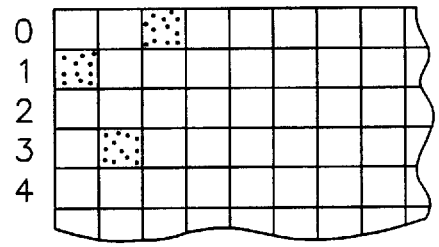
RECEIVING FAX # : 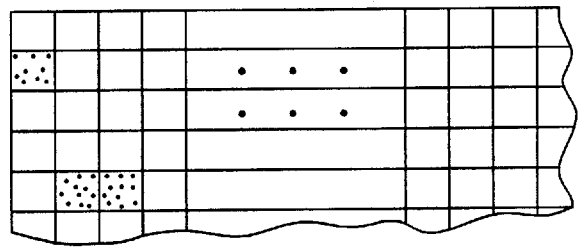
INSTRUCTIONS REQUESTED : 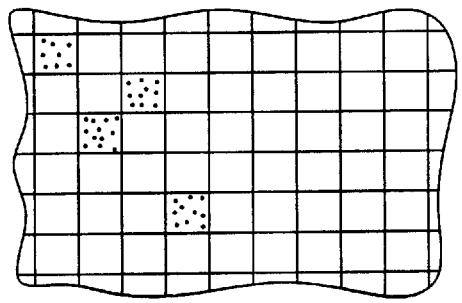
*FIG. 14*

DATA RETRIEVAL, MANIPULATION AND TRANSMISSION WITH FACSIMILE IMAGES

RELATED APPLICATIONS

This is a continuation of application(s) Ser. No. 07/920,813 filed on Jul. 24, 1992, now abandoned which is a continuation of Ser. No. 07/427,692 filed Oct. 27, 1989, now abandoned, which is a combined continuation of Ser. No. 07/396,739 filed Aug. 18, 1989, now abandoned which is a continuation of Ser. No. 07/200,091 filed May 27, 1988 now abandoned and Ser. No. 07/245,419 filed Sep. 16, 1988 now abandoned, which is a continuation-in-part of Ser. No. 07/200,091 filed on May 27, 1988, now abandoned.

BACKGROUND OF THE INVENTION

In many of today's businesses, various tasks are now automated by computers. For instance, a word processor enables the reorganizing and rewriting of documents without the retyping known in the past. In addition, various documents may be organized and stored by a computer filing system which allows retrieval by name, by chronological or alphabetical order, or by other user-desired identification. Another example is a mail system on a network of computer terminals which allows messages to be sent to and from users of the network. Also, a phone system may be connected to a mail system which in turn enables phone messages to be stored and later forwarded to users. These and other computer devices enable various daily office tasks to be accomplished more quickly and more efficiently.

However, most computer devices require the user to be computer literate and to learn commands to direct the computer to perform the desired tasks. In more recent computer developments, user interaction with the computer, or as generally referenced in the art, the user interface, comprises menus or a series of commands from which to choose. For each decision juncture during the use of a computer device, an appropriate menu is displayed to the user to prompt the user on the available, proper commands at the juncture. The user only needs to choose the command from the menu which will direct (in part or in full) the computer to perform the desired task. Due to the menu providing the proper possible commands, the user does not have to remember or recall commands to the computer. Hence, the menus are considered to make computer devices more "user friendly".

Although, the choices on a menu generally are descriptive phrases written in terms which are more common to our everyday language rather than in a coded or technical computer language, the descriptive phrases may not initially have meaning, or at least the proper meaning, to a first-time user or a user who is not computer literate. The user does have to learn the respective meaning of each menu choice.

Other systems display icons represent tasks, programs or documents to which a user can point with a mouse and then click the mouse (push a button) to make a selection. In some systems the icons can be moved or dragged from one position to another on the screen.

Although these attempts to make computers more user friendly have helped, many office personnel still do not make use of computer devices because of the time and complexity in learning to operate these devices.

Accordingly, there is a need to make computer devices, and particularly those for office use, more "user friendly" and readily usable especially to first-time and computer illiterate users.

SUMMARY OF THE INVENTION

The present invention discloses a computer system which provides a graphically based user interface which simulates an office desk and a user's interaction with the items on the desk, including annotating pieces of paper on the desk. In general, the disclosed computer system is implemented in a personal computer which may be a stand-alone computer or coupled to a network. Each computer includes a monitor screen which displays various views to the user, a keyboard which enables typed input to the system and, although not absolutely essential for all applications, a graphical input device such as a mouse or stylus is desirable. In the illustrated embodiment, an electronic tablet and stylus which enables further user interaction with the digital processing system but in a natural format is provided. For each computer, an audio input/output assembly may also be connected to the terminal to provide audio input to the digital processing system. Also, each computer may have connected thereto, a printer, a scanner and/or a facsimile transmitter and receiver.

In the illustrated embodiment, the user interacts with the processing system through an electronic tablet and stylus in four methods of use. The electronic tablet serves as a writing surface on which the stylus is used and spatially corresponds in a one-to-one fashion with the view exhibited on the monitor screen. Other surfaces may alternatively serve as the writing surface when using other input devices such as a mouse, e.g., a pad for the mouse.

The first method of use of the stylus, referred to as "touch and lift", enables the selection of a displayed item. One end of the stylus is touched on and removed from the position on the tablet corresponding to the position of a desired item displayed on the monitor screen as indicated by a cursor. The "touch and lift" use of the stylus mimics the familiar press and release motion one employs when making a selection from a machine with depressible buttons. To perform this operation from the keyboard, a designated key may be pressed and released.

In a second method of use, one end of the stylus is moved across the surface of the tablet, while in contact therewith, to move a displayed item to a different position in the screen view as indicated by a cursor. Such a method of use, to obtain the described effect, is intuitive to even the most unfamiliar user and is referred to as the "touch and move" method of use. Such is accomplished via the keyboard by a key actuation.

In a third method of use, the user writes with a writing tip end of the stylus in the same manner as he would write with a pencil or pen. Such writing provides annotations to a displayed document or creates a new document. The fourth method of use involves an eraser end of the stylus and provides for the erasure of annotations generated by the writing tip end. The eraser end is used in the same manner as a pencil top eraser. Thus, the third and fourth methods of use of the stylus provide the most commonly expected results. To do these last two functions, a stylus, mouse or the like is needed, i.e., a keyboard is of limited use, although typing and deleting from a document using the keyboard to annotate is possible.

Because the foregoing uses of the stylus consist of known movements and strokes with which any person is familiar and comfortable, and which produce naturally expected results, interaction with the processing system through the stylus and tablet is easily and naturally accomplished. Thus, this implementation is the one illustrated.

There are two major views which are viewed on the monitor screen by the user during use of the stylus, a desk view and an annotation session view. Of course, the keyboard and monitor screen may be used to run various other programs and provide numerous other functions, and hence, other views may be viewed on the monitor screen.

When in the desk view mode, the system of the present invention provides a screen view of a computer work area called the user's system desk, distinguished from the user's office desk. Displayed on the monitor screen is a representation of all the documents and accessories which are currently at the user's disposal.

The desk view emulates a user's desk and pieces of paper which are stacked on and moved about his desk. In the illustrated embodiment, the desk view shows a stamp which is a reduced or miniaturized image of an actual page of each document presently on the user's system desk or computer work area. Each stamp serves as a unique direct pictorial representation of a certain document on the user's system desk as opposed to an indirect indication, such as a prefabricated standard icon which is used for all documents of a certain type and which identifies a specific document only by a name or title associated with the icon. The stamps can be stacked and rearranged on the system desk by the user manipulating stamps one at a time with the "touch and move" method of use of the stylus described above.

The annotation session view, the second major view associated with use of the stylus, provides a full-screen-sized view of the document to be annotated or created by the stylus, by the keyboard and by voice data input through the audio input/output assembly. The document to be annotated may be chosen in three different manners. In one way, the document may be chosen from a program being currently run by the operating system. The user simply places one end of the stylus within a predetermined proximity of the surface of the tablet. When such proximity is sensed, the currently running program is temporarily stopped, preferably by a microprocessor interrupt, and the view from that program being displayed at that time becomes the document to be annotated. In preparation for annotation, if the screen is currently in a text mode, as opposed to a bitmap mode, the data processing system changes the screen to a bitmap or graphics mode. Text is converted to graphics by a character generation scheme. Also, the dark background with light print of the text mode is reversed to a light background with dark print to more effectively simulate print on paper. Once prepared for annotation, the document may be annotated with visual annotations input through the stylus and/or keyboard and/or with audio annotations input through the audio input/output assembly. At the end of the annotation session, (i.e., the period during which all such annotations are made to one document before changing to another document, or before returning to the desk view or the first-running program), the running of the first program may be resumed from the point where it was stopped. Alternatively, the user may view the desk view immediately after annotating/creating the document. In either case, a stamp of the annotated document is placed on the user's system desk. Preferably, the stamp is placed in an "In box" on the system desk.

Preferably, the entire annotation and desk task is performed in the microprocessor interrupt. The software executed by the operating system for providing the functions of the desk view and annotation sessions (i.e. the annotation-desk task program) may be loaded into local memory by a swapping scheme. Before the annotation-desk task program is loaded into local memory in place of a primary task (i.e., the first-running program), the primary task is saved in a remote memory and the state of the primary task is saved such that upon completion of the annotation-desk task the running of the primary task may be resumed.

A document to be annotated may also be chosen from the user's system desk (i.e., the desk view). When viewing the desk view, the user touches and lifts one end of the stylus on the position on the tablet which corresponds to the position on the user's system desk of the stamp of the desired document. After the "touching and lifting", a full-screen display of the desired document is exhibited on the monitor screen and is ready for annotation by typed data input through the keyboard, handwritten/erased data input through the stylus, and voiced data input through the audio input/output assembly. After the annotation session of this document, the corresponding stamp on the system desk is updated to include the recently made visual annotations (i.e. handwritten, erased and typed).

Thirdly, a document may be created and annotated by the user selecting a "note pad" option displayed in the desk view. To select the "note pad" option, the user touches and lifts one end of the stylus on the position on the tablet corresponding to the area labeled "note pad" in the desk view. The user is thereupon provided with a blank screen, or other screen of a predefined format, which represents a clean page on which annotations are to be made to form a new document. Annotations may be made as with any other document through the stylus, keyboard and audio input/output assembly. At the end of the annotation session, a stamp of the created document is generated and placed on the user's system desk and preferably is placed in the "In box" on the system desk.

In the illustrated embodiment, a cursor corresponding to the keyboard is provided in the view of the document being annotated. The keyboard or typing cursor may be an upright rectangular box or other indicator of the position where typed input would be currently placed if the user operated the keyboard. The user is able to move and reposition the typing cursor with the "touch and move" method of operation of the stylus. The user simply places one end of the stylus on the tablet position which corresponds to the position of the typing cursor in the displayed view of the document being annotated and moves the stylus end across the surface of the tablet to the desired position. In turn, the typing cursor is correspondingly moved across and repositioned in the view displayed on the screen. The moveable typing cursor also does not restrict typing to particular lines and spaces within the lines as existing word processing/typing devices do with global grids of character spaces covering the whole document. This ability to freely move the typing cursor independent of a global grid structure enables the user to quickly complete specific portions of a document especially when the document is a standard company form.

In the illustrated embodiment, the typing cursor at each initial cursor position beginning a sequence of typed annotations, establishes a local grid of character spaces for holding the sequence of characters independent of any global grid. Also, each local grid is independent from other local grids. Overlap of local grids is prevented by close positioning of the typing cursor relative to an existing local grid causing the typing cursor to be automatically positioned within the existing grid. In addition, the local grids are established by a linked two-dimensional list of y and x nodes which establish the initial cursor position of each local grid, the y nodes corresponding to lines of the document and the x nodes corresponding to character spaces or location of a set of characters within a line. To identify the characters in each local grid, each x-node of the x-y node list points to a sequence of characters in a grid buffer which stores all characters typed into the document through the keyboard.

For proper eye hand coordination, it is important that there be little delay in displaying stylus strokes and keyboard generated annotations. To that end, an annotation input through the stylus and keyboard be handled as an interrupt to the microprocessor running the annotation task program. Thus, where the document to be annotated was chosen from a running program, there are layers of interrupts. The first interrupt is to the first running program to enable execution of the annotation task program. The second and succeeding interrupts are to the annotation task program, to process data input through the stylus and/or keyboard. During the first interrupt but outside of the second level interrupts of the annotation task program, data input during the annotation session may be written to secondary storage. By writing to secondary storage outside of these second level interrupts, the processing of annotations is not retarded by the waiting time associated with writing to secondary storage. Instead, these interrupts have priority over the task of writing to secondary storage.

Also during each annotation session, a pop-up menu is displayed and provides a limited number of optional actions that the user may select. The illustrated options include "go to desk", "all done", "blank paper", "ruled paper", "erase notes", and "playback" among other options. The first two options end the annotation session and return the user to the system desk or first running program respectively. Each of the next two options provide the type of a new piece of paper on which the user desires to make annotations and begins a new annotation session for that new piece of paper. In addition, selection of either "blank paper" or "ruled paper" during an annotation session of a first document causes the first document along with all annotations made to it during that session to be saved, and the corresponding stamp of the first document to be updated accordingly and placed in the "In Box" on the system desk. The "erase notes" option causes all annotations (visual and audio) made to a currently displayed document during an annotation session to be deleted such that the document is displayed in its initial form from the start of the annotation session. The "playback" option displays the initial form of the current document at its origination followed by a time sequence of the annotations made to the document up through and including the present annotation session.

The user indicates his choice of an option from the pop-up menu by touching and lifting either end of the stylus on the position on the tablet which corresponds to the position of the desired option in the view exhibited during the annotation session. The user may also move the pop-up menu to any position on the screen using either end of the stylus in the touch and move method of use. Once moved to a new position, the pop-up menu remains in that position until moved again either in the current annotation session or any succeeding annotation session. In addition, other options concerning the size of the menu or indications of margins of the document may be included in the pop-up menu as is known in the art.

During an annotation session, the eraser end of the stylus enables the user to erase penned or handwritten annotations (i.e. annotations generated by the writing tip end of the stylus) made during that session. Penned annotations input during previous annotation sessions and all typed annotations are unaffected by the stylus eraser. The area on the document which has presently been erased by the stylus eraser is restored to its initial form from the beginning of the annotation session plus any typed annotations from the current annotation session. In particular, if the document is a new blank or ruled page, then erasure of an annotation produces an unmarked blank or ruled spot, respectively plus any typed annotations made to the document in that spot.

In the illustrated embodiment, an off-screen bitmap copy of the document from the beginning of the annotation session is saved. An on-screen bitmap is used during the annotation session to display the document and annotations currently made to it. When the user applies the stylus eraser, an eraser path is formed on the document. The parts of the penned annotations made during the current annotation session which are intersected by the eraser path determine an erased area. The portion of the on-screen bitmap which corresponds to the erased area is replaced by the corresponding area of the off-screen bitmap, and characters resulting from typed annotations previously made to the erased area during the current annotation session are accordingly redrawn in the on-screen bitmap. The erased area of the document is then displayed to the user as it initially was at the beginning of the annotation session with the addition of currently typed annotations and produces the effect of having erased selected parts of the current annotation sessions penned annotations.

In sum, meeting the user's intuitive expectation, typed annotations and/or complete strokes of the penned annotations are not erased but rather only those parts of penned annotations over which the eraser has passed are erased in a manner similar to a common eraser erasing pencil markings. In the same light, the width of the eraser's effective path is preferably wider with the user applying the eraser end to the tablet with greater pressure.

All annotations of a document during an annotation session are sequentially recorded in the relative time sequence in which they were made and with information concerning individual paces at which they are made. This allows subsequent replay of the annotations in the order and/or at the relative paces in which they were made, a particularly powerful tool in replay where voice/audio annotations are synchronized with and accompanied by penned and/or keyboard annotations as they were originally performed.

In the illustrated embodiment, all strokes (i.e. "tablet felt" movement of the part of the stylus in contact with the tablet) and gestures (i.e. movement of the stylus in the air, that is, when the stylus is not in contact with the tablet) of the writing tip and eraser end of the stylus are automatically recorded in a "tablet" file of the computer (i.e. digital processor). All keyboard strokes are recorded in a "keyboard" file, and all voiced/audio data is recorded in a "voice" file. Each of these files contains the respective type of data input during the annotation session and time marks or other indications of relative time of occurrence of the input of that data. For example, the tablet file may contain a series of digitized x-y coordinates of one of the ends of the stylus. Each series is separated by a delimiter which provides an indication of whether that end is beginning or ending a stroke or gesture and the time at which action of this end of the stylus occurred. The tablet file may also contain for each point of a stylus stroke on the tablet digitized values of height of a stylus end above the tablet, pressure of that end on the tablet, and/or an indication of which end (writing tip or eraser) is on or near the tablet.

The keyboard file may contain each key stroke and an interstroke time where typing comes fast enough that keystrokes are separated by less than about half-minute intervals. Where the interstroke time is longer than 32,767 milliseconds, the time of occurrence is recorded along with the series of key strokes inputted through the keyboard.

The voice file simply records the voiced data in a digitized form and has an indication of the time at which that data was input relative to the time that other data was input through the stylus and keyboard. A silence compression scheme may also be employed with the recording of voiced data in the voice file to save memory space. In that case, during replay a noise generation scheme may be used to replace the moments of silence which were compressed. Preferably the noise generation scheme replaces the moments of silence with noise at a volume which is determined by the original noise level of the respective moments of silence.

Further, all tablet, keyboard and voice files per annotation session are catalogued in a table of contents file referred to as a superfile. The superfile serves as the table of contents of all annotation sessions and files from each annotation session associated with a particular document. The superfile also references the stamp file of the document and other files of the document as needed.

The superfile and the files containing annotations to the document referenced by the super file are used to provide a time sequenced playback of the annotation sessions of a document as already mentioned. When a user selects for viewing a document from the desk view, the user touches and lifts one end of the stylus on the position on the tablet which corresponds to the position of the stamp of the desired document on the system desk. In turn, the document may be displayed from its original form, from the creation of the document, and in each form thereafter as changed by each annotation session of the document and at the pace that each annotation was made to the document. Hence, the playback is time sequenced with respect to the timing in which the annotations were actually made during respective annotation sessions. Thus, the user views a real time playback of all data input to the document, including voiced data. This enables the viewer to not only follow the creation of the annotations (erasures as well as insertions) but also to view visual indications made to the document while listening to voiced information which may correspond to the visual indications. Such a combination of visual and audio information provides the effect of the annotating person actually being in the presence of the viewer during playback delivering written and audio information relative to the document.

With respect to the technical or working elements of the invention, the processing of annotations is handled by a dispatcher for the tablet, a dispatcher for the keyboard and two groups of procedures respectively employed by the dispatchers. Each dispatcher receives input data and passes the data to a procedure which is referenced by a changeable output designator of the dispatcher. The procedure which receives the input data processes the input data and changes the output designator of the dispatcher to reference a procedure to process subsequent input data according to the present state of the annotation session.

The foregoing arrangement provides a state machine for not only processing annotation input data but also for displaying a replay of or for printing the annotated document. In the illustrated embodiment the tablet dispatcher may receive the input data directly from the tablet and stylus or from a tablet file. Similarly, the keyboard dispatcher may receive input data directly from the keyboard or from a keyboard file. Corresponding with the input to the state machine (i.e., dispatchers and groups of procedures) the output of the state machine may be received by a screen manager for displaying the processed data on the screen display for initial viewing or replay, or by a print manager which causes the processed visual data to be printed on a printer. To that end, printing of the displayed document with typed annotations is accomplished by providing to a printer buffer a sequence of all typed characters and typed erasures (overstrikes), resulting from the typed annotations, with respective positions relative to the document, in the same sequential order in which they were input through the keyboard and not by order of position of the characters in the document.

There are also novel technical features of the stylus and tablet. The stylus is two-ended; that is, the stylus has a writing tip end and an eraser end. Although not required technically, and arguably a cause of unnecessary stylus movement for erasure, the two-ended pencil-like configuration makes the stylus immediately familiar to and thus acceptable by any user. Alternatively, the two ends provide different functions such as writing in different colors or producing other effects.

Preferably, a tablet processor electronically drives the two ends of the stylus alternately until one is sensed to be within proximity of the tablet. The status of the stylus is then characterized from detected pressure of one end of the stylus and distance of that end away from the tablet surface along a z-axis which is perpendicular to the tablet surface. That is, the position in 3-D space and motion of the stylus during use with the tablet (e.g. beginning of a stroke, end of a stroke, "touch and lift" motion, ending portion of the "touch and move" motion, writing, erasing) is determined from the detected pressure and z-axis factors. In the illustrated embodiment, the pressure is detected by a pressure transducer in the stylus, and the distance away from the surface of the tablet along the z-axis is detected by a dedicated circuit or a sensing coil in the tablet. Another circuit in the tablet detects the position of one end of the stylus along x and y axes in or near the plane of the writing surface of the tablet.

When in the desk view, it is the natural format of use of the stylus together with the desk view and its operations that provides the user interface of the present invention which emulates the everyday interaction between a person and his office desk. As a result, the computer device of the present invention is a degree "friendlier" than the menu driven and other devices of today.

Documents are put on the user's system desk by converting them into superfiles which include a bitmapped image of the document. Documents can be input to the system desk by capturing them from a screen when another program is running, through electronic mail from the network or by scanning the document into the system.

In the illustrated embodiment, the desk view (i.e. the screen view of the user's system desk) shows a reduced image or "stamp" of document on the user's system desk or computer work area. Each stamp serves as a unique, direct representation, that is an actual image or pictorial likeness, of a page of a certain document on the user's system desk as opposed to an indirect symbolic indication, such as a prefabricated standard icon of prior art which is used for all documents of a certain type in many prior art systems and which identifies a specific document only by a name or title associated with the icon. As used herein the term "icon" does not mean image, i.e., further, the term "document" means various sheets of information whether a single page or multiple page document is involved, and a "sheet of information" includes a body of data which is not an icon and includes, for example, a page of a document or a screen full of data as may be generated by any normally running program.

In the illustrated embodiment, the stamps are formed by an image reduction scheme which reduces a full-screen image of a page of a document to a stamp size image. In the simplest instance of a black and white (or dark and light) image the reduction scheme determines the state of a pixel (black or dark versus white or light) in the stamp-size image from the relative counts of black pixels and white pixels in a corresponding group of pixels in the full-screen image and in neighboring groups of pixels in the full-screen image. In particular, a stamp pixel is determined to be white if the white count (i.e., the number of white pixels) of the corresponding group of original pixels is greater than the average white count of the adjacent groups of original pixels. The stamp-size image pixel is black if its corresponding group of original pixels has a greater black count (i.e., number of black pixels) than the average black count of the adjacent groups of original pixels. And, where the white or black count of the corresponding group of original pixels is the same as the average count of the adjacent groups of original pixels, then the state of the stamp size image pixel is black if the black count of the corresponding group of original pixels exceeds a preestablished threshold (for example, half the pixels in the corresponding group). Alternatively, the reduction scheme may require the black/white counts of the corresponding group of original pixels to differ by a predetermined amount from the average black/white counts of the adjacent groups.

In the case of RGB (red, green, blue) color images, the reduction scheme is more complicated because the coloring of each stamp pixel may be chosen from several colors as opposed to the black or white state in the case of black and white images. In the illustrated embodiment, coloring of a stamp pixel is the color of the corresponding group of original pixels where all the original pixels of that group are the same color. If the original pixels of the corresponding group are of different colors then it is determined whether those adjacent other groups of original pixels which have the same colored original pixels throughout a group have the same colored pixels as each other. If so, then coloring of the stamp pixel is determined by emphasizing the difference of the average color of the corresponding group of original pixels with respect to the color of the adjacent other groups which have the same colored original pixels throughout. Otherwise, coloring of the stamp pixel is determined from the average color of the original pixel in the corresponding group.

The stamps can be stacked or rearranged on the system desk by the user manipulating each stamp with the "touch and move" method of use of the input device, e.g., electronic stylus. The whole stamp moves in a manner which corresponds to the pattern in which the user moves (i.e. drags), one end of the stylus relative to the predefined writing surface or by operating cursor keys. The whole image of the stamp is displayed in motion on the monitor screen, from a beginning position through intermediate positions to an ending position, during the rearranging and stacking of the stamp on the system desk.

A particular arrangement of the stamps forms an aligned stack of stamps. When a group of stamps is in such an aligned stack, the whole stack may be moved by the user with the "touch and move" method of use of the cursor acting on apparent side regions of the stack. Alternatively, an aligned stack of stamps must be connected to each other by fastening means, such as a paper clip or staple, before the whole stack may be moved by the "touch and move" method of use of the cursor on any other part of top stamp. Rather, in an aligned stack of stamps, the stamps are removable from the stack in a top down fashion. When touched at other than the edge, only the top stamp of a stack is removed from the stack by the "touch and move" use of the cursor, and the succeeding stamp becomes the top stamp of the remaining stack and so on.

A "touch and lift" use of the cursor on a stamp provides selection of the stamp. For example, a "touch and lift" of the stylus or a touch and release of a keyboard key when the cursor is on a stamp at the top of a stack (aligned or unaligned) or all together unstacked provides a full screen view of the associated document. A "touch and lift" use of the cursor on a stamp within an unaligned stack of stamps causes the stamp to be brought to the top of the stack.

Also, in the illustrated embodiment, the user's system desk provides trays, folders and/or the like for holding stamps selected by the user. The trays are of two types, active and passive. Active trays may be accessed throughout the network of terminals which communicate with the local terminal of the user. Each active tray is labelled with a name which is recognizable throughout the network. The user, who is the owner of the active tray, authorizes other users access to the active tray. In such a case, an authorized user on another terminal of the network may access the contents of the active tray as well as add to the contents of the tray. A passive tray may be used only by the user of the local terminal.

In one embodiment stamps may be placed in a folder. Placement of the stamp in a folder enables user viewing of stamps contained therein while order of the stamps is maintained. Another tray labelled "In box" is provided on the user's system desk. This tray is used for delivering mail and new documents to the user, and is coupled to the electronic mail service. The In Box tray differs from active trays in that active trays are accessible by other users of the network only as authorized by the local user. The In Box tray is accessible to all on the network but only for the deposit of mail.

In addition to selecting which users have access to which active trays, the local user assigns particular types of rights and automatic processes to the active trays per selected user. These assignable rights enable the selected users to access respective active trays in various manners, and the assignable processes enable selected users to alphabetize, time order or to otherwise manipulate the contents of respective active trays. Examples of the assignable rights are "put rights" which enable a selected user to add items to the contents of a certain active tray. "Take rights" enable a selected user to retrieve items from a certain active tray. "Inquiry rights" enable a selected user to ask and obtain information about the contents of a certain active tray. "Rights to copy" enable a selected user to obtain a copy of all or part of the contents of the active tray.

The user's system desk also provides accessories which the user may choose to use in conjunction with the stamps of documents to obtain certain effects. For example, a trash barrel icon provides for disposal of a desired document through its corresponding stamp. Another example is a set of accessories which provide optional functions of the system. Illustrated optional functions or applications include "all done", "scanner", "note pad", "printer", "info", "copier" and "mail". The "all done" application enables a user to return to and resume running of a suspended program which was first running before the system desk view was displayed for current use. The "note pad" application invokes an annotator (i.e. an annotation session screen and functions thereof) and provides a blank new document to be created and annotated by the annotator. The "printer" application enables a user to have a document of a selected stamp printed on a printer. The "info" application enables a user to obtain the history and composition of a document corresponding to a selected stamp. The "copier" application enables a user to make a duplicate of a document as represented by a duplicate stamp. The "mail" application invokes the electronic mail system of the network and enables the user to transfer the document of a selected stamp from the user's system desk to a desired user.

Each of these accessories is preferably represented by a respective illustrative icon. The user selects an application by a touch and lift method of use of the cursor on the position corresponding to the respective icon in the case of the applications of "all done", "scanner" and "note pad". In the case of invoking the "printer", "mail" (i.e. the electronic mail system) or "copier", the user moves the stamp of the desired document using the touch and move method of use of the cursor and places the stamp on the respective icon. Likewise, to dispose of a document, the corresponding stamp is placed on an icon of a trash barrel by the "touch and move" operation of the cursor.

The "info" application is invoked by the user moving and positioning the respective icon of the application on a stamp of the document about which information is desired.

Another set of accessories provided by the system desk view includes desk tools for operating on stamps and underlying documents. Examples are a stapler and staple remover. Icons represent such accessories and are moved by the stylus to desired stamps. Upon positioning and leaving the accessory icon (stapler, staple remover) on a stack of stamps, the documents of the stamps become stapled or unstapled accordingly.

Other accessories for network communications or communications to a remote facsimile, for example, may also be provided on the system desk.

To conserve desk space, accessories are kept in a catalog, which itself is represented by an icon. Accessories which are desired to be used are moved from the catalog to desk, and can later be returned to the catalog if not needed.

In order to provide the foregoing manipulation of stamps, trays, and accessories in addition to the rearranging of the items on the system desk, each tray and accessory item is represented by an icon some of which have different regions that provide different functions. In the case of trays, each tray has four apparent side edge regions, such as top, bottom, right and left sides. Within the four apparent side areas lies an apparent document receiving region in which items are placed to be held in the tray or out of which items are taken from the tray by the touch and move operation of the stylus. The tray may be repositioned by a touch and move use of the stylus on any visible portion of the foregoing parts of the tray. Also each tray is provided with an apparent area for labelling the tray using the erasing and writing operations of the stylus and/or typing from the keyboard.

In the case of the trash barrel icon, the icon has a base region by which the icon is moved with the stylus used in the "touch and move" mode of operation. The icon also has a distinguishable apparent lid through which a retrieval from the trash barrel is made by an initial touching and lifting of the stylus on the lid of the icon.

BRIEF DESCRIPTION OF THE DRAWINGS

The foregoing and other objects, features and advantages of the invention will be apparent from the following more particular description of illustrative embodiments of the invention, as illustrated in the accompanying drawings in which like referenced characters refer to the same parts throughout the different views. The drawings are not necessarily to scale, emphasis instead being placed upon illustrating principles of the invention.

FIG. 1c is a block diagram of a tablet employed in the system of FIG. 1a.

FIG. 2a is an illustration of a view displayed during annotation with the data processing system of FIG. 1a.

FIGS. 2b–2e illustrate a sequence of views displayed from invocation of an annotation session during a running program to the end of the annotation session which returns to the desk view of FIG. 2f.

FIG. 2f–2k are illustrations of the desk view employed in the data processing system of FIG. 1a.

FIG. 3 is a schematic of the working software elements of the data processing system of FIG. 1a.

FIG. 4 is a schematic of the software for keyboard annotations in the data processing system of FIG. 1a.

FIG. 5 is an illustration of a superfile of the system of FIG. 1a.

FIG. 6 is an illustration of a tablet file of the system of FIG. 1a.

FIG. 7 is an illustration of a key file of the system of FIG. 1a.

FIG. 8 is a schematic of the device drivers employed by the system of FIG. 1a.

FIG. 9 is a flow chart of the Listener routine of the system of FIG. 1a.

FIG. 10 is a flow chart of the Takeover routine of the system of FIG. 1a.

FIGS. 11 and 12 are flow charts of the Supervisor and interrupt routines for processing input data during an annotation session in the system of FIG. 1a.

FIG. 13 is an illustration of contents of a voice buffer of the system of FIG. 1a.

FIG. 14 is an illustration of an instruction page for communicating through a facsimile coupled to the system of FIG. 1a.

FIG. 14(a) is an illustration of a data processor coupled to a facsimile device which couples the data processor to a remote facsimile device.

FIGS. 15a–15b are illustrations of an image reduction scheme used in the system of FIG. 1a.

FIG. 16 is a block diagram of the various applications performed by the system of FIG. 1a.

FIG. 18 is a flow chart of a supervisor task for implementing operation of the desk application of the system of FIG. 1a.

DETAILED DESCRIPTION

Generally speaking, the present invention discloses a graphically based user interface in a computer device which simulates a desk, referred to as the user's system desk, and user interaction with items on the desk. In a major screen view of the interface (hereinafter "desk view"), the desk is illustrated with "paper" documents, trays and/or folders for holding documents in user desired order, and various accessories, such as but not limited to, a stapler, means for mailing documents, a trash barrel, and means for providing blank paper. All items on the illustrated desk are moveable and are able to be placed in any position on the desk by movements of a stylus on a writing surface which mimic human motions of grabbing an item, moving an item and pointing to an item to establish selection of the item. The items are indicated in the screen view of the user's system desk by icons or illustrative representations, and movements of the stylus with respect to an item are indicated in the screen view by various cursors.

In particular paper documents are illustrated on the user's system desk by reduced images, and items which provide a process or activity are represented on the user's system desk by icons. Some icons have various regions which, with certain treatment, provide different operation or use of the item represented by the icon. For example, the icon for a tray is repositioned by a touch and move operation of the stylus on any visible portion (i.e. uncovered by other icons and/or reduced images) of the icon, and the icon enables labelling of the tray by a touch and lift operation of the stylus on the designated label area of the icon followed by a writing/ erasing use of the stylus thereon. Hence, different parts of the icon provide different effects with respect to operation of the stylus therewith.

Figure 1A:
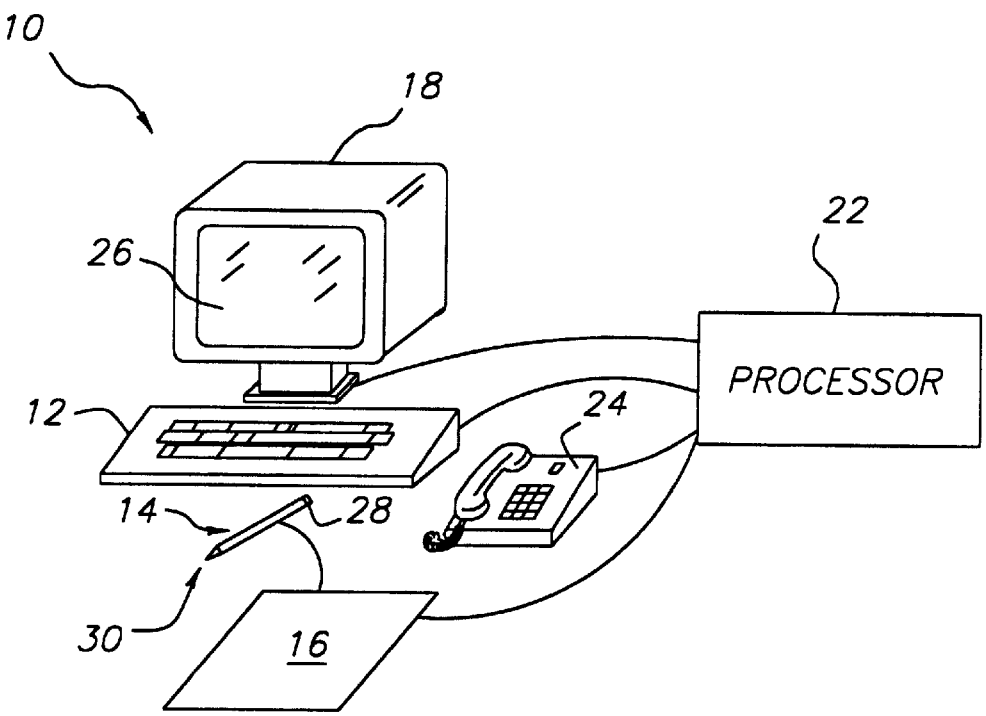
FIG. 1a is a schematic view of a data processing system which embodies the present invention.

A data processing system which embodies the present invention is illustrated in FIG. 1a. The system 20 includes a computer terminal 10 with a keyboard 12 and a display unit 18, a two-ended electronic stylus 14 and an electronic tablet 16, all of which are connected to and driven by a digital processor 22. Digital processor 22 may be of the multitask type but a single task type is assumed in the description of the illustrated embodiment. Preferably a audio assembly 24 having input and output ports, such as a telephone set, is also connected to the terminal 10 for combining voice with visual annotations input through the stylus 14 and keyboard 12.

In addition, a facsimile and/or network transmitter and receiver is coupled to terminal 10 for providing further communication means.

As used herein, "facsimile" refers to the method of transmitting images or printed matter by electronic means under the standards set forth by the International Telegraph and Telephone Consultative Committee.

The stylus 14 is used on an upper planar surface of the tablet 16 to perform certain tasks such as writing a message and correcting a part thereof, creating a new document, or retrieving and annotating an existing document. The actions of the stylus 14 on the surface of the tablet 16 are displayed on the display unit 18 and the positions on the tablet have a one to one correspondence with the view 26 displayed on the display unit 18. Thus, as the user applies the stylus 14 to the tablet surface, an image representation of what the user is doing with the stylus is provided in the view 26 of display unit 18. It is understood that display unit 18 provides a video display and not a panel of light indications. Also display unit 18 is not limited to a raster type CRT and may be of an LCD or gas plasma type display unit or of other display technology.

In the alternative, the tablet 16 and display unit 18 may be a single unit such that the stylus 14 is operated directly on the screen of the display unit 18.

Figure 1B:
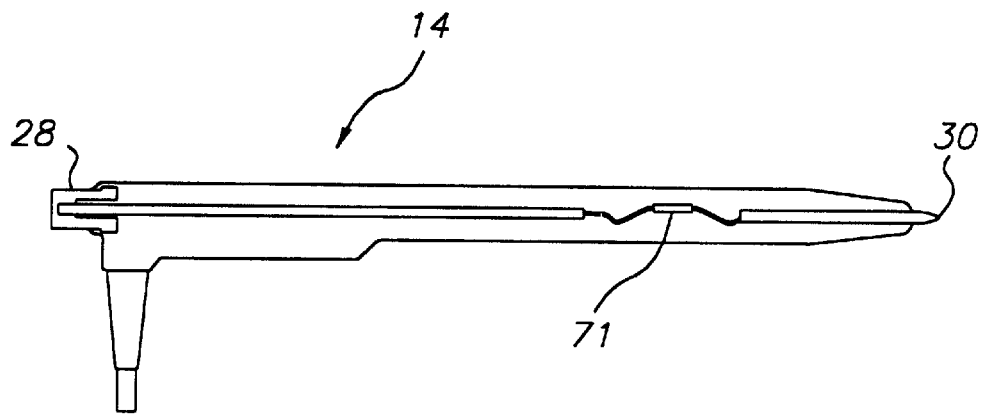
FIG. 1b is a longitudinal section of a two ended stylus employed in the data processing system of FIG. 1a which may be cordless or wired to a tablet.

The electronic stylus 14 and tablet 16 are generally of the type described in U.S. Pat. Nos. 4,644,102, 4,582,955 and 4,577,057 all to Blesser et al. In such systems, the tablet includes a grid of conductive elements and the stylus contains an electric coil. The coil in the stylus is inductively coupled to the grid in the tablet by energizing either the coil or the grid with an AC voltage signal. The voltage signal induced in the other component is then measured and used to determine the position of the stylus relative to the grid. The unique features of the electronic stylus 14 and tablet 16 of the present invention are presented next in conjunction with FIGS. 1b and 1c.

The two-ended stylus 14 operates from either end, the writing tip end 30 or the eraser end 28. When in close proximity (about 2 cm or less) to the surface of the tablet 16 the writing tip end 30 is sensed and indicated in the view 26 of display unit 18 by a cursor 300. The cursor 300 depicts a sharpened pencil tip in the illustrated embodiment as shown in FIG. 2a. Two factors are used in sensing the proximity of the writing tip end 30 of the stylus 14 to the surface of tablet 16. The factors include a height position along an axis perpendicular to the tablet surface (i.e. z-axis) as detected by circuits 69 (FIG. 1c) of the tablet 16 and a pressure indication sensed by a pressure transducer 71 (FIG. 1b) in the stylus 14. The same factors are used in determining the proximity of the eraser end 28 of the stylus 14 to the tablet surface, pressure of the eraser end 28 also being detected by pressure transducer 71. When the eraser end 28 is in proximity of the tablet surface, an indication, such as a cursor 280 depicting a pencil top eraser (FIG. 2d), is displayed in the view 26 of display unit 18 at the position corresponding to the position of the stylus eraser end 28 on the tablet surface. For reasons discussed below, independent z-axis and stylus-end pressure factors are determined.

Figure 1C:
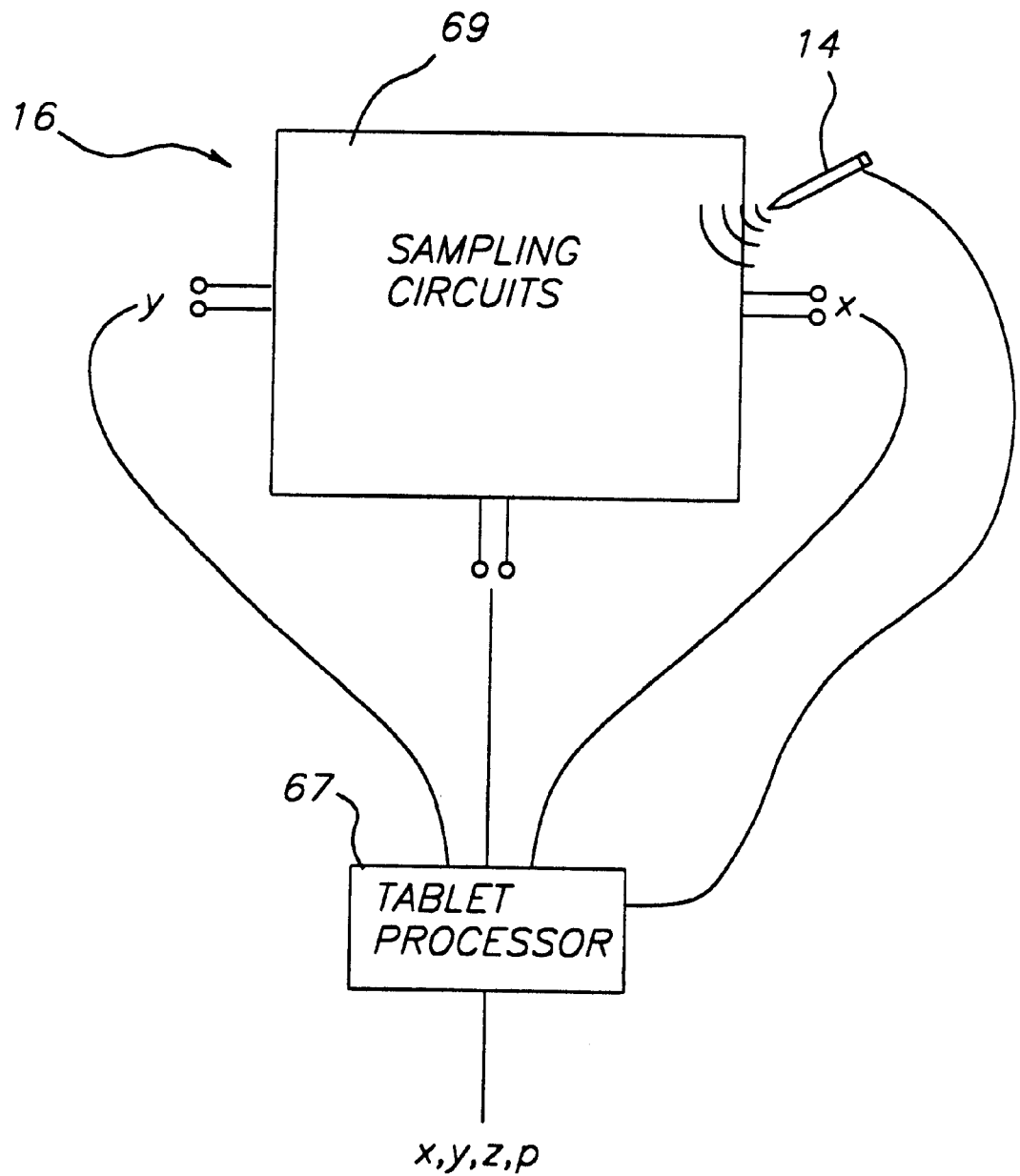

To accomplish the foregoing, the tablet 16 comprises an x- and y-axis sampling circuit, where x and y are orthogonal axes in the plane of the tablet surface, and a separate z-axis sampling circuit. It is understood that a multiplicity of loop configurations for the sensing coils forming the x and y and the z sampling circuits are known in the art. Hence, FIG. 1c provides a block diagram of tablet 16 with blocked area 69 generally referring to the sensing coils of the x and y and z sampling circuits. It is noted however, that positional phase discrepancies of the tablet sensing coils can be corrected computationally in tablet processor 67 or by a higher resolution loop such as a separate z-axis sensing loop used in the present invention. The x- and y-axis and z-axis sampling circuits operate on a predetermined schedule and generate signals at x, y and z in FIG. 1c. The signals are subsequently received and digitized into respective quantitative values by tablet processor 67. The digitized values are used by processor 22 (FIG. 1a) in a relationship known in the art to provide an indication of position of the stylus 14 relative to the tablet 16 along the x, y and z axes.

In the illustrated embodiment the z-axis sampling circuit senses stylus end height and transfers indicative signals to tablet processor 67 which transmits z-axis height values to processor 22. Along with the z-axis values, tablet processor 67 transmits to processor 22 quantitative, multivalue pressure measurements p (FIG. 1c) and corresponding x- and y-axis values for the stylus end. The processor 22 uses the transferred height and pressure values to determine proximity of the stylus end in relation to the tablet surface. It is noted that such a determination is based on multivalue, quantitative measurements in contrast to qualitative, yes/no indications used in existing devices.

In addition, the writing tip end 30 and the eraser end 28 of the stylus 14 are alternately driven by tablet processor 67

(FIG. 1c). When one end is moved into and sensed in proximity of the tablet surface, then just that end is driven. When the writing tip end 30 is in proximity of the tablet surface, it alone is driven. The driven stylus end responds to four different manners of operation to provide different effects. A "touch and lift" operation is used for selecting an item exhibited on display unit 18. Preferably once the writing tip end 30 or the eraser end 28 makes contact with the tablet surface, the "touch" part of the operation is defined but the user must lift the stylus end 28, 30 from the tablet surface within the succeeding second or so to define the "lift" portion of the operation. If the user delays in lifting stylus end 28, 30, then the "touch and lift" operation is not invoked and no effect results.

A "touch and move" operation enables the user to move a displayed item anywhere in the view 26 of display unit 18. The operation is invoked upon the user placing the writing tip end 30 or the eraser end 28 on the tablet surface and moving the stylus end 28, 30 while maintaining it in contact with the tablet surface for more than a preset number of pixels, for example 4 pixels.

The third and fourth manners of operation depend on the stylus end being driven. In the case of the writing tip end 30 of the stylus 14, use of the end 30 in a writing manner inserts markings on a chosen displayed document. In the case of the eraser end 28 being driven, erasing with the eraser end 28 deletes certain writing tip end markings or portions thereof. In particular, the eraser end 28 when driven alone allows operation in a manner which removes markings or parts thereof that have been made by the writing tip end 30 within the same session of writing/erasing on a chosen displayed item. Further, the eraser end 28 removes markings in a wider band than the band in which the writing tip end 30 writes. Whether movement of the stylus causes writing/erasure or movement of an item, depends on whether a writing surface is displayed and whether the cursor is at the edge or center of the writing surface.

Optionally the stylus 14 may be of other designs, for example single working ended. In that case, erasure may be provided through keyboard operations or the like.

The two ended stylus may be cordless in one embodiment but is not limited to such. In other embodiments, the two ends of stylus 14 may provide different functions other than writing and erasing.

Generally, the communication system 20 provides two environments in which annotation and manipulation of documents is performed. One environment is best described as a computer work area called the user's system desk which contains images of all the documents in the user's possession. The second environment provides a view of a single selected document including a new document and enables annotation or creation of that document with stylus-written/ erased, keyboard-typed and audio inputted annotations.

The second environment is referred to as the "annotator" and may be invoked from any view on display unit 18 at any time. For example, the annotator may be invoked during a working program. In that case, the annotator is invoked by the user placing the writing tip end 30 or eraser end 28 of the stylus 14 in proximity of the surface of tablet 16. The processor 22 responds to such positioning of the stylus 14 by causing the document being currently displayed on display unit 18 to become the working document 61 as shown in FIG. 2a for the invoked annotation session. As used herein, an annotation session is that period of time between the invocation of the annotator for a particular document and a subsequent cessation of use of the annotator with that document.

Cursor indications of the above described operations of the stylus 14 on the tablet 16 are provided by known methods. In the illustrated embodiment a cursor replicating a sharpened pencil tip 300 is displayed when a writing surface is displayed and the writing tip end 30 of the stylus 14 is thus used for writing, and an eraser top cursor is displayed when the eraser end 28 of the stylus 14 is used for erasing.

The currently displayed document 73 of the working program may be reformatted as illustrated in FIGS. 2b and 2c to provide the working document 61 for the invoked annotation session. If necessary, the processor 22 changes the currently displayed document 73 (FIG. 2b) of a working program from text mode to graphics mode. A character generation program converts text to graphics. Also, the processor 22 changes the currently displayed document 73 (FIG. 2b) from a dark background with light print to a light background with dark print as shown in FIG. 2c to form the working document 61 to be annotated. Thus, the working document 61 (FIG. 2c) which is displayed for the invoked annotation session is driven in a graphics mode and may be a reverse video of the display of the document during the working program.

Figure 2F:
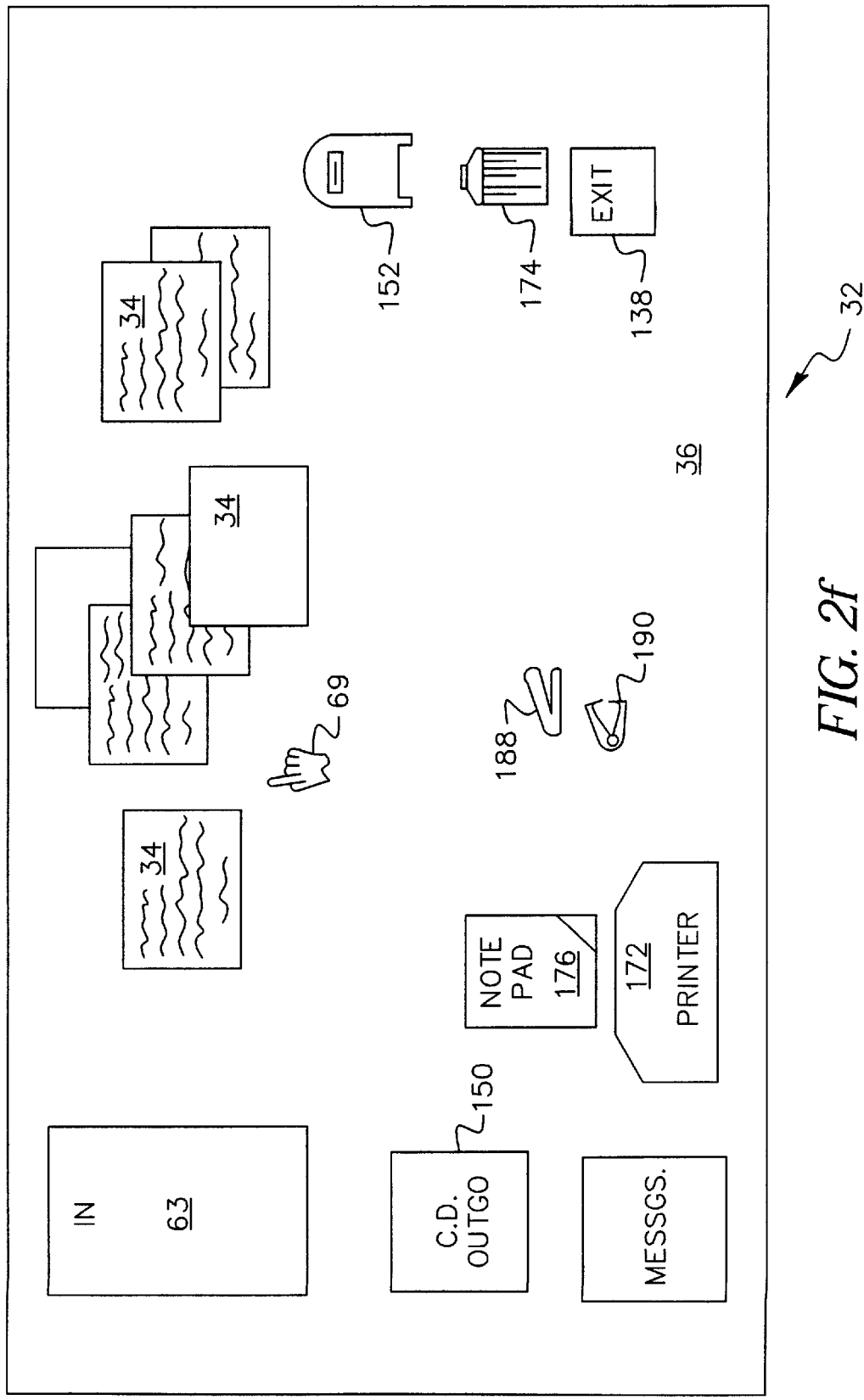

The annotator may also be invoked from the user's system desk which is displayed in a central view of the communication system 20 called the desk view 32 shown in FIG. 2f. The desk view 32 is central to the various tasks and applications of the system 20. In the illustrated embodiment, the desk view 32 provides miniaturized images or stamps 34 of various documents which are in the computer work area of the user, that is, which are on the user's system desk 36. The stamps 34 of the documents may be moved around on the system desk 36 by the user operating the writing tip end 30 or the eraser end 28 of stylus 14 in the "touch and move" manner. This involves the user pointing with and placing one end of the stylus 14 on a position on the tablet surface which corresponds to the position of the desired document stamp 34 as displayed in the desk view 32, dragging the stylus end 28, 30 across the surface of the tablet 16 to the desired position on the tablet 16 which corresponds to the desired ending position in the desk view 32, and removing the stylus end 28, 30 from the tablet surface. During the dragging of the stylus end 28, 30 across the tablet surface, the display unit 18 shows the desired document 34 being moved from its initial position to the desired position on the system desk 36 in correspondence with the dragging of the writing tip end 30 across the surface of the tablet 16. When the user lifts the stylus end 28, 30 off the surface of the tablet 16, he stops operation of the stylus in the "touch and move" manner and thus ends the ability to move the document stamp 34 on the system desk 36. By multiple use of the "touch and move" operation, the document stamps 34 may also be stacked in certain desired groups established by the user.

As generally shown in FIG. 2f, a cursor 69 replicating a hand with the index finger positioned in a pointing fashion is displayed when a writing surface is not displayed and either end of the stylus 14 is used in the "touch and lift" method for selecting a displayed item. The cursor 69 moves in correspondence with movement of stylus 14 during operation in the "touch and lift" manner.

Figure 2G:
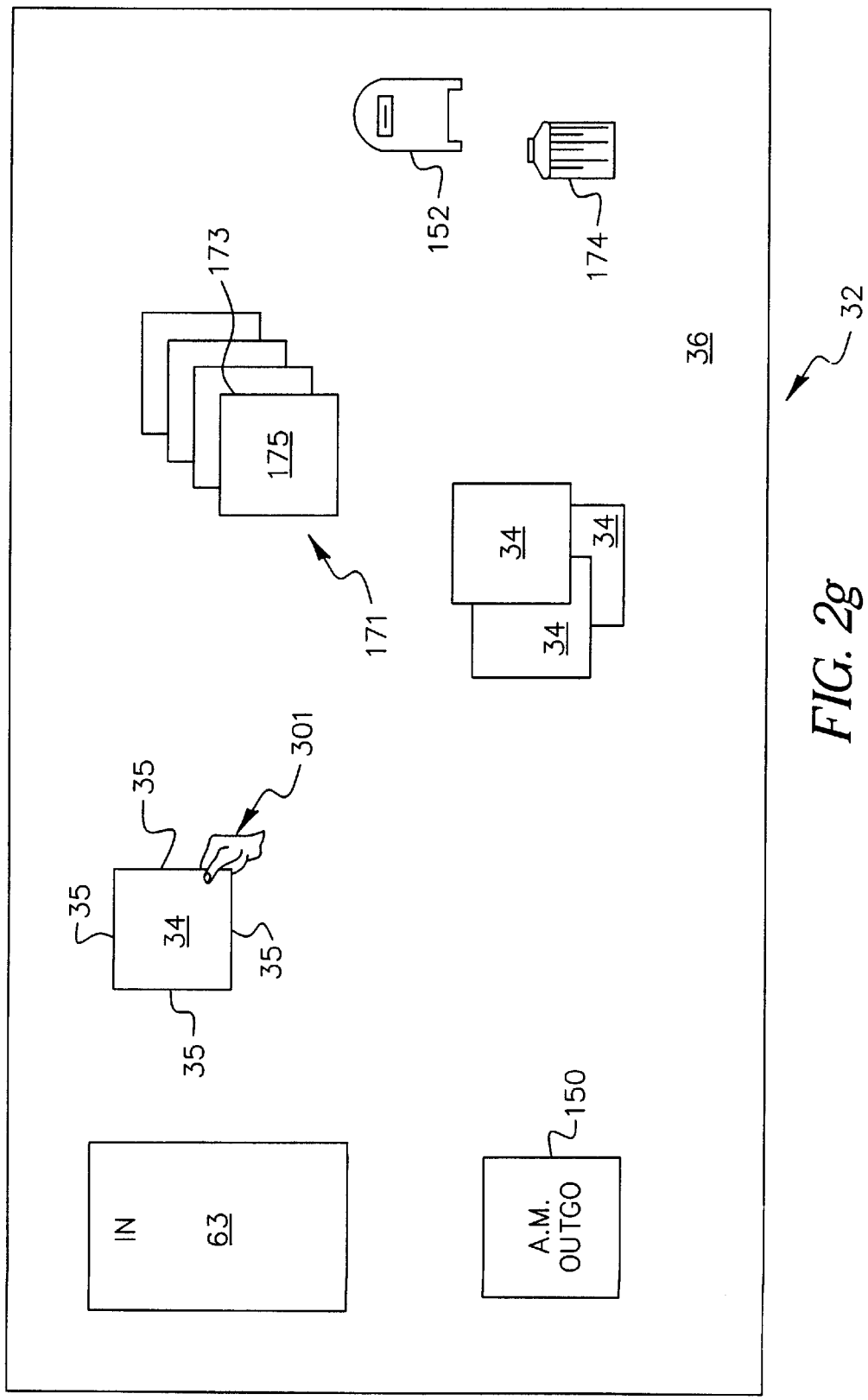

Preferably, a cursor 301 depicting a close fisted hand is illuminated adjacent one side of the document stamp 34 being moved as illustrated in FIG. 2g. The close fisted hand cursor and adjacent document stamp 34 move in the same pattern along the system desk 36 as the stylus end 28, 30 moves along the tablet surface.

A close fisted hand cursor 301 is displayed when either end of the stylus 14 is used to grab and move a displayed item in the "touch and move" method of use shown in FIG. 2f. Specifically, the cursor 301 may be used to grab a document stamp, tray or accessory on the desk, or may be used to grab the edge of a displayed writing surface to move the surface. Other cursors may be used to provide an illustrative indication of the manners in which the stylus 14, is being used.

In addition to the various stamps of documents, the desk view 32 (FIG. 2f) provides indications of various depositories for documents, and various operations of processor 22 that the user can elect to perform from the user's system desk 36. One depository is preferably labelled the "In Box" 63 for receiving all new documents created by the user and any mail sent to the user as shown in FIG. 2f. An icon representing an In Box may be similarly used instead of the labelled depository 63. Other depository areas are labelled with names of other users in communication with the terminal 10 of the user. These named depositories serve as outgoing mail drops for the user to send documents to a particular user.

To send documents to other users who do not have an associated named depository on the user's system desk 36, an electronic mail system is used. An area on the desk 36 contains a mailbox icon 152 which provides the user with the services of the electronic mail system. To select or request such services, the user uses the "touch and move" method of use of the stylus 14 to place the stamp of the document to be mailed on the location of the mailbox icon 152 in the desk view 32.

Another labelled area in desk view 32 provides the processor operation for printing a document. Selection of this operation is similar to that of the mail services. Other labelled areas in desk view 32 provide processor operations to provide a new piece of paper (e.g. to create a new document) and to return to a working program. Selection of these operations is by the user "touching and lifting" the writing tip end 30 or eraser end 28 on the corresponding position on the tablet 16.

The various labels corresponding to the different processor operations may be prearranged in a list fashion to form a menu as is known in the art. In the illustrated embodiment, the selections are arranged as individual box-like areas or icons moveably positioned in a row along one or more sides of the user's system desk 36 instead of in a menu. The box-like areas or icons preferably provide the operation selections of "note pad" 176 to provide a blank new document, "Exit" 138 to return to a working program, "trash can" 174 to dispose of a document, "printer" 172 and "mail" 152 as discussed above. It is understood that other selections may be similarly employed.

The Annotator

A user invokes the annotator from the desk view 32 in one of two ways. In one way, the user selects a displayed stamp 34 of a document for reading and/or annotating from the system desk 36 (FIG. 2f) by touching and lifting with one end 28, 30 of the stylus 14 on the position on the surface of the tablet 16 which corresponds to the position of the shrunken image of the document in the desk view 32 exhibited on display unit 18. Thereafter, the processor 22 receives the signals sensed by the stylus 14 and tablet 16 and processes the signals to display in full size on display unit 18 the document selected for viewing. During the full screen size display of the selected document illustrated by FIG. 2a, the user may annotate the document 61 with a desired combination of stylus performed (insertions and/or erasures), typed and voice/audio data.

In the second way of invoking the annotator from the desk view 32 (FIG. 2f), the user "touches and lifts" one end 28, 30 of the stylus on the position on the tablet 16 which corresponds to the pertinent box-like area or icon displayed, for example the "note pad" option on one side of the desk view 32 shown in FIG. 2f. The "touching and lifting" on the pertinent selection results in a blank view being displayed to provide the user with a "clean sheet of paper" on which to write. In a similar manner, a selection from a proper box-like area or icon may provide a new ruled sheet of paper or predefined form.

Figure 3:
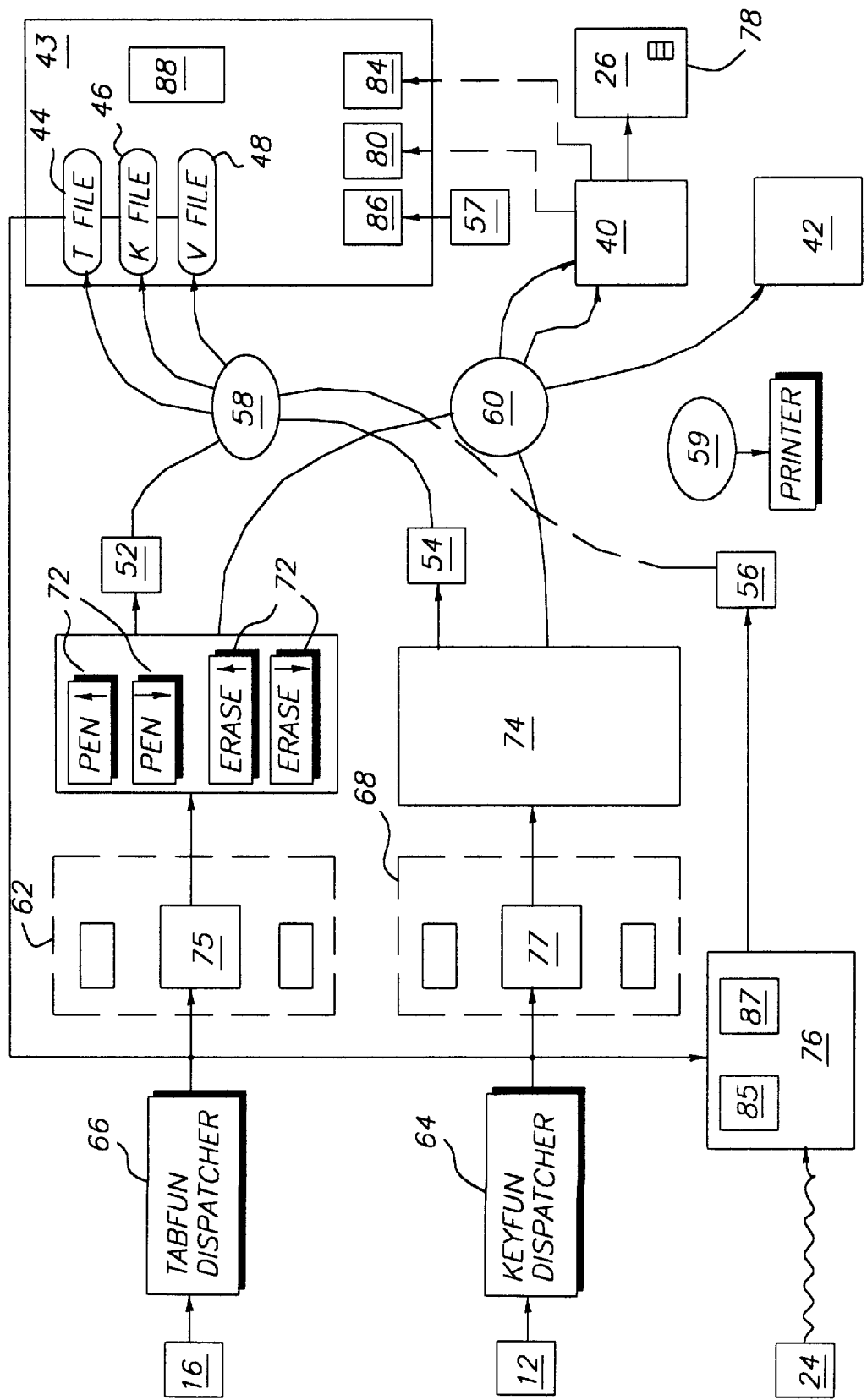

Once invoked, either from a working program (FIG. 2b) or the desk view 32 (FIG. 2f), the annotator operates on the displayed document which is either a blank new document or a document chosen from the system desk 36 or a document from a working program. In the case of a document from a working program, a copy of the document before annotations are made to it is saved in an original screen buffer 57 (FIG. 3). The copy may be in graphics or text mode, and the copy is used at the end of the annotation session and during replay of annotation sessions of the document described later. In the case of a blank new document, a variable or flag is set to indicate such as the origin of the document instead of saving a copy of a blank page in the original screen buffer. Preferably, the variable or flag indicates whether the new blank page is ruled or plain. Other types of paper could also be indicated.

During the invoked annotation session the processor 22 receives signals from the writing tip end 30 of stylus 14 to provide the writing function of the stylus. While in its writing function, the writing tip end 30 of the stylus 14 is used to insert penned annotations to the displayed document as would normally be done directly to the document with any common pencil. In a similar manner the user erases penned annotations with eraser end 28 of stylus 14 as is normally done with a pencil eraser. As illustrated in FIG. 2a, the cursor 300 depicting a sharpened pencil tip is shown on the displayed document 61 in the position corresponding to the tablet position of the writing tip end 30. Likewise, as shown in FIG. 2d, cursor 280 depicting a pencil eraser is shown in the displayed document 61 in the position corresponding to the tablet position of the eraser end 28. Both cursors 280, 300 provide visual indications relative to the document of the user's actions with the eraser end 28 and writing tip end 30 respectively on the tablet 16.

From the user's perspective, simultaneous with processing of penned annotations from the stylus 14, the processor 22 receives and processes annotations inputted through the keyboard 12 and audio assembly 24. A typing cursor 163 (FIG. 2a) indicates the position on the displayed document where annotations inputted through the keyboard 12 are currently inserted. The typing cursor 163 is preferably an upright rectangular box with dimensions equal to the current font height and width. A horizontal line corresponding to the base line on which the bottom of a character body sits is drawn inside the rectangle.

Typing cursor 163 is able to be freely repositioned by the "touch and move" method of use of either end 28, 30 of the stylus 14. More importantly, the user is able to move the typing cursor 163 to various initial cursor positions on the displayed document 61 and begin insertion of typed annotations at each initial cursor position through the keyboard 12. Each of the inserted typed annotations beginning at an initial cursor position, which is not in the vicinity of previously inserted typed annotations, establishes a local grid of character spaces which is independent of other local grids and independent of any global grid of character spaces over the whole document 61 common in existing text processing devices. Thus, unlike existing text or word processors, typed annotation input through keyboard 12 is not constrained to a specific columnar or linear structure for the entire document. Just as the stylus 14 allows the user to freely annotate anywhere on the document 61, annotation through keyboard 12 is flexible enough to allow the user to enter textual input at any position on the document at a given time, establishing only local, as opposed to global, grid structures.

An example of the need for this type of flexibility is in the completing of scanned forms, certain fields of which may be boxed or underlined. In this case the user is then constrained by the document's columnar and linear structure. If the user were using a conventional typewriter, the user would be able to position the document exactly where he so desires by moving the paper scroller perhaps half a line up or down and sliding the document to the left or right, so that the user may enter characters in the correct position on the document form. If the user were using a word or text processor, the document would be associated with a rigid columnar and linear structure known as a global grid that dictates where characters could be placed on the document.

Further, in a word or text processor the textual input is stored as a sequence of related character strings. In the present invention, each text string representing the inserted typed annotations beginning at an initial cursor position is stored in a grid buffer 89, and the beginning character of the text string is referenced in a look-up table 93 illustrated in FIG. 4 and described next. By entering through keyboard 12 a text string beginning at some position (x1, y1) in the screen view 26, the user defines a grid of character spaces that is local only to that text string as illustrated by the dashed lines which form a box around the text string. Information regarding local grids is stored in memory in a two-dimensional singly linked list which forms the look-up table 93. The major axis of the look-up table 93 begins with a header y-node 91 which points to a list of y-nodes, each y-node containing information about y or line positions of new local grids and two pointers. One pointer points to the next y-node entry in the list. Preferably the y-nodes are kept sorted in order of increasing y. The other pointer of the y-node points to at least one x-node associated with that particular y-node, x-nodes referencing the lateral or character space position within a line. Each x-node contains information about starting x or lateral space location of a respective local grid, the extent of the text string in the local grid (i.e. the number of characters that currently define the actual length of the corresponding text string), the number of characters in the text string that are actual valid characters currently displayed to the user in the screen view 26, and an index into the grid buffer 89 which contains the actual input characters themselves. Also contained in each x-node is a pointer to the next x-node in the list of x-nodes under a particular y-node. The x-nodes are kept sorted in order of increasing x.

As mentioned above, the structure in which the actual text strings themselves are stored is a grid buffer 89 of character cells. These character cells are allocated to each local grid only as needed for storing input characters. The information about the current state of the local text strings is kept solely in the x and y node linked list 93. If a local grid needs to be extended beyond its current length, the grid buffer 89 inserts a link at a last possible character position corresponding to the local grid and links some unused portion of the grid buffer 89 to the local grid. Therefore, the local grids can grow dynamically should they need to. After a local grid is defined, the typing cursor 163 will align to the local grid if the typing cursor is in a certain small distance from the extents of the local grid in either x or y direction or both. This occurs during both typing cursor 163 movement and during textual input through the keyboard 12. The sensitivity of the typing cursor 163 alignment is preferably set such that positioning the typing cursor within one character width of the horizontal extent of a local grid in the x dimension or within one character height in the y dimension of a local grid is considered to be within the extent of the local grid. This sensitivity factor may be different in other embodiments of the invention.

Figure 4:
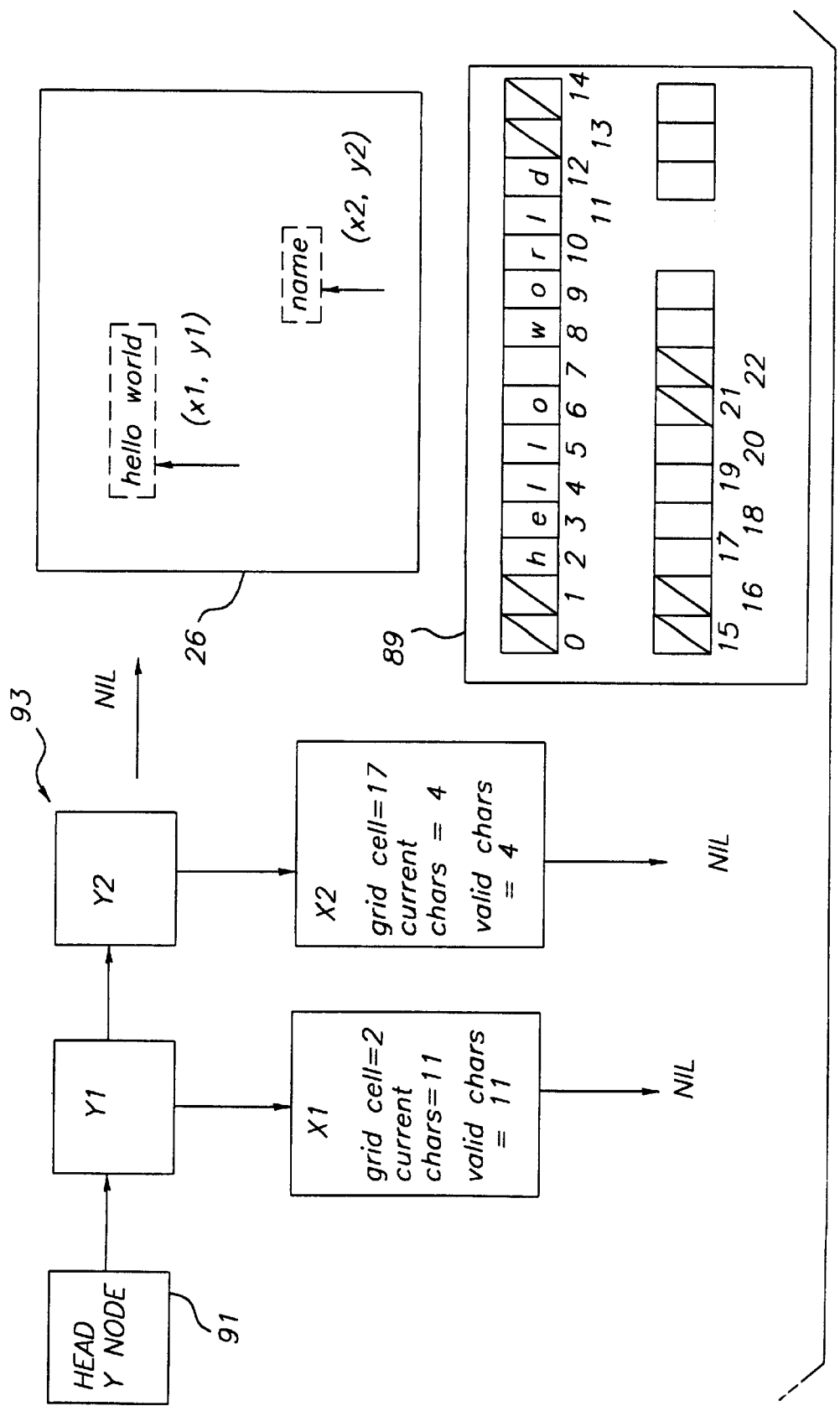

An example of the foregoing is illustrated in FIG. 4. In the screen view 26 the user types the text string "hello world" beginning at the x1 position in line y1. The processor 22 records the characters of the text string in the grid buffer 89 beginning at cell 2 for example. Next, the processor 22 establishes a pointer from the head y-node 91 to a y1 node and a pointer from the y1 node to an x1 node. The x1 node is initialized with the number of current characters in the text string and the number of valid characters in the text string. Also, the beginning grid buffer cell, cell 2, of the text string is referenced in the x1 node. The x1-y1 node defines the local grid of character spaces starting at the x1, y1 position and ending at the (x1+11, y1) position and containing the characters recorded in grid buffer 89 from cell 2 through cell 12. The local grid is illustrated as a dashed line box about the typed annotation "hello world". When the user inserts the word "name" on line y1 beginning at the x2 position in that line, the processor 22 records the characters in the grid buffer 89 beginning at cell 17 for example. Processor 22 then establishes a pointer from the y1 node to a y2 node in the look-up table 93 and establishes a pointer from the y2 node to an x2 node. The x2 node contains the number of the grid cell (i.e. cell 17) at which the newly inserted text string begins in the grid buffer 89 and the number of characters and valid characters in the text string. The x2-y2 node defines the local grid of character spaces beginning at the (x2, y2) position for the text string "name". The dashed line box about the word "name" in screen view 26 illustrates the local grid formed for that newly inputted text string. At the end of the of the list of y nodes a nil terminator is positioned. Similarly at the end of each list of x nodes a nil terminator is positioned.

In the illustrated embodiment during an annotation session, a representation of the text of the desired document (or the blank new document) is displayed in the view 26 of display unit 18 by a working-copy bitmap held in a current screen buffer 40 as shown in FIG. 3. An off-screen bitmap of an initial copy of the document is stored in an erase buffer 42 and serves as a reference copy of the document before annotations are made during a current annotation session. All marks written by the writing tip end 30 of the stylus 14 onto the tablet 16 are reflected on the working-copy bitmap and are subsequently displayed on display unit 18. When the eraser end 28 of stylus 14 is applied to the tablet 16, processor 22 refers to the off-screen bitmap of the initial copy of the document which is held in the erase buffer 42 to determine what bits are needed to restore the erased area to what was originally displayed in the view 26 in the erased area at the beginning of the current annotation session.

The copy of the document in the original screen buffer 57 is not necessarily a bitmap representation and cannot be as efficiently used as a reference copy as the off-screen bitmap held in erase buffer 42. Thus although the state of the document represented by the copy in original screen buffer 57 and that of the copy in erase buffer 42 are the same, the two representations are readily usable for different purposes. Preferably one representation is an optimal form, in handling time and quality, for printing the document, and the other representation is an optimal form, in handling time and quality, for displaying the document on the screen display 18.

In the case of a blank new document being annotated, an off-screen bitmap of the new document is not necessarily stored in the erase buffer 42. Instead, the erased area may be restored by the processor 22 changing the corresponding bits in the working copy bitmap in current screen buffer 40 to reflect a blank area. If the document was a new piece of ruled paper then the corresponding bits in current screen buffer 40 are changed accordingly to provide unmarked ruled areas for the erased areas. The variable or flag which indicates that the document being annotated is from a blank or ruled piece of paper aids the processor 22 in determining for which documents such bit generation is applicable.

It is noted that application of the eraser end 28 only affects the desired portions of penned annotations made during the current annotation session. Penned, typed or audio annotations of prior annotation sessions are not erasable in the current or any succeeding annotation sessions. Currently typed annotations are preferably prevented from being erased by the stylus eraser end 28 in the following manner. All typed text that is within a path of stylus erasure is reconstructed in the screen view 26 in real time. This saves memory space by the typed characters being displayed only in the current screen view 26 and by having no other video page holding character bitmaps to load in during erasure. The processor 22 determines the x-y positions within the erasure path and searches the x-y linked list 93 for those x-y positions to determine the typed characters which are within or intersected by the erasure path. The grid buffer 89 is accessed for the ASCII codes of the affected typed characters, and the characters are quickly rewritten to the screen view 26 during or immediately after erasure by the stylus end 28.

Typed annotations generated in the current annotation session are erasable by keyboard means such as a backspace key or a delete key commonly known in word processing and typing systems. Preferably, the backspace key causes the typing cursor 163 to move one character width to the left, and overwrite (or overstrike) the character currently there, if there is one. If there is no character currently defined there, the backspace is handled simply as a left arrow moving in free screen space. Entering a backspace in the vicinity of a local grid causes the number of valid characters associated with that local grid's x node to be decremented. Recognition of the valid characters during erasure comes into play when the actual bitmap on the screen is erased. By using the information in the x-node of the associated local grid to traverse through the characters of the local grid, the correct ASCII code for the character to be erased can be obtained. A "white" character is then written to the screen view 26 in the corresponding x-y position, hence "erasing" the black character in the screen view. An illustration of white overstriking characters erasing the word "uses" is provided after the typing cursor 163 in FIG. 2d. If all of the characters within the extents of a local grid are erased and the valid character field of the x-node decreases to zero, the x-node entry is removed from the linked list 93. If the x-node was the only one associated with a particular y-node, that y-node is also removed from the look-up table 93. The y line in view 26 corresponding to a removed y-node is "freed" and the typing cursor 163 can float freely over and around that line.

A tablet file 44 of the annotation session records the sequence of the annotations made by the writing tip end 30 and eraser end 28 of the two-ended stylus 14. A keyboard file 46 of the annotation session records the sequence of the annotations made through keyboard 12. The tablet file 44 and keyboard file 46 are referenced in a superfile 88 of the document which catalogues all tablet and keyboard files of all annotation sessions of the document. Further details of the superfile 88 are given later.

As illustrated in FIG. 2a, during each annotation session, a pop-up menu 78 is displayed in view 26 whenever the stylus 14 is sensed to be idle (i.e. not writing, erasing, or making a selection by "touching and lifting"). Preferably, the pop-up menu includes the options of "go to desk", "blank paper", "ruled paper", "erase notes", "playback", "shrink menu", "hide (show) ruler" and "all done". Selection and use of each of these options is discussed below.

The user establishes a typing environment by means of a graphical ruler interface containing margins and tabs. Using the "touch and lift" operation of one end of the stylus 14 to choose the "show ruler" option from the pop-up menu 78 causes a ruler to be displayed along the top of the document 61. On the ruler are left and right margin icons, denoted preferably by black downward pointing triangles that look like the letter V. The default position for each margin is one inch from either edge of the document 61. Using the "touch and move" operation of the stylus 14, the user moves the margins freely in the horizontal direction to any location on the document within ¼" from the edge of the document. The typing cursor 163 is always located somewhere between the two margins as they define the allowed "typing area". For example, moving the typing cursor 163 near the left hand edge of the document 61, and then moving the left hand margin to the middle of the screen view 26 causes processor 22 to move typing cursor 163 inwards so that it is never outside of the allowed typing area defined by the margins.

Tab icons are preferably denoted as right pointing black triangles. The tab icons preferably are sliding icons on a ¼" wide white strip beneath the ruler. At the left end of the white tab strip is a box from which new tabs are taken and to which old tabs are returned using the "touch and move" operation of one end of the stylus 14. The user establishes a tab by touching a tab icon in the tab box with an end of stylus 14, moving the tab icon to a desired tab stop location with the stylus end, and lifting up the stylus end to cease operation of the "touch and move" function. Tabs are dynamic entities, hence currently defined tabs can have their icons touched and moved anywhere on the tab strip. Each tab icon must be placed in its own "discrete" position, positioning a new tab icon too close to a tab icon of a previously defined tab will cause the newest tab icon to be erased from the screen view 26 and returned to the tab box to be used again.

As stated previously the user is able to type characters at any time within the area dictated by the margins. The current position of the typing cursor 163 is the position at which the next typewritten character is written to the document 61. After the character has been input, the typing cursor 163 is moved one font width to the right. Should the typing cursor 163 move to within the vicinity of the right margin, the typing cursor will auto wrap to the left margin position on the next line. If there is any previously entered text there, the typing cursor will automatically align with a character space of the local grid established by the previously entered text. If the typing cursor 163 comes into the vicinity of the right margin in the middle of a word, the entire word is automatically wrapped to the next line.

By touching and lifting one end 28, 30 of the stylus 14 on the position on the tablet 16 corresponding to the "playback" option in pop-up menu 78, the user selects that option. Selection of the "playback" option during an annotation session of a document provides a replay of each form of the document from its origination through each annotation session up through and including the present annotation session. More importantly, the replay provides a relative time sequence of the annotations made to the document in all annotation sessions of the document. In one embodiment, the user may request playback of the annotation sessions in a desired order and at an increased pace than the pace in which the annotations were originally input. In particular, the "playback" option of the pop-up menu 78 may provide "fast forward" and "rewind" options similar in use and effect to "fast forward" and "rewind" options of commonly known recording devices. At the end of the replay, the document and processor 22 are ready to continue the annotation session.

A new annotation session may be started from a current annotation session with the selection of the pop-up menu 78 options for changing the type of paper currently being annotated to blank or ruled paper. The user selects the "blank paper" or "ruled paper" option by using the "touch and lift" manner of operation of one end 28, 30 of the stylus 14 on the corresponding position on tablet 16. The processor 22 provides the selected type of paper by generating the corresponding screen view and accordingly initializing the current screen buffer 40 and erase buffer 42 with original contents for the new annotation session. The processor 22 saves the document which was being displayed at the time the "blank" or "ruled" paper option was chosen and saves any annotations made to it during that annotation session. Accordingly, processor 22 replaces an updated stamp of the document for the last stamp of that document on the user's system desk.

The selection of the "erase notes" option in the pop-up menu 78 provides a new start of the current annotation session. The processor 22 discards all the erasures and additions made prior to the user "touching and lifting" the writing tip end 30 or eraser end 28 on the corresponding position on tablet 16 to select the "erase notes" option. That is, the processor 22 clears the working bitmap in current screen buffer 40 and the tablet file 44 of all the annotations made thus far in the annotation session and refreshes the screen view 26. As a result, the document currently being annotated is displayed without any of the annotations made to it thus far in the current session.

In accordance with the foregoing, the user is able to begin a first annotation session with a first document, say for example from the system desk 36, annotate the first document, and select the "ruled (blank) paper" option to create a new document in a second annotation session by annotating the new piece of ruled (blank) paper. Upon the user selecting the ruled (blank) paper option, the processor 22 updates the stamp of the first document on the user's system desk 36 to include the annotations made in the first annotation session which were not discarded by a selection of the "erase notes" option. At the end of the second annotation session, processor 22 creates and places a stamp of the new document in the In Box 63 on the system desk 36.

The same or similar results would occur whether the first document is from the interruption of a working program, a stamp on the system desk 36, or the selection of the "note pad" option in the desk view 32. Selection of the "note pad" option or interruption of a working program to obtain the first document in the above scenario causes a stamp to be formed to represent the newly created document with its annotations from the annotation session. The stamp of the new document is placed in the In Box 63 on the system desk 36 and remains there until the user returns to the desk view 32 and removes the stamp from In Box 63.

A current annotation session may also be ended by the user selecting a pertinent option from the pop-up menu 78 displayed in view 26 during the annotation session. The pertinent options of pop-up menu 78 in the illustrated embodiment are: "go to desk" and "all done". By using the "touch and lift" manner of operation of one end 28, 30 of the stylus 14 on the position on the tablet 16 which corresponds to the position of the selection to return to the system desk 36 (i.e. the "go to desk" option), the user ends the current annotation session and enters the desk view 32. Similarly by the user "touching and lifting" stylus end 28, 30 on the position on tablet 16 corresponding to the position in view 26 of the "all done" option, the user ends the annotation session and reenters the working program at the point where the annotator was invoked.

Upon returning to the desk view 32 (FIG. 2*i*) or the working program, a "stamp" which is a shrunken image or miniaturization of the annotated document at the end of the annotation session is added to the system desk 36, in the case of a blank or ruled paper or a new document from a working program having been annotated. In the case of a previously annotated document having been annotated in the annotation session, an updated stamp replaces a previous stamp of the document on the desk 36. In the illustrated embodiment, the stamps of annotated documents are processed in the order in which the documents were annotated. Hence, a stamp of the document last viewed or last annotated in the last annotation session is generated last. New stamps, that is, stamps of the new documents are placed in the In Box 63 (FIG. 2*i*) with the first generated new stamp on the bottom of the In Box 63 and the last generated new stamp at the top of the In Box 63. Although a first-in, last-out ordering of the stamps in the In Box 63 is described, other orderings of the stamps are suitable and can be specified by the user.

Production of a stamp on the user's system desk is accomplished by a stamp file 80 (FIG. 3) of the document which holds in a compressed form a currently updated image of the document as affected by the last annotation session. The stamp file 80 is generated from the working copy bitmap in current screen buffer 40 at the end of each annotation session and is stored in disk memory 43 outside of local memory where the annotator operates.

Also placed in disk memory 43 at the end of each annotation session is a snapshot of the last view of the annotated document displayed on the monitor screen. The bitmap of this last view is formed from the working bitmap in current screen buffer 40 and is held in an intermediate file 84 (FIG. 3) which is used for everything but playback of annotations or printing of the document as finally affected by the annotation session. Hence, the intermediate file 84 contains the most current representation of the document with its annotations from all annotation sessions. In the interest of memory space, the image data from the working bitmap of current screen buffer 40 is compressed to form the contents of intermediate file 84.

At the end of the first annotation session of a new document formed from a working program, the contents of the original screen buffer 57 is copied to an original screen file 86 in disk memory 43 as shown in FIG. 3. Original screen file 86 enables replay or playback of the document as described next.

Playback of the annotation sessions of a document may be invoked from the desk view 32 (FIG. 2*f*). The user "touches and lifts" stylus end 28, 30 on the position on the tablet 16 which corresponds to the position of the stamp (shrunken image) of the document 34 in the desk view 32. The document 34 (FIG. 2*f*) is then displayed in full screen size in view 26 of the display unit 18 from an original form through a chronological sequence of annotations made to it during all the past annotation sessions of that document up to that time. The original form of the document is stored in original screen file 86 in disk memory 43 as mentioned above and shown in FIG. 3. The contents of the original screen file 86 is either a scanned image, or a text mode or graphics mode image of the document as stored in original screen buffer 57 at the first time the annotator was invoked for that document as described previously. The original screen file 86 during playback provides the background of the display, and the tablet and keyboard files 44, 46 provide the sequence of annotations made to the document. In the case of a document which originates as a blank or ruled page, no original screen file is saved for that document since nothing is stored in the original screen buffer. Only the indication of the document originating as a blank or ruled page is saved, and on playback the processor 22 responds to the indication by generating a corresponding blank or ruled page for the background of the display.

A document may also be longer than the display screen and/or have several pages. In one embodiment, scrolling from top to bottom of a single page or sequentially from one page to succeeding or preceding pages is enabled by means known in the art. Preferably when either end of stylus 14 is positioned near the area on the tablet 16 which corresponds to the edge of the document being annotated, a cursor 100 depicting a close-fisted hand is displayed at the respective position at the edge of the document as shown in FIG. 2e. The close-fisted cursor 100 appears to scroll a page of the document or a multipage document itself from one page to another, line by line, at a rate and in a manner dictated by the user's "touching and moving" the stylus along the corresponding tablet area.

In another embodiment, each page is treated in a separate annotation session in a manner as described above. Each page has its own original screen file or ruled/blank page indication which provides a text mode or graphics mode image or processor generated image, respectively, of the page from the first time the annotator was invoked for that page. The original screen file or indication of each page also provides the background of the display of the corresponding page during replay of an annotation session as described above. Each page also has its own intermediate file containing a bit map of the last screen of an annotation session of the page as described above. The intermediate files corresponding to the pages of a document enable the processor 22 to quickly flip through the pages of a document.

On the other hand, no matter how many pages a document has, the document only has one stamp file 80 and one superfile 88 (FIG. 3). The image of the page which was annotated in the last invoked annotation session of the document is compressed to form the contents of the stamp file 80. After each annotation session, the stamp file 80 is updated according to the page of the document that was last annotated during that session. Alternatively, a stamp and thus a stampfile 80 for each page of a document may be used. The superfile 88 serves as a directory of all files of the document. In the illustrated embodiment, the stamp file 80 and the superfile 88 of the same document both share a common base name. The stamp file adds the suffix ".wst" for example and the superfile 88 adds the suffix ".wsf". The processor 22 refers to a document by the base name of its superfile/stamp file, and reference to the other files of the document are made by the base name in combination with appropriate suffixes.

For simplicity, reference is made to the document as a whole throughout the following discussion, but it is understood that each page of the document may be treated in the manner described for the document. Also, as used herein the term "document" refers to a still display of one or more images or one or more single screens of information and is not meant to be confused with a sequence in time of frames of images which form an animated picture. Hence, a "displayed document" refers to an image representation of a document which is viewable on a computer display screen. Further, a replay of the annotation of a document is a replay of the creation of a definable composite image as opposed to a replay of a sequence of created images in the case of animation.

In addition to visual (i.e. hand-written, erased and typed) annotations, audible or audio annotations may also be made to the document, or any page thereof, during an annotation session. Instead of annotating the document with the two ends 28, 30 of the stylus 14 and/or with the keyboard 12, the user may voice a message or otherwise generate a sound-made message during the annotation session into an audio assembly 24 shown in FIG. 1a or other receiver/speaker unit connected to the digital processor 22. Like the tablet file 44 and keyboard file 46 of FIG. 3, a voice file 48 records the voiced/sounded annotations generated during an annotation session. Each voice file 48 of a document is catalogued in the superfile 88 of that document. During playback, handwritten, erased, typed and voiced annotations are displayed/sounded in a manner in time sequence which mimics the way those annotations were originally made to the document.

Alternatively, the handwritten/erased and typed annotations alone may be played back in time sequence order at an increased rate. At the end of the display of the quickened sequence of handwritten, erased and typed annotations, a system message is displayed on display unit 18 to inform the user that voiced/audible annotations exist for this document and are able to be heard over the output port of the audio assembly 24 in proper time sequence that the voiced annotations were originally dictated.

The superfile 88 of each document is organized as a table of contents which is at any time appendable. Each entry in the table of contents references one annotation session of that document and lists the types of files created during that annotation session. Hence, the superfile 88 provides a history of all annotations sessions of a document.

In the illustrated embodiment as illustrated in FIG. 5, a superfile 88 of a document has a header record 90 and one or more session records 92. The header record 90 contains information which is general to the document such as the number of pages and last accessed page of the document. Every time a user completes an annotation session, a session record 92 is created and keeps track of pertinent information for that annotation session. The session record 92 is then appended to the end of the superfile 88 for the document. Each annotation session is named and the annotation session name is stored in the session name field 96 of the respective session record 92. The paper field 94 of a session record 92 denotes the presence of an original screen file 86 (FIG. 3). Certain codes in the paper field 94 indicate the use of a program generated screen (e.g. blank or ruled paper) and other codes indicate a particular screen file 86 containing screen information as previously described for the page of the document indicated in the page field 98. Preferably, references to original screen files 86 use the suffix ".wsc" after the name of the session in which the respective page was found. A code in the paper field 94 may also indicate that the document page annotated in the annotation session corresponding to the session record previously existed and is appended to during the session. The status field 99 has bits to mark the presence of tablet (T), keyboard (K) and voice (V) files and to mark the existence of erasures (E) in an annotation session. Each of the tablet, keyboard and voice files have names that consist of the name of the session in the session name field 96 plus a unique suffix. Each session record 92 also has a field for indicating date and time of creation of the record 92. Since the session records 92 are time sequenced, the processor 22 can start with the superfile basename of a document and use the session names and suffixes to recreate the document exactly as the user had created it.

Each tablet file 44 (FIG. 3) holds information necessary to recreate a user's interaction with the tablet 16 during an annotation session. Included in the information are x and y coordinates of the writing tip end 30 or eraser end 28 of the stylus 14 on the tablet 16 and the relative timing of occurrence of different pairs of x and y coordinates. Each pair of x and y coordinates is recorded in sequence along with timemarks as needed to provide a time sequence of handwritten annotations and erasures made by the user during an annotation session. Since the eraser end 28 of stylus 14 is effectively wider ended than the writing tip end 30, the x-y coordinates of strokes of the eraser end 28 are recorded in a manner which indicate wider bands or strokes than handwritten annotations. Pressure and z-axis measurements corresponding to the pairs of x and y coordinates are used to determine changes in stylus end being used (i.e. from eraser end 28 to writing tip end 30 and vice versa) and may also be recorded in the tablet file 44. Each change in stylus end is associated with a delimiter to provide an indication of the stylus end to which the x-y coordinates correspond. Preferably, a timemark of the change in stylus end is also associated with the delimiter.

An illustration of a tablet file 44 is shown in FIG. 6. The tablet file 44 has a header record 13 which contains tablet file and annotation session identification information and information describing interpacket timings of the packets of data transmitted from the tablet 16 to the processor 22. The tablet file identification uses the suffix ".wtb". The rest of the tablet file 44 contains the x and y coordinate portions of the packets of data separated by delimiters 11. The delimiters 11 mark major changes such as the switching from writing tip end 30 to erasure end 28 or from one end being on the tablet 16 to being off the tablet 16, or vice versa. A code field 15 of each delimiter 11 provides an indication of one of the following:

stylus end down (i.e. beginning of a stroke)
stylus end up (i.e. ending of a stroke)
switch to erasure end 28
switch to writing tip end 30.

A pressure field 17 of the delimiter 11 provides an indication of sensed pressure of the end of the stylus 14 corresponding to the code field 15. Time field 19 of delimiter 11 provides an indication of the time at which the action of the code field 15 occurred. The timing of x, y data after a delimiter is defined by the interpacket timings specified in the header record 13. The processor 22 is able to use the information of the header record 13, delimiters 11 and data of the tablet file 44 to exactly replicate the user's action on the tablet 16 from an annotation session.

In a similar fashion, the keyboard file 46 records a sequence of ASCII characters and timemarks which provide time-based indications of the typed annotations. In the embodiment illustrated in FIG. 7, keyboard interaction is not sampled on a predetermined schedule, therefore each keystroke is timed. Two timings are used. In the short timing where the user types fast enough that keystrokes are separated by less than about half minute intervals, each keystroke is packaged with a 15-bit (32,767 millisecond) interstroke time 29. In the long timing where the interstroke time is longer than about 30 sec., a 32-bit time of occurrence is recorded. The two timings are used to save disk space. The keyboard file 46 has a header record 21 which provides identification information about the file. References to keyboard files use the suffix ".wkb". In addition, keyboard files 46 created by the annotator contain a special code to save on recording space. When the user asks to show or hide the "ruler" (via pop-up menu 78 ) used to define typing, margins and tabs, a special keystroke is added to the keyboard file 46.

Printing of the document and annotations thereto is accomplished in the time sequence which the annotations were originally input by the user and not by order of position of characters on the document. At print time of a document, for each page, the sequences of data of the tablet and keyboard files 44, 46 of a page are merged with the latest bitmap, preferably from the original screen file 86 of the page, to format the document in its most up-to-date version. The resulting bitmap is used by a printer to generate the document in printed paper form.

Anti-Skip Routine

The end of the stylus 14 which is in proximity of the tablet generates a voltage difference relative to the tablet 16. The voltage difference is inversely proportional to the square of the distance between the stylus end and a sensing surface within tablet 16. As the stylus end is drawn closer to the tablet surface along an axis (the z-axis) perpendicular to the surface, more finely discriminable data points of the z coordinate are collected. Those data points are used in combination with a sensed amount of pressure to define stylus end contact with the tablet surface. By the same token, z-axis data points and pressure measurements together are employed in a subroutine to prevent false stylus-up signals, during writing and erasing with the stylus, due to human performance and mechanical and hardware imperfections.

In the illustrated embodiment, when the rate of decreasing distance between a stylus end and the tablet surface, along the z-axis, reaches zero and the sensed amount of pressure greatly increases, the corresponding stylus end is considered to have made contact with the tablet surface. In addition, the sensed pressure of an end of the stylus 14 controls the initiation and reinitiation of that end as long as the end is within a certain distance of the tablet surface along the z-axis. When the pressure of an operating stylus end decreases below a predetermined threshold but the end is sensed to be within the predefined tolerance or range of acceptable distances along the z-axis, the anti-skip subroutine generates signals to the processor 22 to indicate that the stylus 14 is still intended to be used in the writing/erasing manner of operation. When an acceleration in the change in distance away from the tablet along the z-axis is sensed along with a decrease in pressure below the predetermined threshold, the anti-skip subroutine generates signals to the processor 22 to indicate that the stylus end is effectively off the surface and that use of the stylus 14 for writing or erasing a current stroke has ended. Moreover, if the distance of the operating end of the stylus is sensed to be outside of the predefined z-axis threshold for a certain length of time then the anti-skip routine generates signals to the processor 22 to indicate that the stylus end is off the tablet surface for operational purposes of the stylus. Hence upon future reentrance of a stylus end into proximity of the tablet, the stylus end will need to be reinitiated and driven accordingly.

Because the tablet 16 may not be perfectly smooth over its entire top surface, the z-axis value may vary from point to point on the tablet 16 and position-dependent corrections may be necessary. Thus in a preferred embodiment, a relative measurement of distance between an end of the stylus 14 and the tablet 16 along the z-axis is used for each point on the tablet.

Software for Annotator

The features of system 20 described above are provided by an Annotator-Desk task program also referenced with the reference numeral 20 since the Annotator-Desk task is the software counterpart to the hardware elements of system 20 shown in FIG. 1a. The annotator itself is driven by an annotator application routine which is one of several application routines in the Annotator-Desk task. Other application routines are for driving the desk application which involves the desk view 32 and corresponding functions therewith, or for driving the print application for printing documents.

In general, the Annotator-Desk task may be thought of as an interrupt program. The operating system of processor 22 may be running a first program at the time the annotator is invoked. At that time, the signals transmitted from the tablet 16 are received by an interrupt controller which in turn asks the operating system to temporarily stop the running of the first program long enough for the annotator application routine of the Annotator-Desk task (and any of the other application routines desired) to be run and then to resume running the first program. The stopping of the first program is accomplished by a subroutine called the Listener which passes control to a second subroutine called the Takeover, both of which will be discussed later. The actual running of the annotator application routine is accomplished by a series of interrupts to the operating system by subroutines which drive the tablet 16, keyboard 12 and audio assembly 24 of the system 20.

Figure 8:
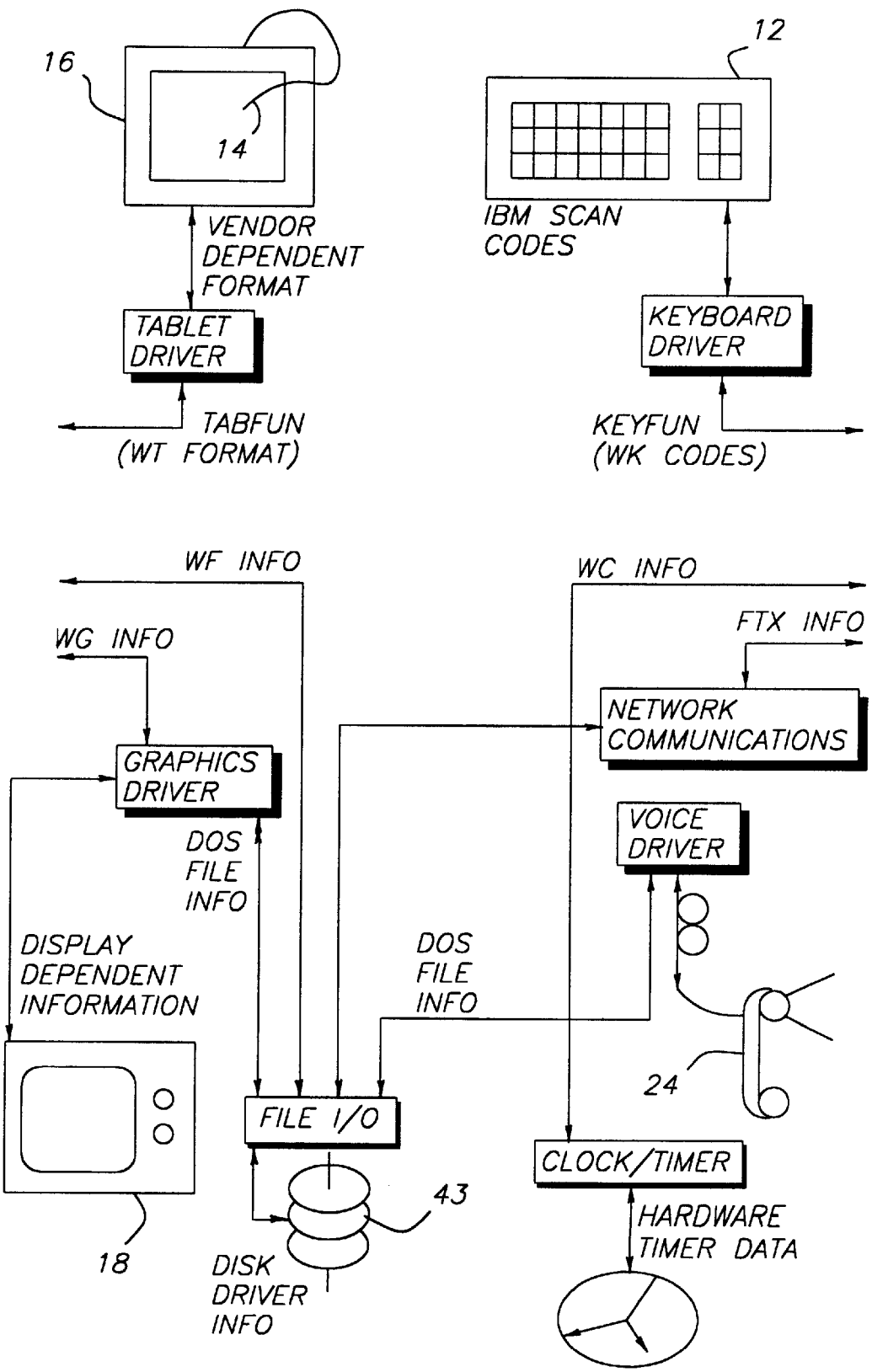

The foundation of the foregoing subroutines consists of a set of six device drivers or modules shown in FIG. 8 and labelled Graphics driver, Tablet driver, Keyboard driver, Network Communications, File I/O driver and Clock/Timer. The device drivers are typical, that is they abstract details of an associated device, such as tablet 16, keyboard 12, display unit 18 etc., from the applications that use them and communicate through a set of standard requests and data formats. The Clock/Timer is one of the most basic drivers. It provides the Annotator-Desk task 20 with a 1 KHz counter used to time annotations and synchronize graphical feedback. The File I/O driver allows applications to create, open, read, write, delete and rename files.

The Graphics driver or module provides an application with a virtual sheet of paper. There are commands to write on this paper, erase on this paper, display a particular kind of paper, save and load this information to disk 43 and manipulate cursors and buffer portions of the view on screen display 18. The Graphics module also provides the desk view which is used exclusively by the desk application. The stamp and cursor display and manipulation functions of the desk application are also handled by the Graphics module.

The Network Communications module provides a data path to computers of the network used for mail, remote printing or other network shared tasks. The Network Communications module allows an application to send and receive a file, determine the presence of certain files used for mail, and conditionally delete files.

The Tablet module is one of two interrupt-based device drivers. Upon the operating system receiving an interrupt indicating the availability of data points from the tablet 16, the Tablet driver packages the information into a data packet of a standard format and calls a tablet function. A tablet function is a procedure that controls exactly what is done upon receipt of the data packet. A tablet function can accomplish various steps on the system desk as well as during annotation and can make requests of the Graphics module, the Timer module, and/or call other procedures. In the embodiment, the tablet functions generally have the following format:

```
Procedure myTabFun( );
begin
    GetDataFromTablet;
    <do whatever work is necessary>
    if (condition 1)
        prepare for transition
        TabFun(newTabFun1);
    else if (condition2)
        <prepare for this transition>
        TabFun(newTabFun2);
        .
        .
        .
    else
        < non-transition work>
end
```

In the IF statements, the tablet function is deciding which tablet function should be called when the next data packet is received. Thus, if condition 1 is achieved, myTabFun performs whatever tasks are needed for the proper execution of newTabFun1 and then tells the Tablet driver to execute newTabFun1 by calling the procedure TabFun. This does not cause immediate execution of newTabFun1. Instead, upon finishing myTabFun, the Tablet driver allows receipt of another data packet. Only when this subsequent packet is received is newTabFun1 called. If a succeeding tablet function is not declared during execution of a current tablet function, the current tablet function will be called upon receipt of the next data packet.

The tablet functions provide a state machine approach to handling the tablet. From an initial state (from a call to a tablet function) the Tablet module simply performs work and shifts states depending on the data at hand. Since interrupts are performed to completion at a priority higher than the main level of the annotator application routine, the Tablet driver allows the operating system to pseudo-multitask (i.e. process a series of interrupt tasks).

The Tablet driver makes the data packet available in a data format called WT Data. This format includes a package of four 16-bit words. One 16-bit word represents an x coordinate (i.e. the x position of the stylus 14 on tablet 16 ), at 1000 dpi. A second 16-bit word represents a y coordinate (i.e. the y position) at 1000 dpi. One byte (8 bits) of another word represents a z coordinate; another single byte (8 bits) represents pressure on the end of the stylus 14. One more byte (8 bits) represents which end of the stylus is being sensed. The positions for x and y are based upon a sheet of paper with the origin preferably at the lower left corner of tablet 16. Since Annotator-Desk task 20 allows the user to move off the sheet of paper in all directions, negative numbers and numbers larger than the dimensions of the paper are valid.

The Keyboard driver is the other interrupt driver in the Annotator-Desk task 20. It takes an IBM scan code and maps it into a modified ASCII format used by the task 20. The ASCII format of Annotator-Desk task 20 consists of the character set published in IBM's technical reference with the following changes:

characters Hex13–17 are used for Left Arrow, Right Arrow, Up Arrow and Down Arrow; and characters HexB0–FF are used for Function Keys and HELP and CANCEL keys.

Just like the Tablet driver or module, the Keyboard driver or module calls a key function upon receipt of a keystroke. The current key function procedure is used to change the key function called upon receipt of the next keystroke. The default key function emulates the keyboard handler used by MS-DOS. The Keyboard module's mapping tables are totally reconfigurable. The actual ASCII data output from a given keystroke can be changed by re-writing the 2 KiloByte mapping table. An application can even remove the arrow and function mappings. The flexibility of the mapping tables provide the ability to handle a variety of alphabets and usages, such as international needs.

In the illustrated embodiment of FIG. 3, a main working portion of the Tablet driver is referred to as a tablet function (tabfun) dispatcher 66, and a main working portion of the Keyboard driver is called the keyfun dispatcher 64.

As mentioned earlier, the Listener subroutine 45 (FIG. 9) stops the running of the first program in order for the annotator application routine to be run. Before doing so, the Listener 45 must determine whether the user is indeed invoking the annotator. In making this determination, the Listener assumes that it takes the user more than 25 milliseconds to pick up the stylus 14 and place one of the ends of the stylus within proximity on the tablet 16 in a ready-to-annotate position. The Listener 45 watches for data packets delivered from the Tablet module on a schedule of about every 25 msecs. The Listener 45 runs intermittently with the first program without that program's knowledge and uses the interrupt and pseudo-multitasking capabilities of the Tablet module to examine what the user is doing with tablet 16 and stylus 14, if anything.

Figure 9:
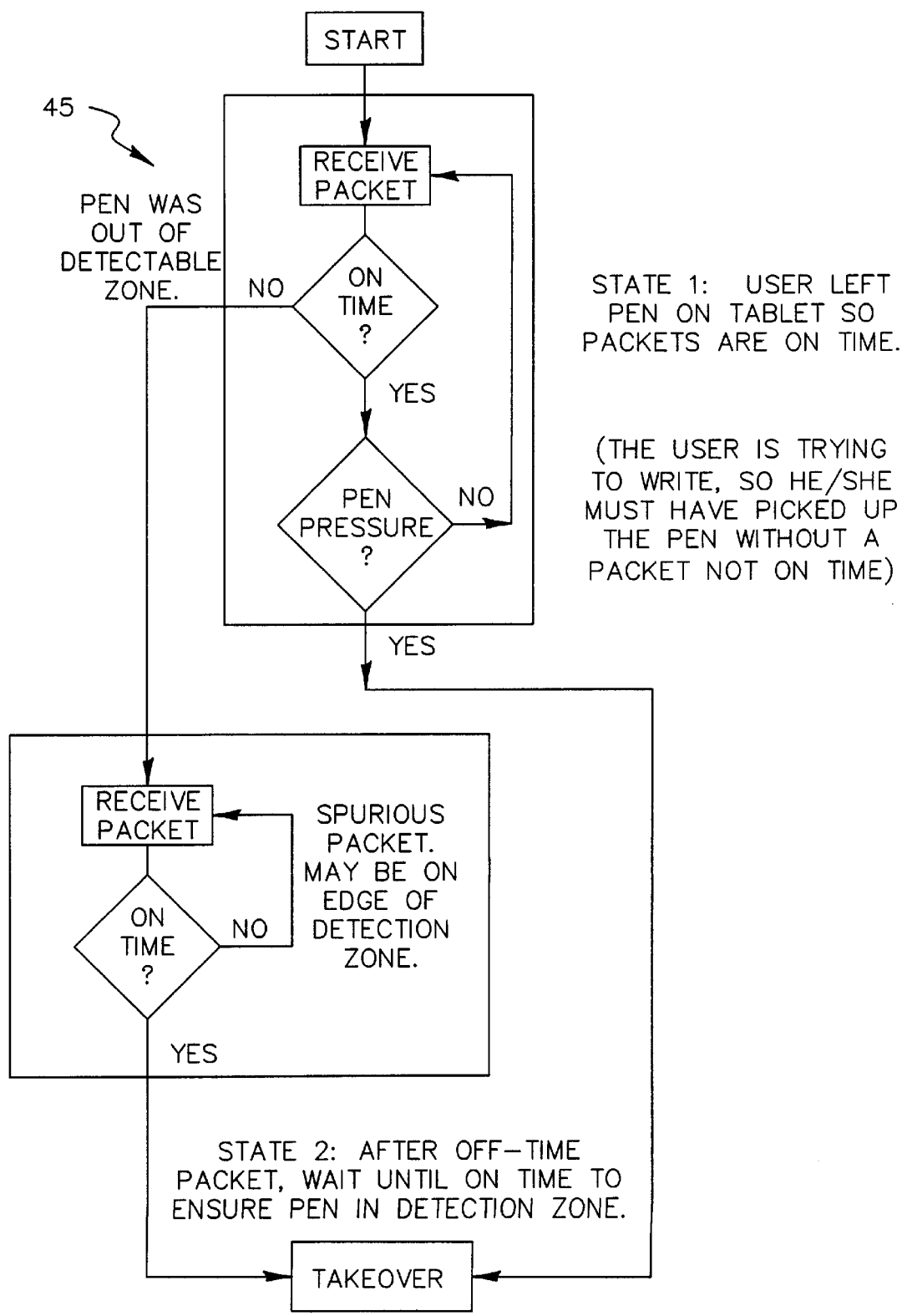

During the first of such interruptions, the data packet formed by the Tablet module is received and tested by the Listener 45 for timeliness with respect to the 25 millisec schedule as shown in FIG. 9. As long as the stylus 14 lies on the tablet 16, the packets of data are sent and received "on schedule" indicating the x, y, z, pressure and which-tip-end coordinates relative to the position of the stylus 14 on the tablet 16. When the stylus 14 is lifted by the user's hand out of sensing range of the tablet (about 10 mm to about 20 mm), no signals are transmitted from the tablet 16 to the Tablet module. In turn, there is a break in the schedule of data packets received by the Listener subroutine 45. From the break in schedule, the Listener 45 determines that there is now an "off schedule" situation and that the stylus 14 has been moved out of proximity of the tablet 16. A count of time during which the stylus 14 remains "off schedule" is begun. When the stylus 14 is initially off the tablet 16, then the absence of data packets being sent by the tablet module is initially interpreted by the Listener subroutine 45 as an "off schedule" situation and a count of time is immediately started.

During the interruption where the data packet is determined to be off schedule, the Listener 45 returns control of the operating system to resume running the first program and waits for a data packet which is on schedule. When the user places the stylus 14 in writing or erasing position back into proximity of the tablet 16, causing an interrupt, the Tablet module collects and formats the data points into a data packet which is sent to the Listener 45. In the case where the stylus 14 was initially on the tablet 16 and moved off the tablet, the Listener 45 in accordance with the 25 millisecond assumption compares 25 milliseconds to the amount of time that has lapsed between the last on-schedule data packet and the current on-schedule data packet as counted during the "off-schedule" period to determine whether the user is ready to write/erase and the stylus 14 is to be turned on. In the case where the stylus 14 began in a position outside of the sensing range of tablet 16, the counted time is compared with 25 milliseconds. If the amount of time that has lapsed or the counted time is greater than 25 milliseconds then the Listener 45 decides that the user is ready to annotate.

During the initial interruptions in which the data packet is "on schedule", the Listener 45 tests the pressure and z-axis coordinates to determine which end the user is holding in proximity of the tablet 16 and whether the user is ready to use that end. The z-axis coordinate is checked to determine whether the stylus end is within the predetermined proximity of the tablet surface. If the measured pressure of the sensed stylus end is greater than a predetermined minimum pressure level, then the Listener 45 decides that the user is trying to write or erase with the stylus 14. In such a case, no data packet is found to have been off schedule for longer than 25 milliseconds thus the user picked up the stylus 14 without removing it from the sensing range of tablet 16, and the Listener 45 decides that the user is ready to annotate.

The sensing of pressure in combination with the 25 millisecond off-schedule timing and on-schedule proximity to tablet 16 is used by the Listener subroutine 45 to determine whether the user is ready to act with the stylus 14. The z-axis (altitude above the tablet 16 ) is sensed so that the Listener subroutine 45 can anticipate the illumination of a view on the screen display by the time that it is determined that the user is ready to act with the stylus 14. That is, the Listener subroutine 45 senses the z coordinate to anticipate the stylus 14 being placed in ready position so that the Listener subroutine 45 may exhibit a view on display unit 18 at the earliest possible moment to signify to the user that the annotator is invoked.

A pressure measurement alone is not sufficient to test the readiness of the user because the user may be causing pressure at one end of the stylus 14 without holding the stylus in a ready position on the tablet 16 and without placing pressure on the tablet 16 with one end of the stylus 14. Also the combined use of the z and pressure coordinates substitutes for the pen tip switch used in prior known electronic pens.

Once it is decided that the user is ready to annotate and that one end of the stylus 14 is on or in proximity of the tablet 16 then the Takeover subroutine 49 is executed.

Figure 10:
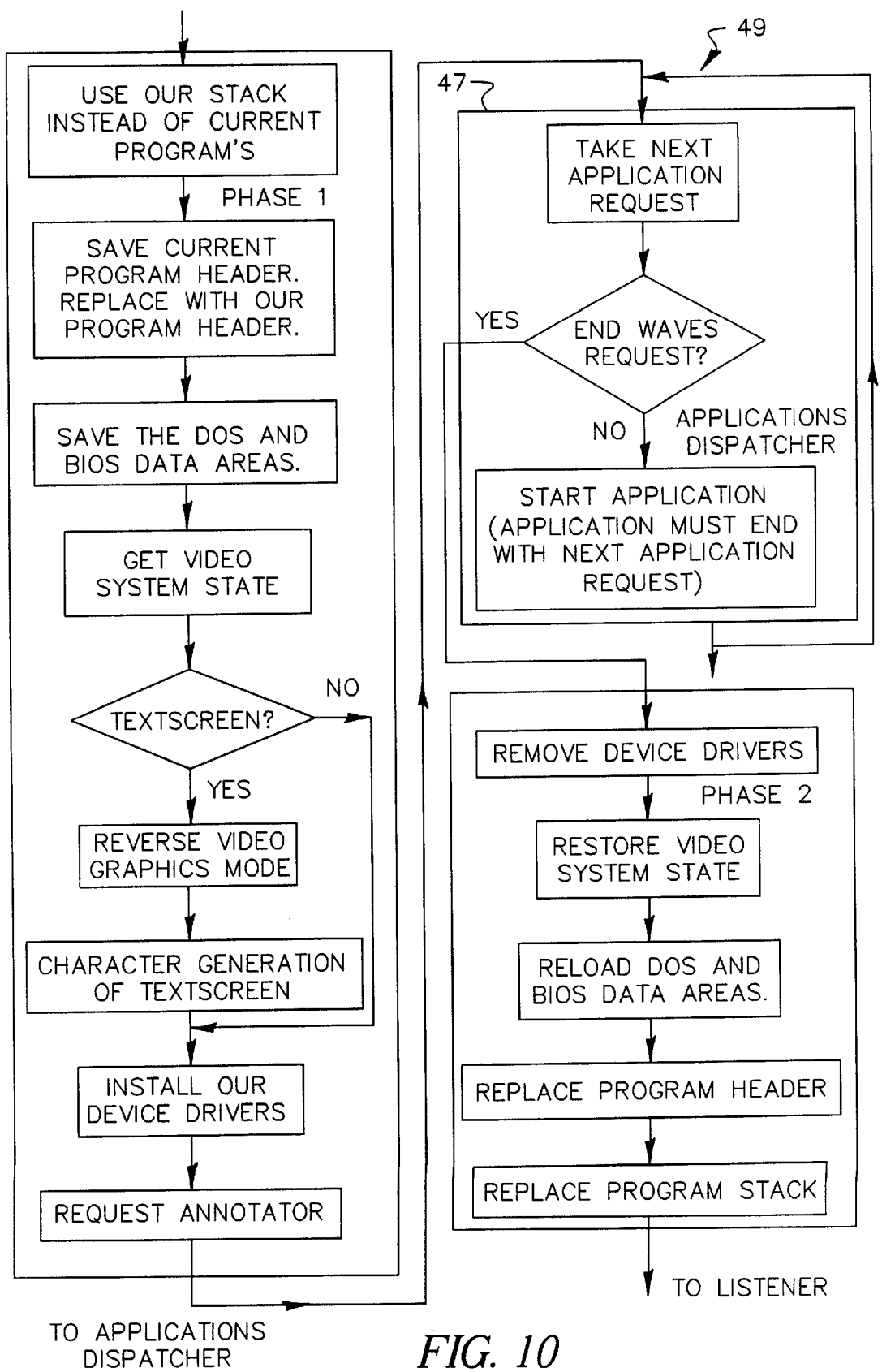

An overview of the Takeover subroutine 49 is provided in FIG. 10. In a first part of the Takeover subroutine 49 called Phase 1, all operating system information needed to restore the first program at the point of interruption is saved and is replaced with the necessary information for running the Takeover subroutine 49 and associated application routines. The step of saving information includes changing memory stacks to prevent overwriting any data of the first program, saving BIOS data area which low level calls use as scratch space and the operating system critical section which the operating system uses as scratch space. Also, during Phase 1, the Takeover subroutine 49 saves the program header of first program and the address of the disk transfer area, and replaces the first program header with the program header for the Takeover subroutine 49. The Takeover subroutine 49 then copies a perfect image of the area of the first program which is being interrupted. The perfect image of that area is saved in a remote memory storage.

In an end portion of Phase 1, the Takeover subroutine 49 prepares the current display in view 26 for annotation in the invoked annotation session. To do this, if the current display is in a text mode then the Takeover subroutine 49 reverses the relative lighting between the background and print so that the background is light and the print is dark. The display is changed to a graphics mode, and a character generation program is used to convert the text print into graphics. The Takeover subroutine 49 also saves in an original screen buffer 57 (FIG. 3) an original copy of the current display view, in its text form in the case where it was displayed in text mode. The original copy is held in the original screen buffer 57 until use at the end of the annotation session. Takeover subroutine 49 next installs the Voice, Keyboard and Network Communications drivers. The Annotator-Desk task 20 always has the Tablet and Timer drivers loaded since they are needed by the Listener subroutine 45. Upon completion of Phase I, the Takeover subroutine 49 releases the interrupt controller to enable subsequent interrupts to transfer more data points from the tablet 16 via the Tablet driver.

The Takeover subroutine 49 then calls an Applications Dispatcher 47 which oversees all application routines of the Annotator-Desk task. The Applications Dispatcher 47 uses a set of codes agreed upon by all applications to determine which application routine is to be executed. There are also a set of shared variables to allow applications to leave messages for other applications.

As shown in a middle section of FIG. 10, the Applications Dispatcher 47 gets an initial start code which requests the annotator from Takeover subroutine 49 and causes the operating system to perform the annotator application routine. An application can have more than one start code so that it can be told to perform a different task within the application routine. When an application routine finishes, it returns to the Applications Dispatcher 47 the code for the next desired application as indicated by the user through a selection of the "go to desk", "ruled paper" or "blank paper" option of the pop-up menu 78 (FIG. 3). The Applications dispatcher 47 continues to execute application routines of respective applications until the code returned by an application routine tells the Applications Dispatcher 47 to end. In the illustrated embodiment, the code is generated upon the user selecting the "all done" option of the menu 78. When the code to end is returned to the Applications Dispatcher 47 by an application routine, the Applications Dispatcher 47 sets a Done flag, saves all the data generated by the execution of the applications routine, and passes control to Phase 2 of Takeover to prepare to bring back the first running program.

In Phase 2, the Takeover subroutine 49 performs the reverse of what it did in Phase 1. The Takeover subroutine removes the Keyboard, Voice and Network Communications drivers; restores the video state of the screen display; replaces the program header of the first program; reloads the BIOS data and critical section of the operating system; and replaces the program stack of the first program. Control is returned to the operating system to resume executing the first program from the point of interruption.

As mentioned above with reference to the middle section of FIG. 10, the initial start code to the Applications Dispatcher 47 requests the Annotator Application routine. Upon receipt of this start code, the Applications dispatcher 47 calls the Annotator Application routine 58 illustrated in FIG. 11. In the prologue of the Annotator Application routine 58, the Clock/Timer of system 20 is set to zero and a variable describing the type of paper (ruled, blank) being annotated is set.

As shown in FIG. 10, during the prologue the annotator application routine 58 also directs a screen manager to copy the first view displayed on the display unit into an erase buffer 42 and opens three files, one for information from the tablet 16, one for information from the keyboard 12 and one for information from the audio assembly 24 to be stored on disk 43. The Annotator Application routine 58 then creates a superfile 88 for the document of the annotation session if a superfile 88 for the document doesn't already exist. The Annotator Application routine 58 next initializes the tabfun dispatcher 66 and keyfun dispatcher 64 of FIG. 3 by respectively providing initial names of a tablet function 62 and a key function 68 for processing input data from the tablet 16 and keyboard 12 respectively. In particular, the tabfun dispatcher 66 is initialized to point to a tablet function 62 called notefun dispatcher 75, and keyfun dispatcher 64 is initialized to point to a key function 68 called knotefun dispatcher 77. Notefun dispatcher 75 and knotefun dispatcher 77 are particular to the annotator where other tablet and key functions 62, 68 are particular to the system desk and desk view of FIG. 2f. The notefun and knotefun dispatchers 75, 77 oversee a group of note functions 72 and a group of keyboard note functions 74, respectively, which process the data input through the tablet 16 and keyboard 12 respectively. The notefun dispatcher 75 and knotefun dispatcher 77 have formats similar to the tabfun dispatcher 66 and keyfun dispatcher 64 illustrated above. Hence, the notefun dispatcher 75 provides a state machine approach to processing input from the tablet 16 during an annotation session, and the knotefun dispatcher 77 provides a state machine approach to processing keystrokes input through keyboard 12 during the annotation session.

The Annotator Application routine 58 may at any time provide a new procedure name to the tabfun dispatcher 66.

Figure 11:
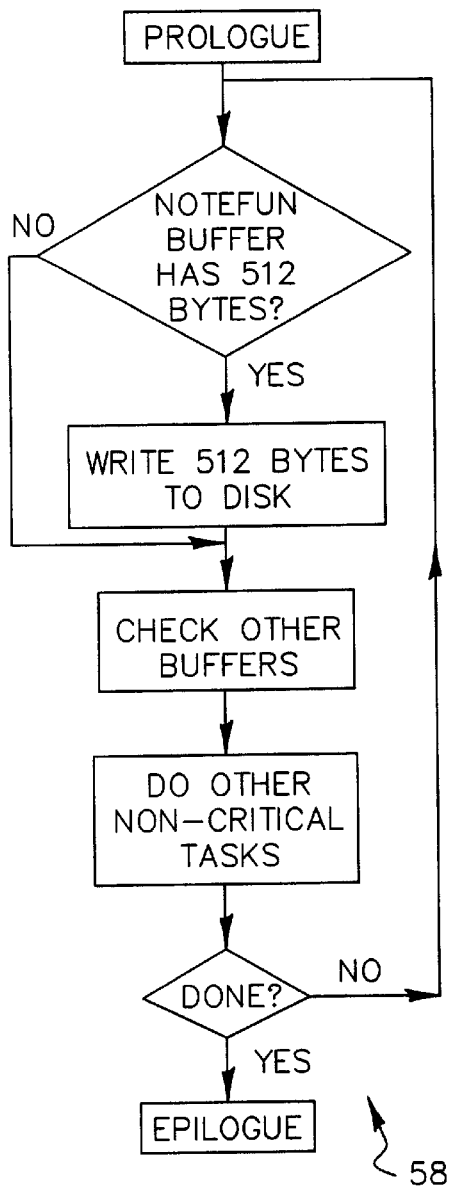

The heart of the Annotation Application routine is referred to as the Supervisor 58 in FIG. 3 and is shown in more detail in FIG. 11. The supervisor 58 is a loop which checks the tablet buffer 52, keyboard buffer 54 and voice buffer 56 for full disk sectors of information. If one of these buffer has 512 bytes of stored data then it is considered to have a full sector and that portion is written to a corresponding file in Disk 43. The loop continues until the Done flag is set.

Annotations input through tablet 16 by a user causes interruptions to the execution of this loop. In each interruption activated by the tablet 16, the Tablet module collects the data points indicative of an annotation from the tablet 16. In turn the tabfun dispatcher 66 passes control to tablet function notefun dispatcher 75.

Similarly data from keyboard 12 connected to the operating system through interrupt controller supplies input for the execution of the keyfun dispatcher 64 pointed to by a corresponding pointer in the interrupt vector table. The keyfun dispatcher 64 in turn passes control to the key function knotefun dispatcher 77 which subsequently calls keyboard note functions 74 and therewith processes keystroke input.

Preferably, a voice routine, corresponding to the audio assembly 24, for processing voice input is a separately running process which does not take processing time from processor 22 (FIG. 1a) and is already asynchronous.

Figure 12:
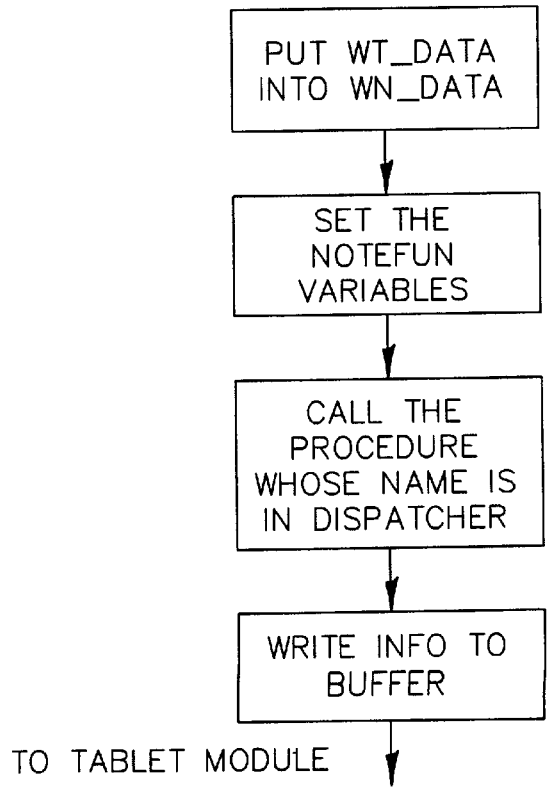

The notefun and knotefun dispatchers 75, 77 operate in a similar manner which is outlined in FIG. 12 and illustrated in FIG. 3. For simplicity, the notefun dispatcher 75 is directly referenced in the following discussion but it is understood that the knotefun dispatcher 77 operates in a similar manner with a respective keyboard driver, keyfun dispatcher 64, keyboard note functions 74, key buffer 54 and key file 46.

Upon being called by the operating system through the interrupt vector table, the tabfun dispatcher 66 sets variables which are commonly used throughout the running of the tabfun dispatcher 66 to indicate the current state. Included in the status of the current state are indications of which end of stylus 14 is being used, whether the user has just pressed down or picked up and end of the stylus 14, and the time of arrival of the data. These characteristics are held in a common, shared area.

The tabfun dispatcher 66 passes control to the notefun dispatcher 75. The notefun dispatcher 75 receives the data packet WT_Data from the tabfun dispatcher 66 and renames the data packet as WN_Data. The notefun dispatcher 75 places the WT_Data packet of the most recent data into the common area which is shared by the tablet and note functions 62, 72 that are called by the tabfun and notefun dispatchers 66, 75, respectively, to process input data from the tablet 16. The notefun dispatcher 75 employs the anti-skip routine on the WN Data packet of the most recent data to determine the position of the stylus 14 and to determine what the user is doing with the stylus 14. The notefun dispatcher 75 then calls the note function 72 whose name is given to the dispatcher initially by the prologue of the annotator application routine and subsequently by the last called note function 72 (FIG. 3).

The data packet is then processed by the note function 72 which is called by the notefun dispatcher 75. Of the note functions 72 which may be called, each processes the data in a particular way and then decides whether the note function name referenced in the notefun dispatcher 75 needs to be changed based on the state information held in the common shared area so that the notefun dispatcher calls the correct note function 72 to process the next data packet. In addition to processing the data, each note function 72 also provides the information to the screen manager 60 which subsequently updates the view on display 26 according to the information. The notefun dispatcher 75 subsequently writes the information of the data packet to a tablet buffer 52 which is common to all the tablet functions 72.

Updating the view is made a top priority and occurs every 5 msec with each data packet of information. As previously stated, when the common buffer has a sector full (512 bytes) the Supervisor 58 copies the contents of the buffer to the tablet file 44 in disk 43. Because the Supervisor 58 depends on the buffers 52, 54 and 56 and is independent of the various working procedures (i.e. note functions 72 and keyboard note functions 74) and the screen manager 60, the time lag in writing to disk 43 (i.e. disk respond/wait time) does not interfere with the updating of the view 26 on display 18 nor the processing of data. Instead, priority is given to each procedure to process the data within five millisecond time segments. Only the Supervisor 58 is then burdened with waiting for the disk 43 in order to write to disk. Further, this arrangement as shown in FIGS. 11 and 12 enables the writing to disk 43 to be done simultaneous with the displaying of the data in view 26.

Voice/audio information is transferred by the audio assembly 24 from the user directly to a voice processing procedure 76 which digitizes and compresses the voice/audio information and writes the compressed information to an associated voice buffer 56 as shown in FIG. 3. The Supervisor 58 in turn manages the writing of this information from the voice buffer 56, when a sector full exists, to a voice file 48 on disk 43.

In the illustrated embodiment, there are at least six note functions 72 included in the tabfun dispatcher routine 66, pen-up, pen-down, erase-up, erase-down, menu loop and move typewriter marker. The keyboard note functions 74 employed in the keyfun dispatcher routine 64 include routines for handling arrow keys on the keyboard 12 which provide screen navigation, tabs, function keys on the keyboard 12, carriage returns and actual text to be displayed on the screen. The routine for handling the latter, the one of the keyboard note functions 74 known as the character handler, is the routine responsible for building new local grids, updating the x and y nodes and updating the grid buffer 89 (FIG. 4). It also handles the erasure or overstriking of typed test through the backspace key of keyboard 12. The voice input is provided directly to a working procedure called the voice handler 76 discussed later.

The three inputs—the tablet 16, keyboard 12 and audio assembly 24 are processed effectively simultaneously by the respective dispatchers and procedures and by the Supervisor 58. Data which is entered from the tablet 16 has the form of seven 8-bit data packets as previously described. Subsequently, the data from the tablet 16 is digitized and transferred to the tablet buffer 52 at a resolution of about 1000 dpi. When that information is transferred to the tablet buffer 52, it is in the form of two stable values (the x and y coordinates) and a delimiter which has three parts, a code for what coordinate was changed, the new value and the time of that change. More specifically, the delimiter is used in the case where there has been no data for some predetermined amount of time or a switch in stylus-end being used, then a timemark and, if applicable, information regarding the change in stylus-end are written in the delimiter.

Information which is transmitted through the keyboard 12 is in ASCII character form. When that information is transferred to the keyboard buffer 54 it is in the form of absolute time (or change in time) and an ASCII character. Specifically, a timemark is written to the keyboard buffer 54 upon detection of the first keystroke. The keystrokes thereafter are stored with an absolute time at which the keystroke occurred in the case of slow typing or with an interval of time detected between strokes in the case of fast typing.

Figure 13:
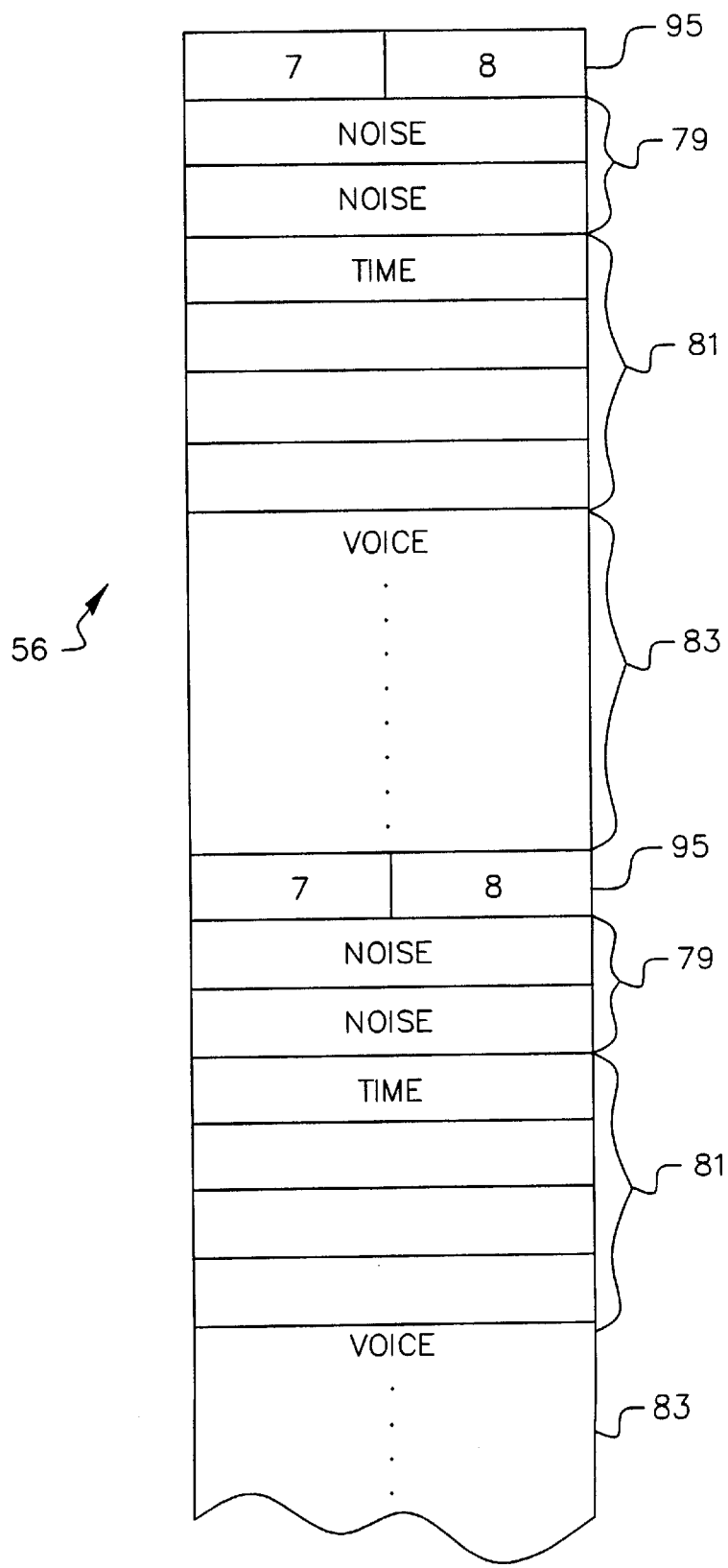

The voice/audio information is recorded in the voice buffer 56 in a manner which enables synchronized replay with the recorded strokes and gestures of the stylus 14 and the recorded keystrokes input through keyboard 12. Further, unlike existing voice recording devices, the voice information is recorded and saved in a fashion which compresses moments of silence or noise to avoid inefficient use of memory storage space on meaningless data. Although the actual samples of a silence period are useless, the length of the silence period is needed for synchronization of the voice/audio information with visual annotations during playback. Silence compression and synchronization in the illustrated embodiment is implemented by an encoder 85 and decoder 87 in the voice handler 76 of FIG. 3 and by voice buffer 56 shown in FIG. 13 and discussed next.

A starting time of each voice segment 83 (i.e. segment of meaningful audio information) is recorded in a four byte timemark 81. In addition to indicating the time at which a voice segment 83 begins, the timemark 81 determines the termination time of a preceding silence period and thus the length of that silence period. Because the timemarks 81 provide an exact start time of each voice segment 83, as opposed to a length of time or time differential, timing errors during replay are limited to a single voice segment and are prevented from propagating and accumulating. Specifically, once the decoder 87 (FIG. 3) begins replaying a voice segment 83, the decoder 87 does not interrupt the voice segment to recover any timing error. Instead, recovery for a timing error occurs during the following silence period, and the succeeding voice segment 83 begins at the time indicated by the respective timemark 81. Preferably, the host system clock is used as a unique reference of time for the tablet digitizer and the voice digitizer, timemarks 81 in voice buffer 56 being relative to the beginning of that clock.

When a decrease in volume energy is sensed for greater than a preset amount of time, for example about 0.1 second, before a successive increase in volume energy, the encoder 85 (FIG. 3) records in voice buffer 56 a reserved code 95 indicating the end of a voice segment 83 followed by a two byte code 79 of the current noise level and the timemark 81 of the next voice segment. In the illustrated embodiment, the reserved code 95 is one byte long and has values seven followed by eight. This code is not allowed for the voice segments 83 and is always followed by a noise code 79 and timemark 81. During the recording of a voice segment 83, the encoder 85 receives digitized voice codes representing the voice/audio information and prevents a seven followed by an eight from being recorded. If an eight is currently being saved in a voice segment 83, the encoder 85 checks the previous recorded voice code. If the previous voice code is a seven, then the eight is minimally changed to a new value and the new value is saved in the byte where the eight would have been recorded. Such a minimal deviation in actual voice code, plus the low probability of obtaining a seven followed by an eight voice code and the sampling of four bits 8,000 times a second enables integrity of the voice/audio information to be maintained.

During a sensed silence period, the encoder 85 saves a background energy level of that silence period in noise code 79. Preferably, the encoder 85 determines the existence of a silence period by comparing a long term average of sensed energy level to a short term average of sensed energy level. The long term average is a moving average over several samplings and represents detected background noise. The short term average represents the current local energy level. If the long term average equals the short term average then there is a silence period. The energy level is measured and saved in noise code 79 for that silence period.

The decoder 87 during replay checks for the reserved code 95. Each time the reserved code 95 is detected the succeeding noise code 79 is decoded and subsequently used to determine the volume of the silence period. The decoder 87 employs an artificial noise generator to provide noise at the determined volume until the start time of the next voice segment 83 as indicated by the timemark 81. At the start time of the voice segment, the decoder 87 decodes the voice codes recorded in voice segment 83 and generates the voice/audio information through audio assembly 24. Thus, the decoder decides when and how to generate the artificial noise and the voice information without instructions from the host.

The foregoing arrangement reproduces voice/audio information in a more natural sounding manner without actually recording samples of the silence periods. To make the reproduced voice information sound more natural but without recording the silence samples, the decoder inserts an artificial noise in the silence periods instead of a period of absolute silence because human ears are sensitive to abrupt absolute silences between voice segments. The absolute silences make the voice segments sound like separate pieces rather than a message from a single recording. This is due to the background noise and reverberations which are overwhelmed by the voice level but become noticeable as a continuation between voice segments. In addition, the level of the noise is calculated during recording as described above and on replay provides a more natural sounding message with respect to volume.

In the illustrated embodiment, long periods (greater than about ¼ sec) of user inactivity are similarly detected by decreased energy level signals and non-meaningful stylus and keyboard signals. During replay, processor 22 extracts these relatively long periods of inactivity to produce a more flowing view of the annotations input through the stylus 14, keyboard 12 and audio assembly 24 as discussed later.

As shown in FIG. 3, the screen manager 60 utilizes a screen buffer 40 which holds a working bitmap copy of the document being annotated. This bitmap holds the image currently displayed to the user and is updated by the screen manager 60 in accordance with the newly received information/data of each data packet.

The Supervisor 58 also analyzes the amount of time between data points. Once the Supervisor 58 detects a lull in new data, for example due to a user pausing after having inserted all desired annotations, the Supervisor 58 then invokes a menu routine. This is accomplished by the Supervisor 58 providing the menu routine name to the tabfun dispatcher 66. The tabfun dispatcher 66 calls the menu routine. The menu routine directs the screen manager 60 to display in the view 26 a pop-up menu 78 which provides the choices of:

go to desk,
blank paper,
ruled paper,
erase notes,
playback,
shrink menu,
hide ruler,
all done.

If the "go to desk" choice is made by the user "touching and lifting" one end of stylus 14 on the corresponding position of tablet 16, the menu routine sets the Done flag to signal to the Supervisor 58 that the user is finished with the current annotation session. After the Done flag is set and the Supervisor 58 detects the Done flag, the Supervisor 58 is exited and the epilogue of the annotator applications routine is entered. Execution of the epilogue places the dispatchers 66, 64 for the tablet and keyboard and the voice handler 76 in an idle loop so that they no longer process further input data, and closes tablet, keyboard and voice files 44, 46, 48 to disk 43. The Annotator Applications routine 58 then looks at and makes a note of the previously set paper variable to see the type of paper on which the user has been annotating.

The Annotator Applications routine 58 then makes a request to the screen manager 60 (FIG. 3) to put a copy of the working bitmap for the last view shown to the user from the current screen buffer 40 into intermediate file 84 and the original view information in the original screen buffer 57 into original screen file 86. If the original view was from a text mode display then the ASCII characters are saved in a 4K file. These characters are resolution independent and may be printed at any resolution by a printer. If the view screen was from a graphic mode display, then just the bitmap of video buffer is saved in a 32K file.

The epilogue of the annotator applications routine then tells the screen manager 60 to make a shrunken image of the last view displayed at the end of the annotation session and to store it in a stamp file 80. The annotator application routine then completes the superfile 88 (or updates an existing superfile 88) for the document which was annotated during the session. In the superfile 88, the Annotator Application routine 58 provides an indication of the kind of view (paper) that was annotated, the last open page of the document, the page number of the document which was annotated, whether the keyboard 12 was used, whether the eraser end 28 of the stylus 14 was used, whether voice was used and whether the writing tip end 30 of the stylus 14 was used. The superfile 88 also includes the names of the files for the tablet, keyboard and voice files as described previously. If the annotation session created a brand new document then the superfile 88 indicates that fact. After execution of the epilogue of the Annotator Applications routine 58 control is returned to the Application Dispatcher 47 (FIG. 10) with a code to perform the desk application routine.

If the "blank paper" or "ruled paper" options are chosen by the user from the menu 78, then the Supervisor 58 saves all the annotation work done so far in the current session and provides a new annotation session with a fresh view through the screen manager 60 (FIG. 3). The fresh view displays either a blank paper or paper with lines, respectively.

In response to the "erase notes" option, the Supervisor 58 deletes all annotations inputted so far in the current annotation session and provides the initial view of the document from the beginning of the annotation session through the screen manager 60. Conveniently, the erase buffer 42 holds a bit map of the desired initial view of the document and may be copied to the current screen buffer 40 to provide the "erased" view of the document free of any annotations inputted thus far in the current annotation. The "shrink menu" option of the pop-up menu 78 enables the user to prevent the menu 78 from interfering with the rest of the images displayed on the screen 18.

The "hide/show ruler" menu option enables the user to either prevent display of or cause redisplay of an indicator of the left and right margins and tabs of the document. Any such indicator, or ruler as is known in the art, is suitable but is preferably provided through a handler routine similar to the character handler both of which are keyboard note functions called by the knotefun dispatcher 77.

In response to the user selecting the "playback" menu option, the Supervisor 58 provides all files generated from annotation sessions of the document, as indexed by the superfile 88 of the document, to the notefun dispatcher 75, knotefun dispatcher 77 and voice handler 76 (FIG. 3). This causes the screen manager 60 to replay through screen display 18 a timed sequence of the origination of the document and all annotations made to it thus far at the pace in which such annotation was originally inputted by the user.

The "all done" option on the pop-up menu 78 provides the same supervisor routine as in the "go to desk" option but control is returned to the Applications Dispatcher 47 with a code, in which the Done flag is set, to return to the first program that the operating system was running before the annotator was invoked. The Applications Dispatcher 47 interprets the code, saves all the information generated by the annotation session and passes control to Phase 2 (FIG. 10) of the Takeover routine as described previously.

Software for Erasure

In order to erase what was currently written during an annotation session, the Supervisor 58 copies an image of the view into the erase buffer 42 at the beginning of the annotation session. During the pen-up and pen-down procedures 72 (FIG. 3), the procedure provides the screen manager 60 information regarding a starting point and an ending point of a stroke of the stylus 14 and a color (i.e. black or white) of any annotation to the document which was generated by that stroke. Similarly, during the erase-up and erase-down procedures 72 (FIG. 3), the procedure tells the screen manager 60 a beginning and an ending point of an eraser path by which any portion of penned annotations that intersect the path are determined to be "erased". During erasure, the screen manager 60 looks to the saved bitmap in the erase buffer 42 to determine what originally existed between the two specified points. The screen manager 60 replaces all points between and including the specified points with the corresponding original bits saved in the erase buffer 42. Next the screen manager 60 reconstructs in real time all typed annotations within the eraser path. This is accomplished by first determining the x-y coordinates of the eraser path, then searching the linked list of x and y nodes to determine which typed characters either intersect or are currently defined within the eraser path, and accessing through the grid buffer 89 the ASCII codes of the affected typed characters. Screen manager 60 quickly rewrites the characters into view 26 with no discernible flicker.

If the paper variable is set to white paper or ruled paper, then the screen manager 60 does not refer to the erase buffer 42. Instead, white pixels are displayed along the eraser path defined between the ending and beginning points of erasure, and in the case of the ruled paper, the ruled lines are reinstated on otherwise blank background. Typed annotations within the eraser path are then reconstructed as described above.

Replay or Printing

During printing or playback of the annotation session, a print application routine or playback application routine respectively is used. The respective application routine provides the notefun dispatcher 75 with an initial note function 72 name and opens the appropriate files 44, 46, 48 on disk 43. Within the application routine, an event manager reads the tablet, keyboard and voice files 44, 46, 48 generated for the document. The event manager decides which data came first according to the time headings stored in each file with each block of data. The blocks of data are then placed in respective data packages and given in order of time to the proper dispatcher (i.e. notefun or knotefun). The information is then inputted through the respective dispatchers 75, 77, subsequently processed by corresponding functions employed by the notefun dispatcher 75 and knotefun dispatcher 77, and displayed on screen display 18 as directed by the screen manager 60 or printed on a connected printer as directed by a printer manager 59 (FIG. 3) of the application routine.

Thus playback, printing and annotation is done from the same working procedures (i.e. note functions 72, keyboard note functions 74), dispatchers 75, 77 and files to disk 43. This is made possible due to the fact that the applications using the information in the files have to do tasks similar to those performed in the annotation routine. For example, when a user is annotating, the notefun dispatcher 75 provides a state machine in which an input packet (WT_Data) results in a line drawn in the screen view 26. This is also true when a user is viewing playback. If the playback application routine passes the notefun dispatcher 75 a WT_Data packet, all else being the same, the notefun dispatcher provides the drawing of the same line in the screen view 26. In the printing application, the desired result is that the line be drawn at the printer. This is realized by the application routine sending information to the printer instead of making an explicit call to the Graphics module to draw the line. Hence replay and printing of the document and annotations thereto are accomplished in a time sequence of the annotations as originally input by the user and not in spacial order relative to the document.

In addition, during replay, relatively long periods of inactivity from the user not inputting any annotations through the stylus 14, keyboard 12 and audio assembly 24 are extracted to provide a more flowing representation of the creation and annotation of the document. Such extraction is accomplished by the event manager or other processor means detecting the relatively long periods of inactivity through the recorded timemarks in the tablet, keyboard and voice files 44, 46, 48 and processing the recorded annotation data which is next in time instead of the noise data of the detected period of inactivity.

The Desk View

As illustrated in FIGS. 2f–2k, the desk view 32 is central to the various tasks and applications of the system 20 and serves as the visual portion of the interface between the user and digital processor 22. In an illustrated embodiment, the desk view 32 provides a user's system desk 36 which represents the computer work area of the user and appears as the background of the desk view 32. On the system desk 36, the desk view 32 provides miniaturized images or stamps 34 of various documents which have been created and/or annotated by the annotation capabilities of system 20, some documents of which originated from a screen capture of the view displayed during interruption of a program. Although the stamp representations of the documents are specifically similar to icons, the stamps 34 are more functional and informative than icons. In particular, various direct treatment and direct manipulation of stamps 34 in desk view 32 are accomplished by applying the different stylus operations to the stamps.

For instance, the full-screen image of a document may be viewed on screen 26 from the desk view 32 by selection of the corresponding stamp 34. Selection of a stamp 34 during the desk view 32 is accomplished by the touching and lifting of one end of stylus 14 on the tablet position which corresponds to a position within bounds of the corresponding stamp 34 in the desk view 32. Upon completion of the touch and lift operation of the stylus 14, a full screen view of the document is displayed on display unit 18. Thereafter the document may be annotated in full screen view by the stylus 14 operated in its writing and erasing manners, by the keyboard 12 and by audio input through the audio assembly 24.

Also the stamps 34 of a user's documents may be directly moved around on the system desk 36 by the user operating the writing tip end 30 or eraser end 28 of stylus 14 in the "touch and move" manner with respect to any region within bounds of the stamps 34 shown in FIG. 2g. That is, to reposition stamp 34, the user points with and places an end 28, 30 of the stylus 14 on a position on the tablet surface which corresponds to a position on or enclosed within border 35 of the desired document stamp 34 as displayed in the desk view 32, drags the stylus end 28, 30 across the surface of the tablet 16 to the desired position on the tablet 16 which corresponds to the desired ending position in the desk view 32, and removes the stylus end 28, 30 from the tablet surface.

During the dragging of the stylus end 28, 30 across the tablet surface, the display unit 18 shows the stamp 34 of the desired document being moved from its initial position, through various intermediate positions, to the desired position on the system desk 36 in correspondence with the dragging of the stylus end 28, 30 across the surface of the tablet 16. When the user lifts the end 28, 30 of the stylus 14 off the surface of the tablet 16, the user stops operation of the stylus in the "touch and move" manner and thus ends the ability to move the document stamp 34 on the system desk 36.

Preferably, the cursor 301 depicting a close fisted hand is illuminated adjacent one side of the document stamp 34 by which the stamp appears to be moved as shown in FIG. 2g. The close fisted hand cursor 301 and adjacent document stamp 34 move in the same pattern along the desk view as the writing tip end 30 or eraser end 28 moves along the tablet surface.

By multiple use of "touch and move" operation described above, document stamps 34 may also be stacked in certain desired groups established by the user. Within a stacked group of stamps 34, a stamp 34 may be automatically brought to the top of the stack by a touching of a stylus end on the tablet position which corresponds to a visible portion (i.e. not hidden within the stack) of the stamp 34. Selection of the stamp 34 on the top of the stack, by the previously described touch and lift method of use of the stylus 14, provides a full screen view of the document represented by the stamp 34.

In stacking the stamps 34, if the outer edges of the borders 35 of any two partially stacked stamps are within a predefined distance apart from each other then processor 22 automatically aligns the two stamps to form an aligned stack 171 shown in FIG. 2g. Any other stamps 34 placed on stack 171 within the predefined border edge limits are also automatically aligned with the rest of the stamps in stack 171. Other aligned stacks 171 may be similarly formed.

An aligned stack 171 behaves somewhat like a single stamp. Specifically, movement of the whole stack 171 is accomplished by the touch and move operation of the stylus 14 on side regions 173 of the aligned stack, and selection of the top stamp 175 of the stack provides a full screen view of the associated document. The stamp 175 on top of the aligned stack 171 is the only stamp in the stack which may be selected and/or removed from the aligned stack 171 by the operations of the stylus.

The graphical representation of the automatic aligning of stamps 34 is referred to as "snapping to" because the stamps within the predefined side region limits of each other appear to cooperate with each other in a manner which quickly positions one exactly on top of the other. As the stack 171 grows, incremental offsets between stamps of the stack are provided to provide a 3-D illustration of the stack.

Figure 2H:
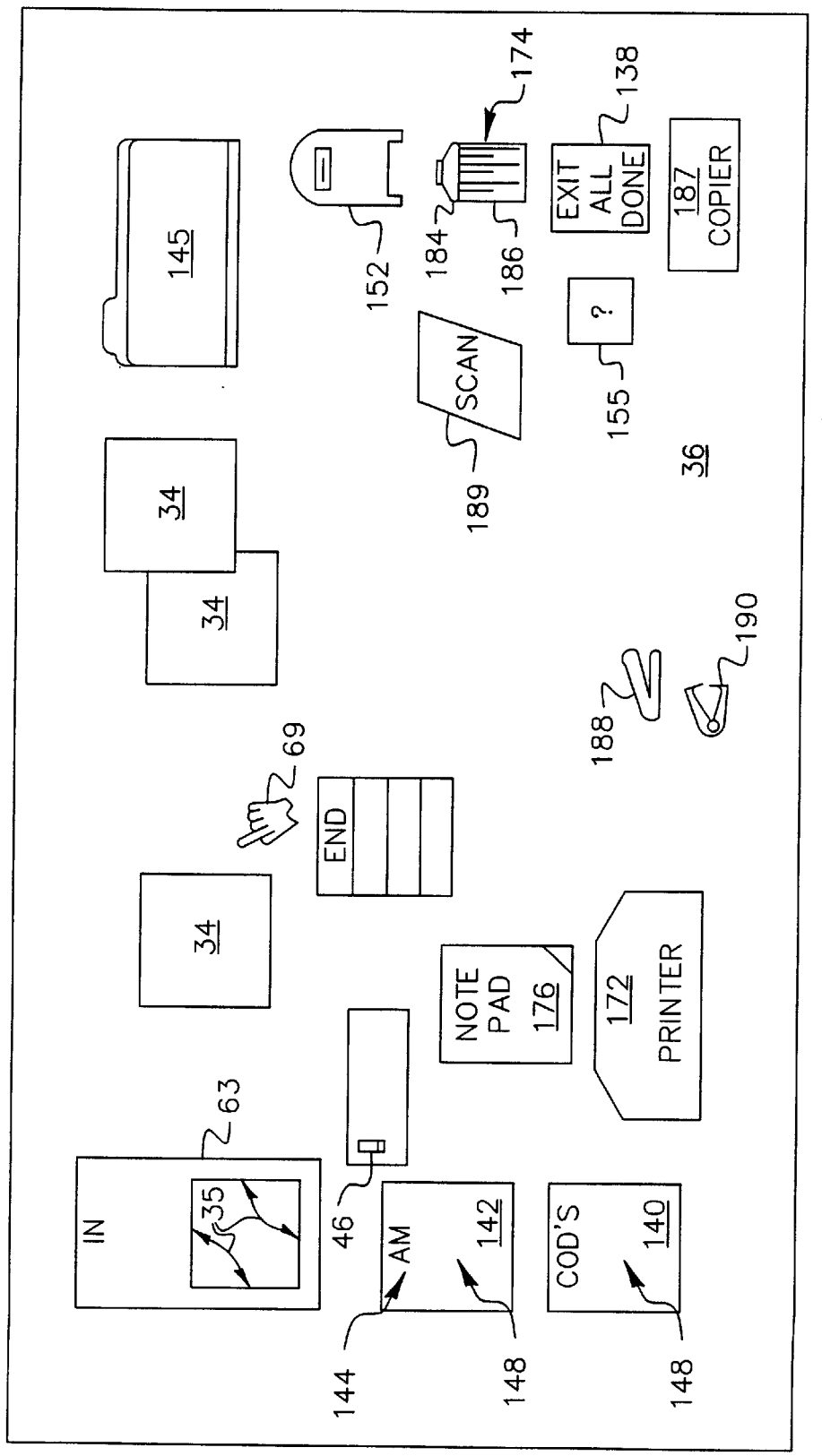

In addition to the various stamps 34 of documents, the desk view 32 provides indications of various depositories for documents, and various accessories which represent operations of processor 22 that the user can elect to perform from the user's system desk 36 as described later. One depository is preferably labelled the "In Box" 63 and serves as a tray for receiving all new documents created by the user and any mail sent to the user by electronic mail as shown in FIG. 2h. The In Box is globally known and is interfaced to the preestablished electronic mail system, and thus accessible for mail purposes throughout a network of terminals to which system 20 belongs. Common addressing techniques are used.

The user-owner of the system desk 36 may establish other trays on the system desk 36 in two types. Both types of trays, active and passive, hold stamps 34 selected by the user and provide means for organizing items, especially stamps 34, on the system desk 36 as shown in FIG. 2h. An active tray 140 may be accessed throughout the network of terminals which communicate with the local terminal 10 of the user-owner. Hence, active trays 140 may hold items provided to the local user by other users. Each active tray 140 is labelled with a user specified name which is recognizable to other users throughout the network. Processor 22 accordingly provides a globally accessible address which corresponds to the named tray.

For each active tray 140, the user-owner of the active tray specifies to the processor 22 the other users which are authorized to access the active tray. In addition, the user-owner specifies desired automatic processes and particular rights of each chosen user of an active tray 140. The automatic processes enable the selected users to alphabetize, chronologically order or otherwise manipulate the contents of a respective active tray. The user-owner specifiable rights enable the selected users to access respective active trays in various manners. In particular, "put rights" are specified to the processor 22 to enable a selected user to add items to a certain active tray 140. "Take rights" are specified to enable a selected user to retrieve items from a certain active tray 140. "Inquiry rights" are specified to enable a selected user to ask and obtain information about the contents of a certain active tray 140. "Rights to copy" are specified to enable a selected user to obtain a copy of the current contents of a certain active tray 140. One or a combination of the foregoing automatic processes and/or rights may be specified for each user per active tray 140.

Typical data structures and control means are employed by the processor 22 to determine which users have what automatic processes and/or rights to each active tray 140. Upon establishment of an active tray 140, the users enabled to access the tray and the automatic processes and/or rights of each selected user, and the name of the active tray 140 is automatically (i.e. by processor means) listed in each selected user's electronic phone book listing. Preferably the name of the active tray 140 and the specified automatic processes and/or rights to the tray for the specified user is listed under the name of the user-owner of the active tray 140. Several names of active trays, each with several chosen rights, may thus appear in the specified user's phone book listing under other users' names.

In contrast to the active trays, a passive tray 142 may be accessed only by the user of the local terminal 10. A user establishes a passive tray 142 by providing a local name, that is one which is not known throughout any network of terminals.

As shown in FIG. 2h, all icons of the trays (In-Box 63, active trays 140, passive trays 142) generally appear to be rectangular in shape with a central region 148 for receiving document stamps or other items. Another portion 144 of the rectangular shape provides a writing surface or labelling area for a desired name to be inserted. In the case of passive trays 142 the user is able to directly write with the stylus 14 or to type with keyboard 12 in the labelling area 144 a desired name for the tray. Preferably, a touch and lift use of the stylus 14 on a position on tablet 16 corresponding to a position on the labelling portion 144 initiates a window process for labelling the tray 142. The window is preferably the size of the label portion 144. Within the initiated window, a pencil tip or eraser cursor is displayed and a subsequent scribing motion of the writing tip end 30 on the tablet position corresponding to the labelling portion 144 of the tray generates the user chosen name of the tray on that portion of the tray in the user's handwriting. Similarly, by positioning a typing cursor 163, with the touch and move method of use of the stylus 14, on the labelling portion 144 and thereafter typing the tray's name via keyboard 12 produces a typewritten version of the tray's name on the labelling portion 144. Further, a combination of typing through keyboard 12 and writing with stylus 14 to produce the tray's name on the labelling portion 144 of the tray may be used. Stylus markings or portions thereof may be erased by rubbing eraser end 28 of stylus 14 on the tablet position corresponding to the desired stylus markings or portions thereof in desk view 32. A menu-pick from a menu associated with the window enables termination of the window process initiated to label the tray and returns the user to the desk view 32 with the tray labelled as desired.

In addition, for each tray icon 63, 140, 142, any portion of the tray which is not covered by any stamp or item being held by the tray, is used to reposition the tray on the user's system desk 36 by the touch and move operation of the stylus 14, in the same manner that a stamp 34 is repositioned. It is understood that if the tray is holding a stamp or other items, the contents move with the repositioning of the tray as expected with an everyday tray holding papers on a office desk. Such repositioning of the tray 140, 142, 63 with the stylus 14 is distinguished from the scribing on the tray with stylus 14 due to the regional part of the tray icon on which the user acts with the stylus 14. Further, when a user manually retrieves a stamp 34 from a tray using the touch and move operation of the stylus 14 on the stamp 34, the user must operate on or within the stamp border 35 to move the stamp 34 out of the tray (FIG. 2h). Processor 22 recognizes such retrieval of a stamp 34 from a tray to be different than the repositioning of the tray holding the stamp 34 by the stylus operating on the stamp 34 versus a visible portion (i.e. uncovered) of the tray.

Figure 2I:
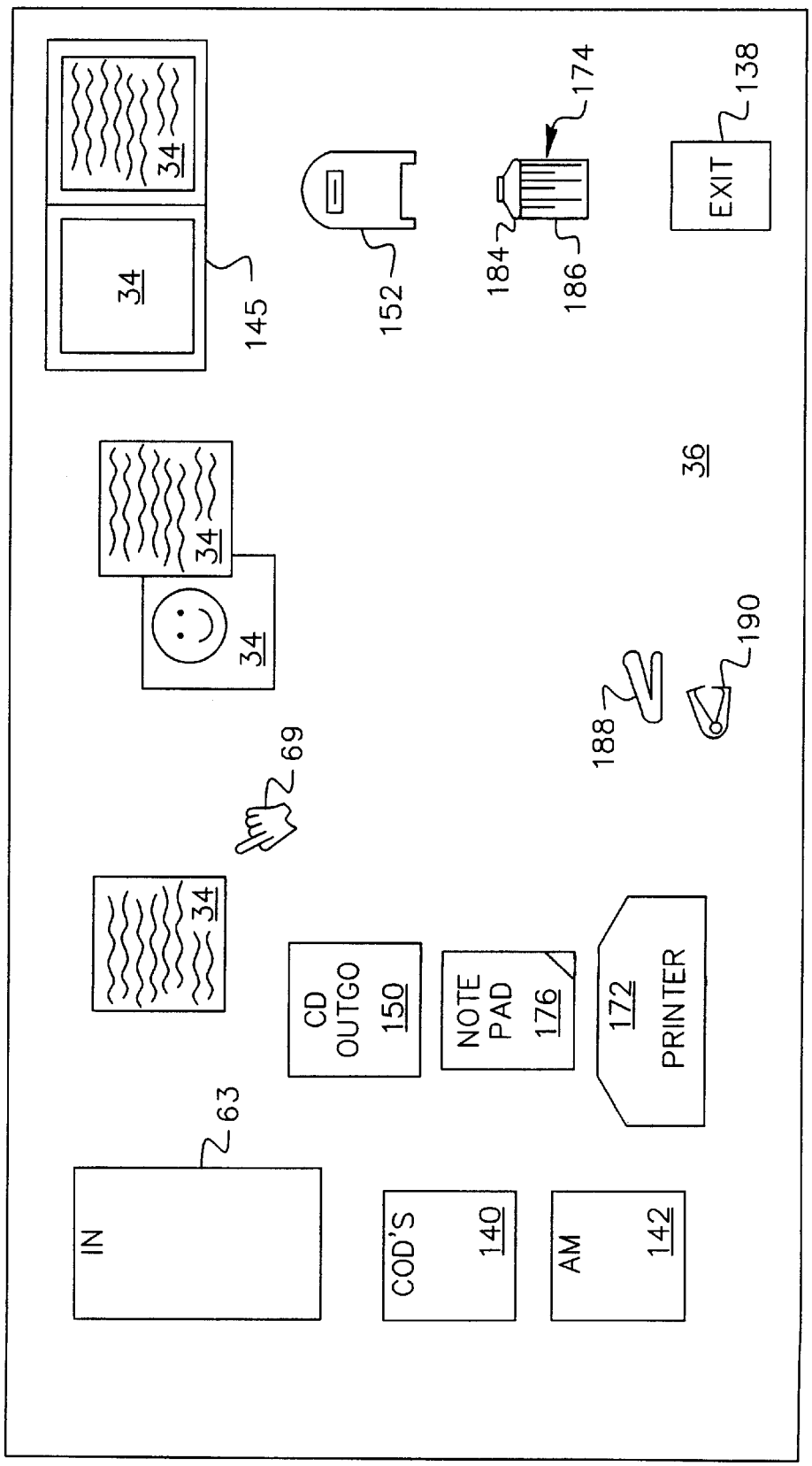

Other stamp holding elements may be used in lieu of or in combination with the trays 140, 142. For example, folders 45 may be used to similarly hold stamps in a user desired order as illustrated in FIG. 2i. A touching and lifting of the stylus 14 on a labelling portion of a folder 145 initiates a window process for labelling which is similar to that described above for trays 142. A touch and lift of the stylus 14 on a remaining portion of the folder 145 selects the folder such that the folder opens and displays the stamps contained therein. The stamps 34 may be moved from a front side up position on the right side of the open folder to a front side down position on the left side of the folder by the touch and move operation of the stylus 14 on the stamps 34 in the folder 145. Such operation of the stamps 34 in the folder allows the user to scan through the stamps while maintaining the order of the stamps. This feature mimics the familiar actions used with actual papers which are to be kept in a desired order within a folder or the like. With the touch and move operation of the stylus, other stamps may be added to a desired side of the folder 145 automatically assuming a respective front side up or front side down position to further ensure maintenance of the desired order. Stamps 34 when removed from the folder 145 assume a front side up position to enable individual display in the desk view 32. The folder 145 is closed by a touch and lift of the stylus on a visible portion of the inside of the folder. The folder, opened or closed, is repositioned in the desk view 32 by the touch and move operation of the stylus 14 on the remaining (i.e. not labelling) portion of the folder 145.

Other depository areas in desk view 32 are designated by icons labelled with names of other users in communication with the terminal 10 of the user. These named depository icons 150 serve as outgoing mail drops for the user to send documents to a particular user as illustrated in FIG. 2i. To send documents to other users who do not have an associated named depository on the user's system desk 36, the pre-existing electronic mail system of a network of terminals is used. An icon representing a mailbox 152 provides the user with the services of the electronic mail system.

To mail a document to a user through a named depository icon 150 or to request the services of the electronic mail system, the user uses the "touch and move" method of use of the writing tip end 30 or eraser end 28 of stylus 14 on the position on the tablet 16 which corresponds to a position on the stamp 34 of the document desired to be mailed. The user moves the stamp 34 of the desired document and places the stamp on top of the named depository icon 150 or on top of the mailbox icon 152 in the desk view 32. When the user lifts the stylus end 28, 30, the processor 22 performs the electronic mailing accordingly using known electronic mail methods.

Figure 2J:
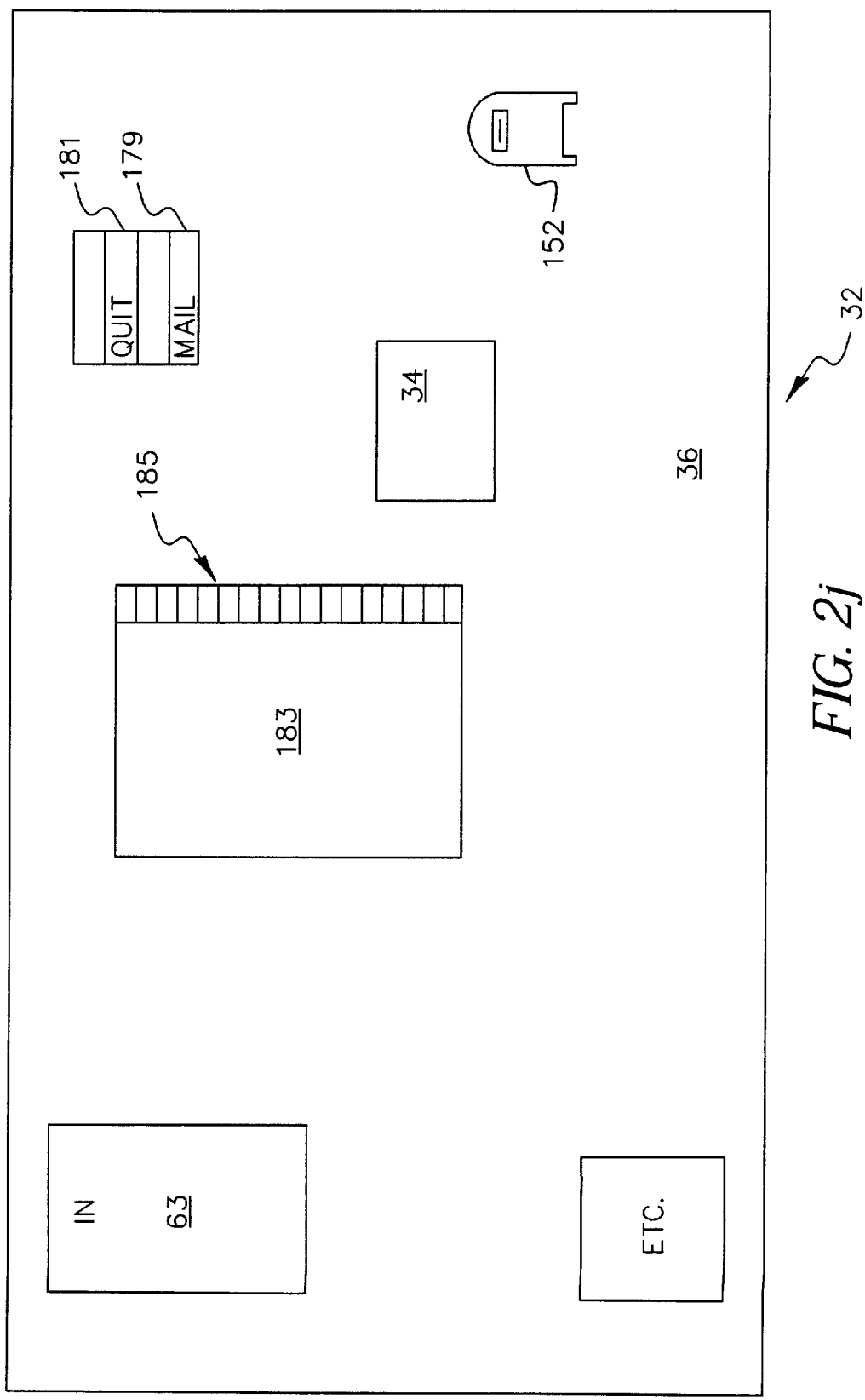

In the embodiment, the leaving of a stamp 34 on the mailbox icon 152 activates a send-mail routine which provides a graphical interface in the form of an address book 83 shown in FIG. 2j. The address book 183 serves as a workstation directory of all users of the system 20 of FIG. 1a or of a network of such systems. When the send-mail routine is activated, processor 22 exhibits an illustration of a common address book 183 with lettered tabs 185 arranged in alphabetical order along one side of the address book 183. To select a recipient of the document represented by the stamp 34 used to activate the send-mail routine, the user opens the address book 183 to the name of the desired recipient. This is accomplished by the user touching and lifting an end of stylus 14 on the tablet position which corresponds to the screen position of the lettered tab 185 that indicates the first letter of the last name of the desired recipient. Upon such action, the selected tab 185 is illuminated in reverse video form to indicate to the user that the letter indicated on tab 185 has been selected. The names of potential recipients/users of the system 20 whose last name begin with the chosen letter of the alphabet are displayed along with their phone number and names of any of their trays to which the user has access.

The user selects a recipient's name, from the displayed page in the opened address book 183, by the touch and lift use of one end of stylus 14. To aid in eye-hand coordination during selection with the stylus 14, the area displayed around a listed name is illuminated in reverse video form when the stylus end is positioned near the tablet position which corresponds to the listed name. Once a listed name is chosen, an asterisk appears beside the listed name. In the same manner, the user may choose other recipients to simultaneously receive the document of the subject stamp by changing pages and choosing desired names on various pages in address book 183. A recipient may be unselected in the same manner as he was selected. Further, an option 181 to quit/send no mail is available at all times to allow the user to cancel the mailing process. After all desired recipients have been chosen, a final touch and lift use of the stylus 14 to select a send mail option 179 enables the mailing process to be executed.

In the embodiment, it is valuable to be able to mail a document comprising text, graphics, images, written annotations and voice data between different workstations or terminals 10. At each workstation 10, system 20 employs a router routine for packing and transferring files associated with a stamp of a document from the terminal 10 to a network server or pertinent device drivers. The router routine packages, in a predefined format which is acceptable by the network server or device drivers, the necessary files which include an index file, image data file, graphics file, text file, and written annotations and voice data files. The index file holds the addresses of the desired recipients. The router routine transfers the formatted package to the network server along with the addresses of the chosen recipients. The pre-existing electronic mail program, in communication with the network server, recognizes the transferred package and recipient addresses, and subsequently delivers the files of the document to appropriate trays (i.e. In Box 63 or named active tray 140) on the system desks of the chosen recipients.

The address of a chosen recipient may be a network memory address, a facsimile number, a PC Local Area Network number, a PBX identification number, and/or a standard data modem address. In the case of a facsimile address, the router routine converts text files and annotations from vector to raster image form during packaging due to the image—only handling requirement of facsimile machines.

In the same manner, system 20 at each workstation 10 employs the router routine for receiving and unpacking mail sent to the local user. In particular, the router routine prompts the user of the incoming mail and the line over which the mail is being sent to system 20. The router routine then provides necessary handshaking and timing protocol between the systems 20 network server or device driver servicing the sending party over a PC LAN or network line. When the sending party is communicating over a facsimile line no such handshaking is possible, hence image data is sent without delay to facsimile machine coupled to system 20. Upon receipt of the incoming package, the router routine obtains from the received package the necessary files associated with the subject document, and subsequently places the files in local memory. The stamp representing the received mail is displayed in the In Box 63 in the desk view 32 of the receiving user to indicate to the user that new information is available from his system desk 36.

To further provide the user with a graphical indication of the processor 22 sending mail and/or receiving mail, an image of a mailbag may be exhibited during execution of the router routine for each document mailed or received. The mailbag is illustrated with the insertion or removal of pieces of paper, each representing a different file associated with a document, to provide an indication of the number of files of each document.

In order to implement communication through facsimile from the system 20, a facsimile modem card is coupled to the processor (e.g., a personal computer) which the supports workstation terminal 10 (FIG. 1a) or a stand alone facsimile machine is interfaced with the workstation digital processor 22. With either configuration installed at a first and second, or more, workstations 10, the first and second workstations 10 are able to communicate with each other via facsimile. The data able to be communicated in this case is not just image data. Instead voice data, text data, image data and all written annotations of a document are able to be sent back and forth between the two workstations 10 through the respective facsimile machines. This is accomplished by the network server or device driver communicating with the modem of the facsimile machine and thus bypassing the original manufactured facsimile protocol which requires that only machine recognizable images be sent and/or received.

In addition, communication by a user from a remote facsimile to his workstation 10 is made possible by the foregoing configuration. Communication is initiated by a specially designed instruction page illustrated in FIG. 14. The user completes the instruction page by supplying the number of the remote facsimile which he is using and the desired commands such as "send messages in In Box". Once completed, the instruction page is sent through the remote facsimile to the facsimile coupled to the user's workstation 10. The router routine at the user's workstation 10 is programmed to recognize the special instruction page, and thereafter packages the specified commands from the instruction page into proper form for processing by processor 22. In turn, processor 22 searches the specified desk item or system desk 36 and obtains the requested documents or manipulates the specified documents as requested.

In the case of a command to retrieve certain documents, the router routine packages the data obtained from processor 22 with the remote facsimile number which was previously provided by the user on the instruction page and transmits the data to the remote facsimile. The user at the remote facsimile subsequently receives the documents he requested on the instruction page.

It is understood that various and numerous commands may be similarly communicated to the user's workstation 10 from the remote facsimile. Examples of the variety of commands and thus extensive control over the user's system desk 36 are instructions for rearranging the items in the desk view 32, instructions for retrieving documents of stamps in the desk view 32, instructions for providing a current image of the desk view 32 to aid the user in deciding further instruction, and combinations thereof. Also the current image of the desk view 32 provided to the remote user from the workstation 10, may be return transmitted (i.e. from the remote user to the workstation 10) with further instructions from the user.

Also provided in desk view 32 as illustrated in FIG. 2h is "printer" icon 172. Using the touch and move operation of the stylus 14 on a stamp 34, the user moves the stamp 34 of the desired document and positions the stamp 34 on the printer icon 172. After the user moves the stamp 34 onto printer icon 172, and lifts the stylus end 28, 30 from the tablet surface, the processor 22 performs a routine to provide printing of the document represented by stamp 34 at a connected printer.

Figure 2K:
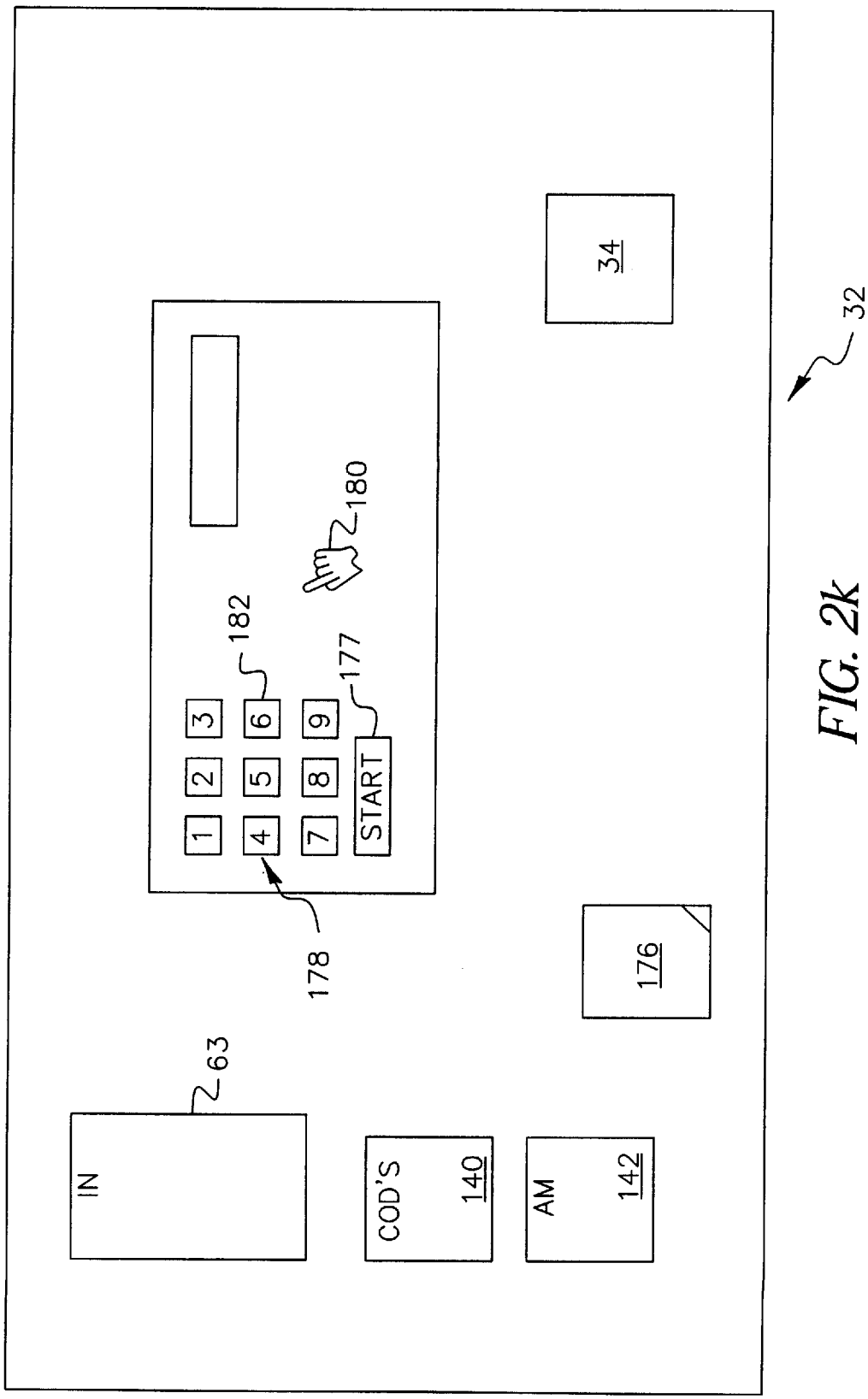

In the illustrated embodiment, an illustration of push button controls 178 commonly employed by typical photo copy machines is displayed to prompt the user to enter the number of copies desired to be generated as shown in FIG. 2k. To select a desired number, the user uses the "touch and lift" method of use of one end of the stylus 14 on the tablet position corresponding to the illustrated button 182 which designates the desired number of copies. A cursor 180 illustrating a hand with an extended index finger mimics the "touch and lift" motion of the stylus 14 and gives the illusion of the user depressing the desired button 182 as he normally would on a photo copy machine. After entering the number of desired copies, the user completes the request for document printing by touching and lifting the stylus end on corresponding start button 177. Upon completion of a request for document printing, the document is printed in paper form on a local printer connected to processor 22, and the corresponding stamp 34 is automatically returned to its position on system desk 36 prior to the request for printing.

Repositioning of the printer icon 172 in desk view 32 is accomplished by operating the stylus in the touch and move manner on any part of icon 172 similar to repositioning depository icons 150, 152 and/or stamps 34 in the desk view 32.

The copy machine icon 187 also illustrated in FIG. 2h operates in a manner similar to the operation of the printer icon 172 but provides a duplicate of a desired document through its corresponding stamp 34. Using the touch and move method of use of the stylus 14, the desired stamp 34 is moved onto printer icon 172. Upon the user lifting the stylus 14, the processor 22 provides the generation of a duplicate of the stamp positioned on the copy machine icon 187 and returns the stamp 34 to its position on system desk 36 prior to the request for copying it. The generated duplicate stamp is first displayed in the In Box 63 or underneath copier 187, or at another suitable position in the desk view 32.

Repositioning of the copier icon 187 is the same as repositioning the printer icon 172.

The trash barrel icon 174 provides means for disposing of documents as shown in FIG. 2h. Repositioning of trash barrel icon 174 is by a touching and moving use of the stylus on a base portion 186 of the icon which is preferably highlighted when pointed to by the cursor corresponding to the working end of the stylus 14. Disposing of a document is performed by placing a corresponding stamp 34 on the illustrated trash barrel 174 using the touch and move operation of the stylus on the desired stamp 34. Upon the user leaving the stamp 34 on the trash barrel icon 174, the processor stores the stamp accordingly. A subsequent positioning of the stylus end over the lid 184 of the trash barrel icon 174 causes the lid 184 to be highlighted to indicate to the user that a stamp has been disposed in the trash barrel. Removal of a disposed item is by the user touching a stylus end 28, 30 on a tablet position corresponding to the lid 184 of trash and moving the stylus end 28, 30 in contact with the tablet surface to a position which corresponds to an area outside of trash barrel 174. The last item to have been placed in the trash barrel 174 is the first item to be retrieved by the foregoing method. Other ordering of items for retrieval may be used depending on the data structure employed to implement the trash barrel 174 which is, in general, a disk storage area.

According to the foregoing, processor 22 must distinguish treatment through the lid 184 from that to the base 186 of trash barrel 174.

Other icons in desk view 32 provide processor operations to provide a new piece of paper (e.g. to create a new document) 176, to scan into system 20 a desired image 189 and to return to a working program 138 as shown in FIG. 2h. Selection of these operations is by the user touching and lifting one end 28, 30 of the stylus 14 on the position on the tablet 16 corresponding to the screen position of the respective icons 176, 189, 138. Further details of the processor operations for providing a new piece of paper and for returning to a working program are provided in the prior referenced U.S. patent application Ser. No. 200,091. The processor operation for scanning an image preferably operates a scanner coupled to processor 22 in workstation 10. The image being scanned may be displayed on display unit 18 during the scanning. Upon completion of the scanning a menu pick or other means allows the user to return to the desk view 32 with a stamp of the scanned image delivered to the In Box 63.

As shown in FIG. 2h, the desk view 32 also displays an icon 155 for providing information particular to the document corresponding to a desired stamp 34. The icon 155 is moved to the desired stamp with the touch and move operation of the stylus 14. Upon releasing the icon 155 on the stamp 34, the processor 22 generates text stating who has annotated the document, when and the basic contents of the annotations, and thus the history of the compiling of the document. The icon 155 thereafter is automatically returned to its position before it was moved to the desired stamp.

Icon 155 may be repositioned in the desk view 32 like the above mentioned icons and stamps 34.

Two further accessories provided by the desk view 32 are a stapler 188 and a staple remover 190. Like the other accessories, icons of stapler 188 and staple remover 190 are repositionable by the touch and move operation of the stylus 14 and are operational by a positioning of the icon relative to a desired stamp. Both accessories operate in a similar manner and require their icons being moved to subject stamps 34 rather than the stamps 34 being moved to their icons for operation. Preferably, the user places an end of the stylus 14 on the tablet position which corresponds to the sides of the stapler icon 188 (or staple remover icon 190) and moves the stapler icon 188 (or staple remover icon 190) with the touch and move operation of stylus 14 to the previously stacked stamps 34 which represent the documents desired to be stapled (unstapled). In the case of stapling, the stamps are previously positioned by the user in an aligned stack in the order desired for stapling. In the case of unstapling, the stack of stamps holds stamps 34 in an order fixed by a prior stapling. Once the stapler icon 188 (staple remover icon 190) is positioned over the desired stack of stamps 34 to be stapled (unstapled), the user lifts the stylus end 28, 30 from the tablet surface. Upon the lifting of the stylus end the processor 22 staples (unstaples) the stamps 34 and corresponding documents. The stapler icon 188 (staple remover icon 190) is automatically returned to its position in the desk view prior to moving it to the desired stack of stamps.

Once stapled together, stamps 34 act as expected. That is, the stapled stamps move together and are able to be stacked with single stamps 34, stacked stamps 34 and/or stapled stamps. Newly unstapled stamps 34 return to their form prior to stapling. They may be single stamps or previously stapled stamps which may be further unstapled. Hence, the stamps behave in a manner which simulates the behavior of paper documents in everyday usage and the user interface of desk view 32 provides computer automation of everyday usage without complicated commands or complex user-to-computer protocol.

The foregoing has described specific accessories or processor operations provided in the desk view 32. In general, the accessories are of three classes of moveable icons: desk tools (e.g. stapler), applications activated with a document (e.g. mail, trash barrel), and applications activated without a document, (e.g. note pad, all done). However, other types of accessories such as facsimile transfer of documents may be included and similarly implemented.

Further, upon initiation of the system 20, the various icons corresponding to the different accessories may be prearranged along one or more sides of the system desk 36. Alternatively a default initial desk view 32 may contain the In Box 63 and a catalogue type interface with which the user places an order, that is selects, desired accessories. The icons of selected accessories appear in the In Box and are subsequently removed from the In Box 63 and arranged on the system desk 36 by the user operating the stylus 14 in the touch and move mode. In any case after initially obtaining accessory icons on the system desk 36, the icons may be subsequently rearranged by the user by the touch and move operation of the stylus 14. Also as described above, stamps 34 and trays alike may be rearranged by the user as he likes. Further, the desk view 32 maintains the new arrangement of items until the user rearranges the items again. Such freedom in repositioning items on the system desk 36, with the confidence that the items will stay in one arrangement until moved by the user, further enhances the simulation of a user's interaction with a common everyday desk.

Stamp Generation

Each stamp 34 is actually a reduced image of a page of the corresponding document which the stamp represents. In the illustrated embodiment, the original image (1024 pixels by 1024 pixels for example) of a document page is reduced by a factor of 8 to form a 128 pixel by 128 pixel stamp image. Reduction by a factor of other amounts would be suitable. Most importantly, the reduced image provides a sufficient portrayal of the corresponding document to be readily recognizable by the user upon a first glance with solid dark or light areas appearing solid and with thin lines and other details exaggerated so that they in fact appear in the reduced image. Such visual identification simulates the same in everyday interaction with a common desk.

In the case of black and white images, that is images formed of binary pixels which are either "on" (white) or "off" (black), the image could be reduced by simply creating a black (off) or white (on) pixel of the reduced image dependent on whether the number of black pixels in the corresponding block of pixels of the larger image exceeds some predefined threshold. However, more information can be retained to make stamps more recognizable by utilizing some form of contrast enhancement in the reduction process.

Figure 15A:
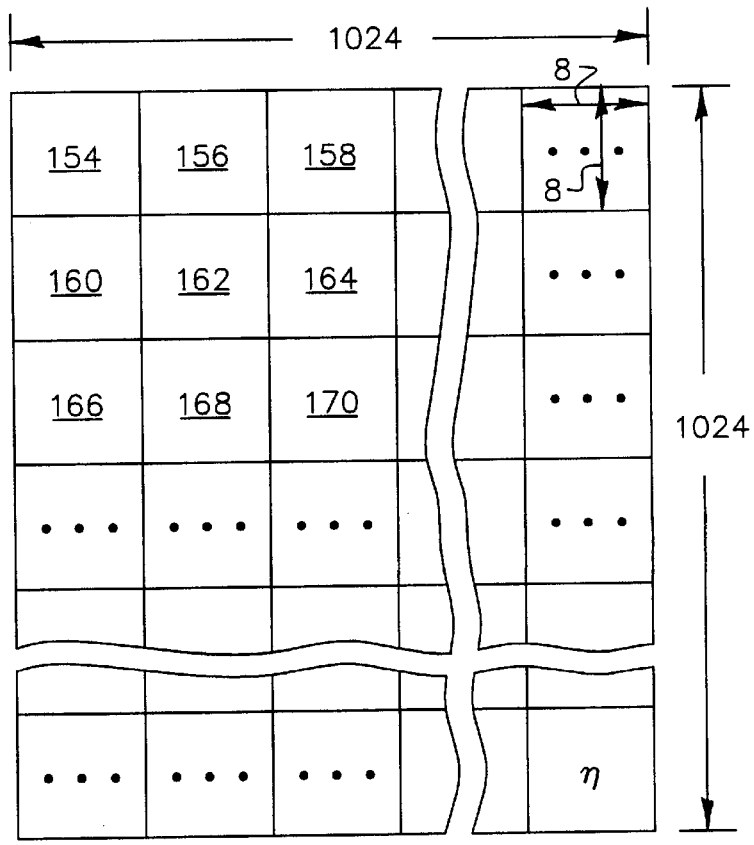
Figure 15B:
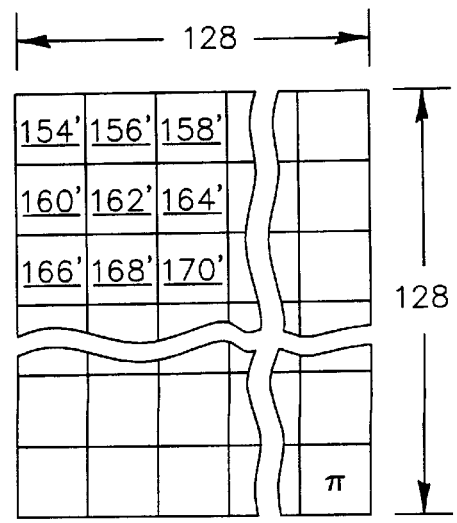

In such a case of black and white, binary pixel original images, the image reduction scheme employed by the present invention to form black and white stamps 34 is illustrated in FIGS. 15a and 15b. The original image 165 is partitioned into blocks 154, 156, . . . 170, . . . n, each of 8 original pixels by 8 original pixels (i.e. 64 original pixels per block). Each block 154, 156, . . . 170, . . . n corresponds to one pixel 154' . . . n' of the stamp image 34. For simplicity in illustration, the same reference numeral is used to label the 8×8 block of original pixels and the corresponding pixel of stamp 34 but the reference numeral is primed to indicate a stamp image pixel. It is understood that each block corresponds to a different stamp pixel and that each block of original pixels has a black count (i.e. the number of pixels whose state is black or "off") and a white count (i.e. the number of pixels whose state is white or "on") which together total 64. The relative counts (black count or white count) of the block of original pixels with respect to the average counts of adjacent blocks determines the state (i.e. black or white) of the corresponding stamp image pixel. Stamp image pixels which form the border of the stamp are all of the same state, preferably black.

In a specific example, the state of stamp pixel 162' is determined by the black or white count of corresponding block 162 relative to the average black or white count of adjacent blocks 154, 156, 158, 160, 164, 166, 168 and 170. The black or white count of corresponding block 62 is the number of black or white pixels, respectively, and the sum of the black and white counts is 64, the number of original pixels which compose block 162. Similarly, the average counts of the adjacent blocks 154, 156, 158, 160, 164, 166, 168 and 170 are determined by the average number of black pixels and the average number of white pixels in the blocks. Say for example, 11 of the 64 original pixels in block 162 are black and 71 of the original pixels throughout adjacent blocks 154, 156, 158, 160, 164, 166, 168 and 170 are black. Block 162 is then determined to have a black count which is greater than the average black count of the adjacent blocks which would need a total of 88 black original pixels (i.e. an average black count of 11 in each of the eight adjacent blocks) to match the black count of block 162. Corresponding stamp pixel 162' is thus assigned a state of black. In the same way, if the white count of block 162 were greater than the average white count of the adjacent blocks then corresponding stamp pixel 162' would be assigned a state of white. If the black or white count of block 162 matches the respective average black or white count of the adjacent blocks, then the state of corresponding stamp pixel 162' is black if the black count of block 162 exceeds a predefined threshold, for example 32. The state of each non-border stamp pixel is similarly determined from the black and white counts of a corresponding block of original pixels and blocks adjacent thereto.

Alternatively, the rule may be that the black or white count of a block of original pixels (e.g. block 162) must be greater than the respective average black or white count of the adjacent blocks (e.g. blocks 154, 156, 158, 160, 164, 166, 168 and 170) by a predetermined amount in order for the corresponding stamp pixel (e.g. pixel 162') to be black or white respectively. Where the relative count of the original pixel block (block 162) is not sufficiently greater than the average count of the adjacent blocks to follow that rule, the corresponding stamp pixel (pixel 162') is black if the black count of the respective original pixel block (block 162) equals or exceeds the white count of that block (block 162).

As previously mentioned, the foregoing image reduction scheme is particularly suited for original images 165 which are black and white as opposed to multicolored. In the case of a multi-colored, including a grey scale, original image, the following image reduction scheme is employed by the present invention. Although the following discussion specifically illustrates reduction of an RGB (red, green, blue) image, it is understood that a grey scale image may be likewise reduced where the byte value of a pixel indicates an intensity of brightness.

In a colored image, the coloring of each pixel is formed of a red component, a green component and/or a blue component in contrast to the binary state of black or white in the case of black and white images. Each possible or available pixel coloring, in system 20, formed by various combinations and amounts of red, green and blue is preferably represented numerically by a byte value typically in the range of 0 to 255 where an 8-bit byte is used to hold the byte value. Each of the 256 byte values and hence each pixel color available in system 20 is listed in a color lookup table which, for a given byte value, identifies the amount of red, green and blue in the color corresponding to the byte value. In addition, each subvolume of a regularized partitioning of color space, such as a 3-D color space having orthogonal axes representing intensity of red, green and blue, is mapped to one of the 256 byte values and hence one of the available pixel colors in system 20. Thus, from a desired set of red, green and blue values, an automated procedure can quickly determine the byte value whose lookup table color most closely matches the desired RGB combination.

Figure 15C:
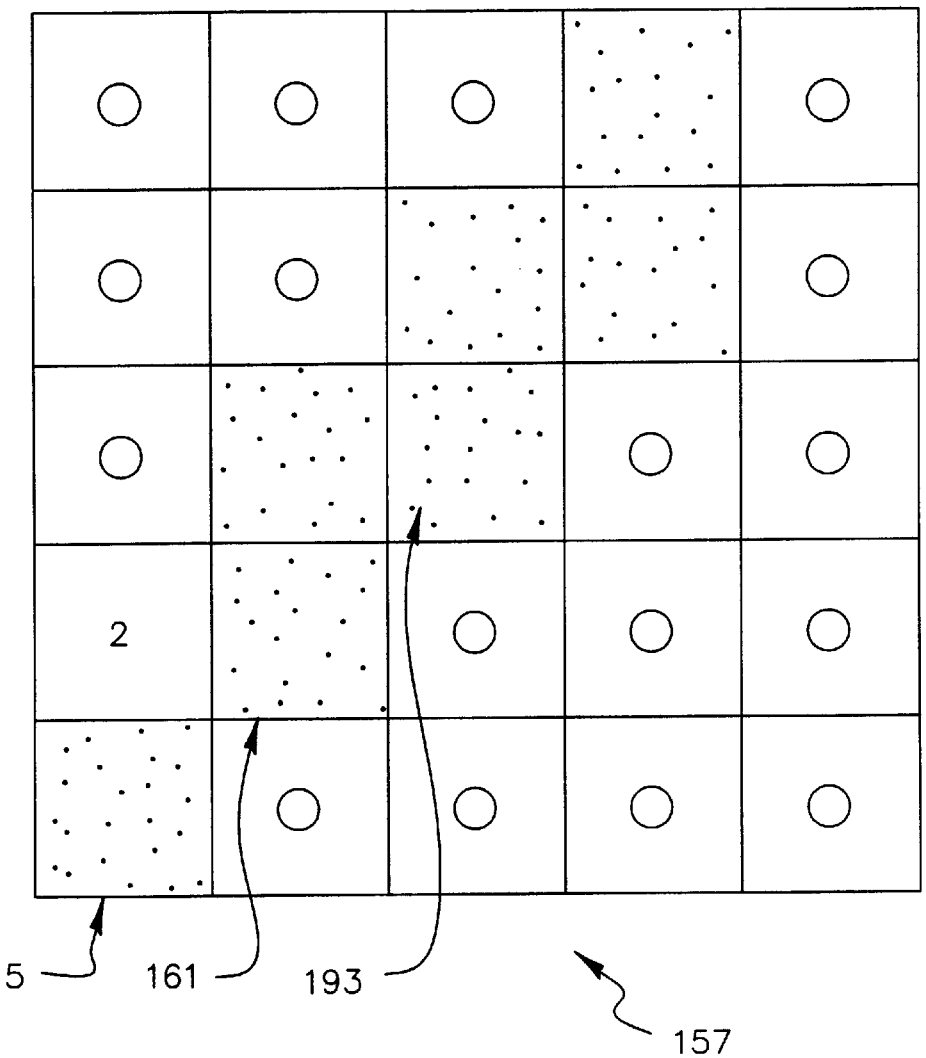
FIG. 15c is an illustration of an alternative image reduction scheme.

The multi-color image reduction scheme of the present invention employs the color lookup table and regularized mapping between color space and byte values to determine from an original multicolor image 157 the byte value and thus coloring of each stamp pixel in a stamp of the image 157 as illustrated by the following example shown in FIG. 15c. Like the previously described image reduction scheme, the original image 157 is divided into uniform blocks of 8×8 pixels which each correspond to one stamp pixel in the stamp of the original image 157. If all the original image pixels of a block have the same byte values and thus are the same color, the block is said to have a solid color, and the stamp pixel which corresponds to the block is assigned the same byte value and hence the same color. The blocks in FIG. 15c numbered with a zero, two or five illustrate such a solid colored block where each numeral designates a different color and similar numbered blocks are the same solid color.

If a block comprises pixels of different byte values and thus different colors, such as block 161 in FIG. 15c, then it must be determined whether there exists a unique identifiable background color in the adjacent blocks. If no adjacent blocks have solid colors, or two or more adjacent blocks have solid colors different from each other (e.g. the blocks with colors 0,2 and 5), then it is determined that no unique identifiable background color exists in this area of image 157. In this case, for each pixel in block 161, the byte value/color of the pixel is located in the color lookup table which in turn provides the amount of red, green and/or blue in the coloring of that pixel. From the provided amounts of red, green and blue, a sum amount of each component (r, g, b) is obtained for the block 161. The sum amounts (r, g, b), scaled or averaged as necessary, determine a position in the regularized partitioning of color space which in turn identifies the most appropriate of the 256 available colors to represent block 161 in the stamp image. That byte value/color is assigned to the stamp pixel corresponding to block 161.

If a block comprises pixels of different byte values/colors, such as block 193, and if those adjacent blocks which have solid colors (i.e. same byte values for each pixel therein) are of the same solid color as each other, namely color zero, then a unique identifiable background color exists in this neighborhood of the adjacent blocks. To preserve the foreground details provided by the pixels of block 193 in contrast to the thus detected background, the 3-D color space of orthogonal axes representing intensity of red, green and blue is used to determine the byte value/color of the stamp pixel which corresponds to block 193. The sum amounts of red, green and blue of all pixels in block 193 is obtained through the lookup table in the same manner as described for block 161 above. From the sum amounts are determined average red, green and blue amounts which define a first point in the 3-D color space. The byte value of the detected background color, color zero, is located in the lookup table which provides associated red, green, blue amounts that define a second point in the 3-D color space. A point in the 3-D color space which is even further away from the second point than is the first point, and thus exaggerates or emphasizes the difference between the detected background color and the color comprised of the average red, green and blue amounts of block 193, is selected to define the color of the stamp pixel corresponding to block 193. The selected point is mapped to a byte value according to the regularized partitioning of color space, and that byte value is assigned to the corresponding stamp pixel.

The remaining blocks are processed similarly to provide a stamp image with pixels colored to form a diagonal line among pixels colored 0, 2, and 5 corresponding to blocks of the same colors in the original image.

The foregoing image reduction schemes ensure feature retension, that is, the preservation of some degree of detail of the original image in the stamp image. It may not be possible to preserve by prior known schemes fairly fine details such as a narrow or short offset color line of the original image due to the limited number of pixels in the stamp image. However by the herein described schemes, the narrow line or subtle details of the original image produce a relative effect in the stamp image such that the stamp image as a whole is a more detailed or information preserving reduction of the original image. The above description of the stamp image resulting from the reduction of the original image shown in FIG. 15c is an example of the degree of detail maintained from the image reduction schemes of the present invention.

To accomplish the foregoing image reduction schemes for multi-colored or black and white images, the necessary original image pixel information may be obtained from a full page representation stored in memory. The determination of sum color of a block and hence adjacent blocks is thus accomplished in a line by line manner as the screen view 26 is refreshed. Stamp pixel colors are computed once the necessary block information is obtained. As the stamp pixel colors are computed, they are stored in an adequately sized RAM. Thereafter, that RAM provides the display of the stamp image 34 throughout operation of the processing system 20.

Software Details

Figure 16:
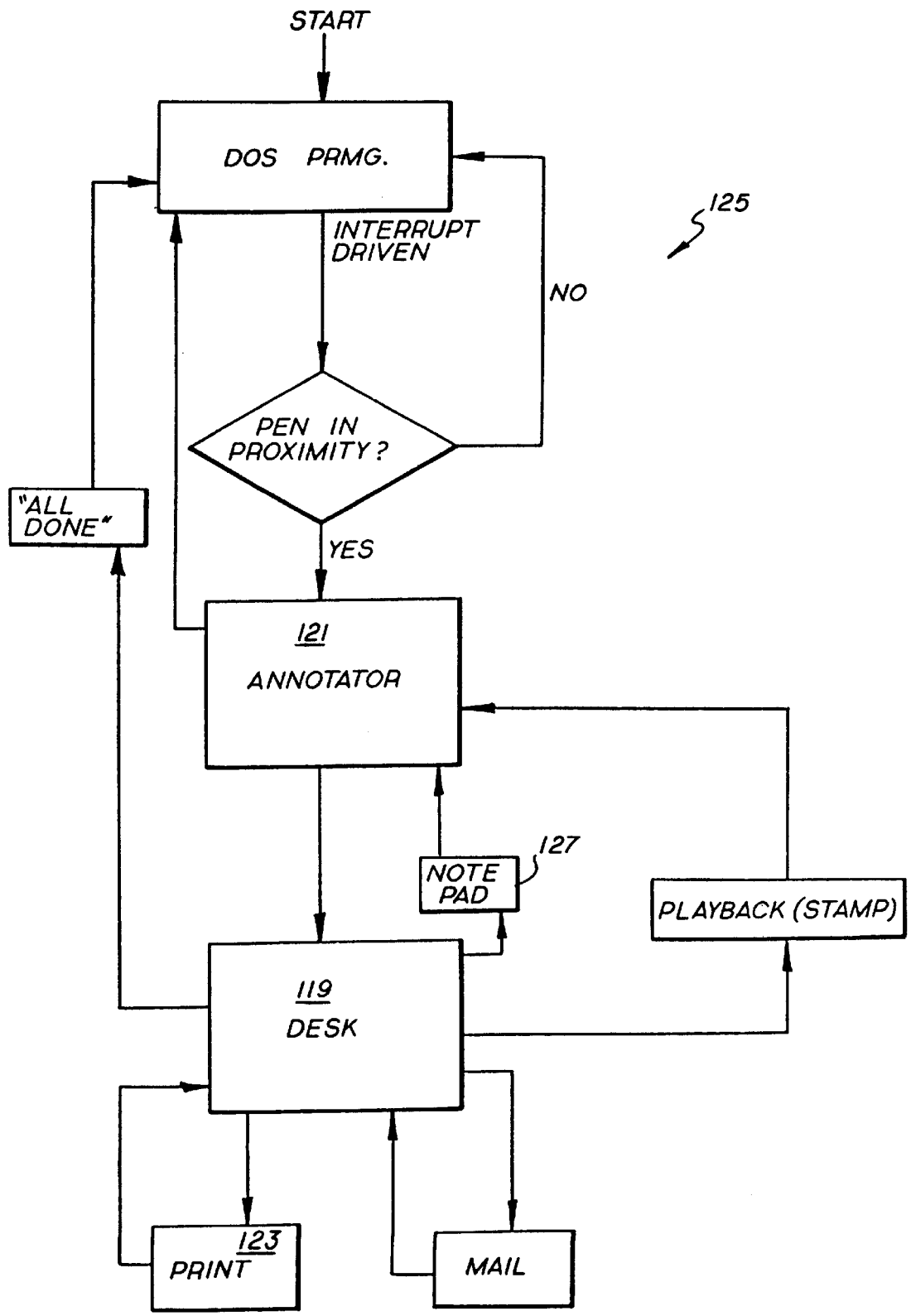

The features of system 20 (FIG. 1a) are provided by an Annotator-Desk task program 125 outlined in FIG. 16. The desk view 32 and functions corresponding therewith are driven by a desk application routine 119 which is one of several application routines in the Annotator-Desk task program 125, a program which runs in an interrupt to or suspension of a previously running program. Other application routines in the Annotator-Desk task program 125 are for driving the annotator 121, or the printer 123, etc. The relationship of the desk view 32 to the other mentioned applications (i.e. note pad, printer, mail, All Done, Annotator) is illustrated in FIG. 16.

An Applications Dispatcher (not shown) oversees all applications of the Annotator-Desk task 125. The Applications Dispatcher uses a set of codes agreed upon by all applications to determine which application routine is to be executed. The code for requesting the desk application routine 119 is preferably initiated from within the Annotator application 121. In other embodiments, the Applications Dispatcher may be initialized with the code for the desk application routine 119. Subsequent to receipt of the code for the desk application routine 119 and after execution of the last requested application routine, the Applications Dispatcher enables execution of the desk application routine 119.

Similar to the Annotator 121 and other tablet driven applications, the desk application routine 19 is formed of two subroutine tasks, the supervisor task 15 (FIG. 18) and table state diagram task 117 (FIG. 19) described later. The supervisor task 115 and tablet task 117 share and manipulate a desk database which holds the information that keeps track of the items currently on the user's system desk 36 including items in the trash barrel 174.

Figure 17A:
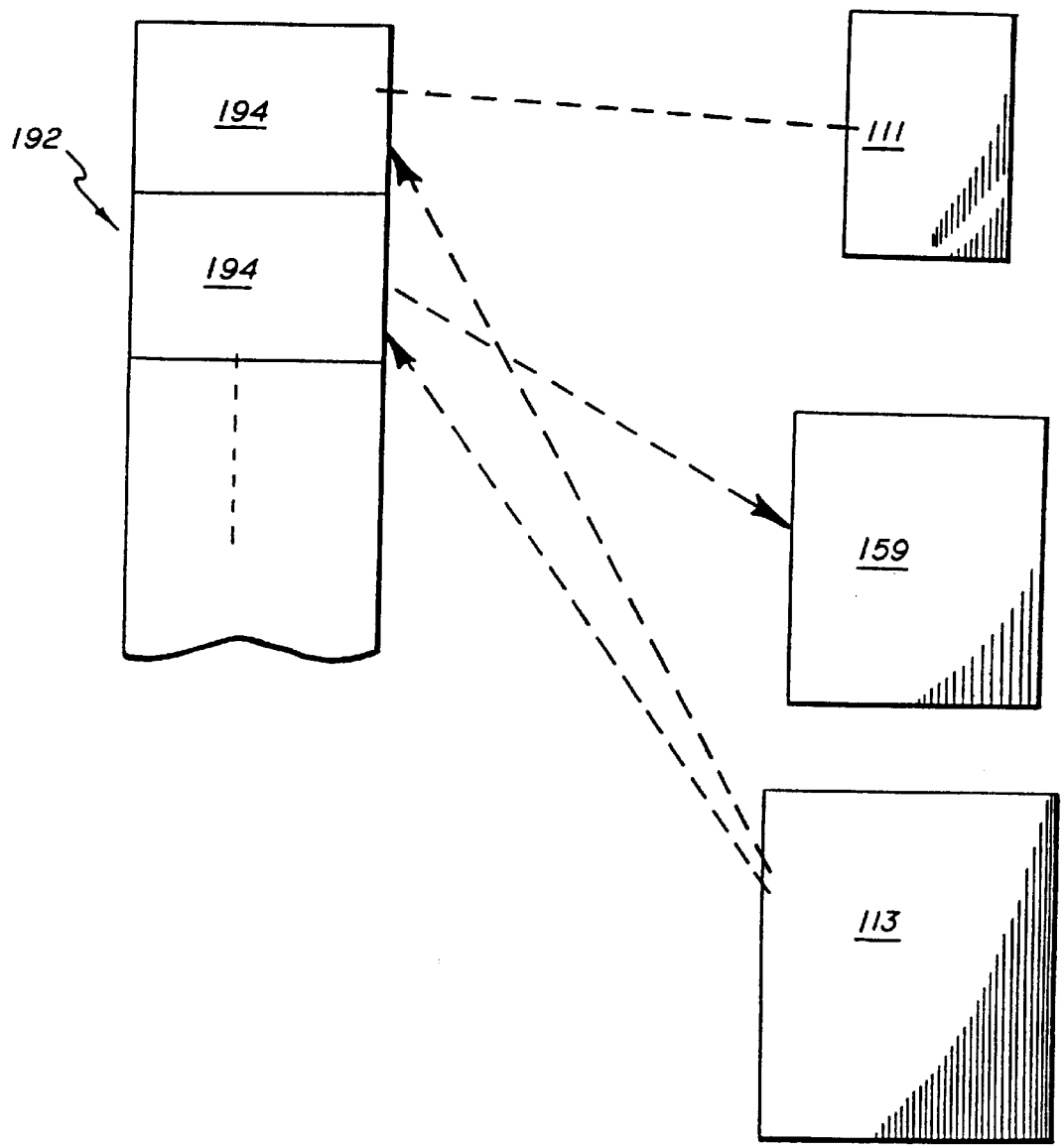
FIGS. 17a–17b are block diagrams of the data base used in the desk view of FIGS. 2f–2k.

Specifically as illustrated in FIG. 17a, the desk database comprises a doubly-linked list 92 for indicating attributes of each item in the desk view 32 a file 11 off stamp images, and icon file 59 containing the various icons used to represented the other desk items, and a file 13 in which the bitmap of the current desk view 32 is stored. Each entry 94 is doubly-linked list 92 describes an item in the desk view 32.

Figure 17B:
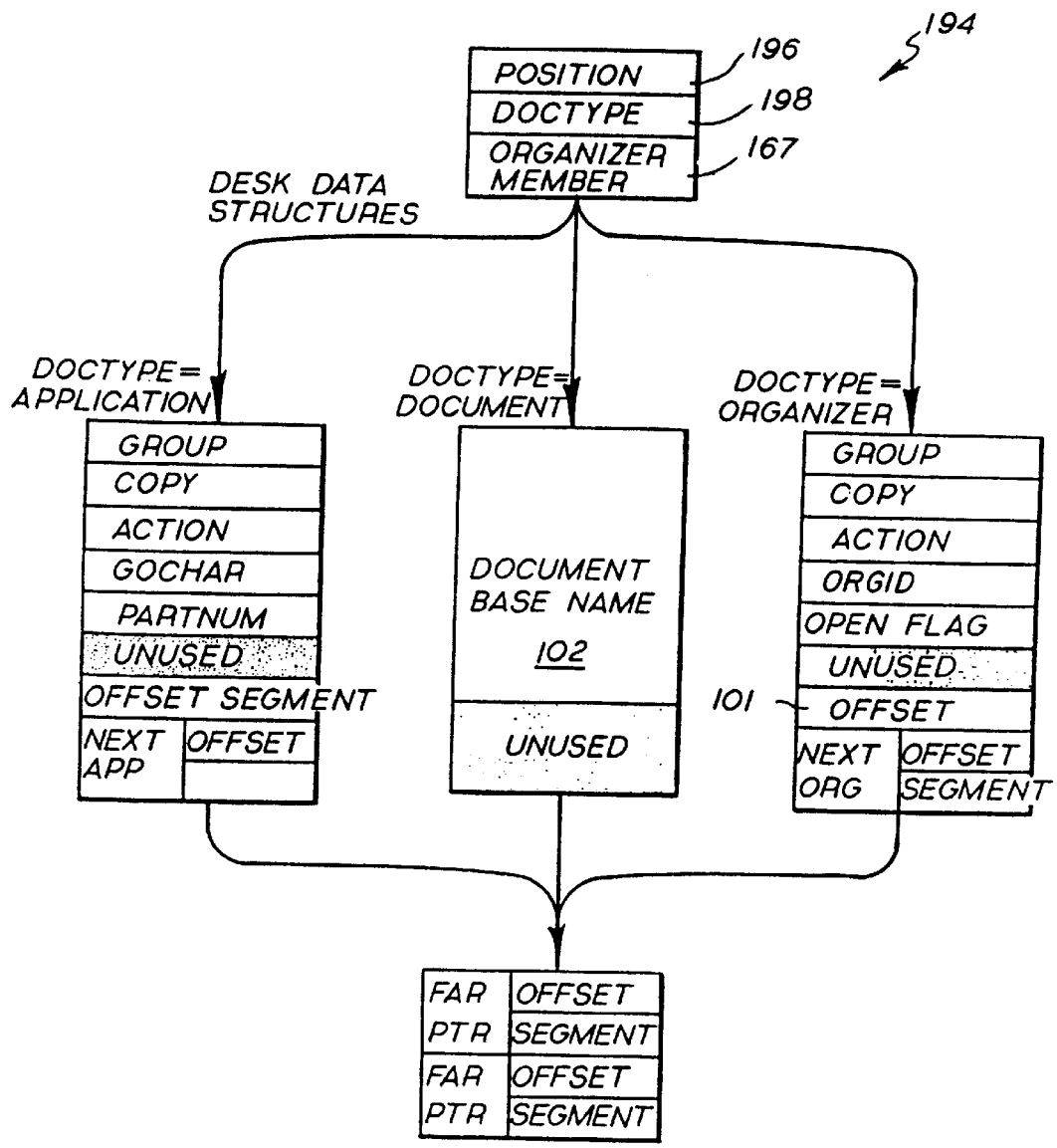

In particular as shown in FIG. 17b, each entry 194 specifies in respective fields 196, 198 the position of the item in the desk view 32, and whether the item is a document stamp, tray icon, icon for an aligned stack of stamps, icon of a depository, or an accessory icon. Also a placement field 167 specifies whether the item is currently positioned in a tray, folder or other holding device. If the item is a stamp, the placement field 167 also indicates whether the stamp is on top of or in a stack, or not included in any stack. Also depending on the type of item indicated in type field 198, the processor 22 attributes certain predefined characteristics to the item such as the class of moveable icon (desk tool, activate with stamp, activate without stamp) as designated in allocated field. To that end, if a stamp is indicated in type field 198, then the processor 22 does not allow the stamp to remain on top of icons of desk tools such as the stapler and staple remover. Preferably the processor 22 displays the desk tool icon automatically repositioned on top of the stamp after a user has placed a stamp on the desk tool icon.

The file location of the reduced image or icon of the item is specified in a respective field 101 (or is found implicitly through the physical memory address of the entry 194 in the case of a stamp) of entry 194 by an address or other indication of the associated position in the stamp file 111 or icon file 159. Further, in the case of a document stamp, a table of contents (called a superfile) listing all files, such as voice annotation files, visual annotation files and image files, of the corresponding document is locatable by the name provided in the he name field 102.

The entries 194 are changeably linked in order of most recently used item at the top of the list 192 to least recently used item at the bottom of the list 192. Each entry 194 has a first link to the preceding entry 194 and a second link to the succeeding entry 194, both links of which are used in ordering and reordering entries 194.

Figure 18:
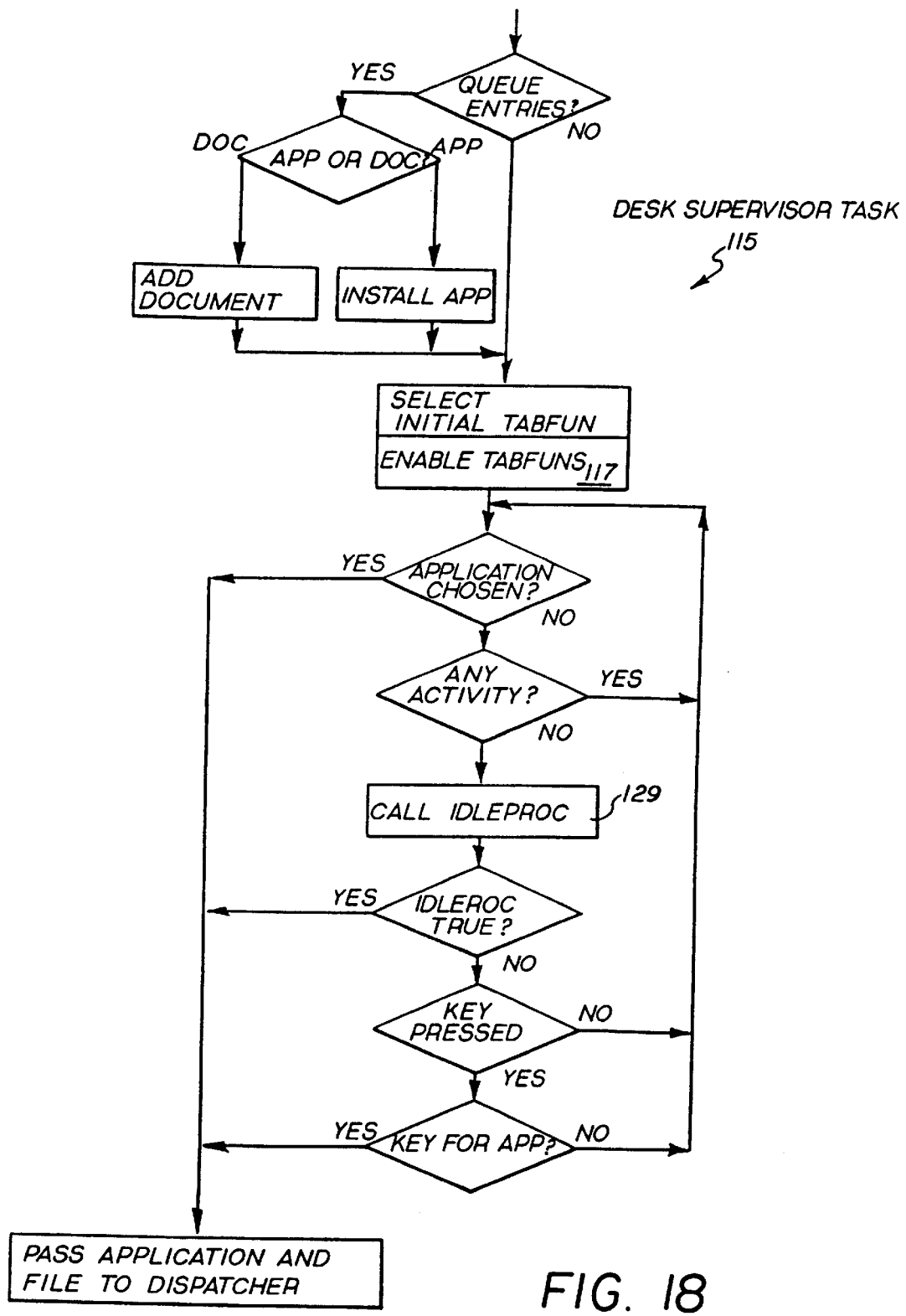
Figure 19:
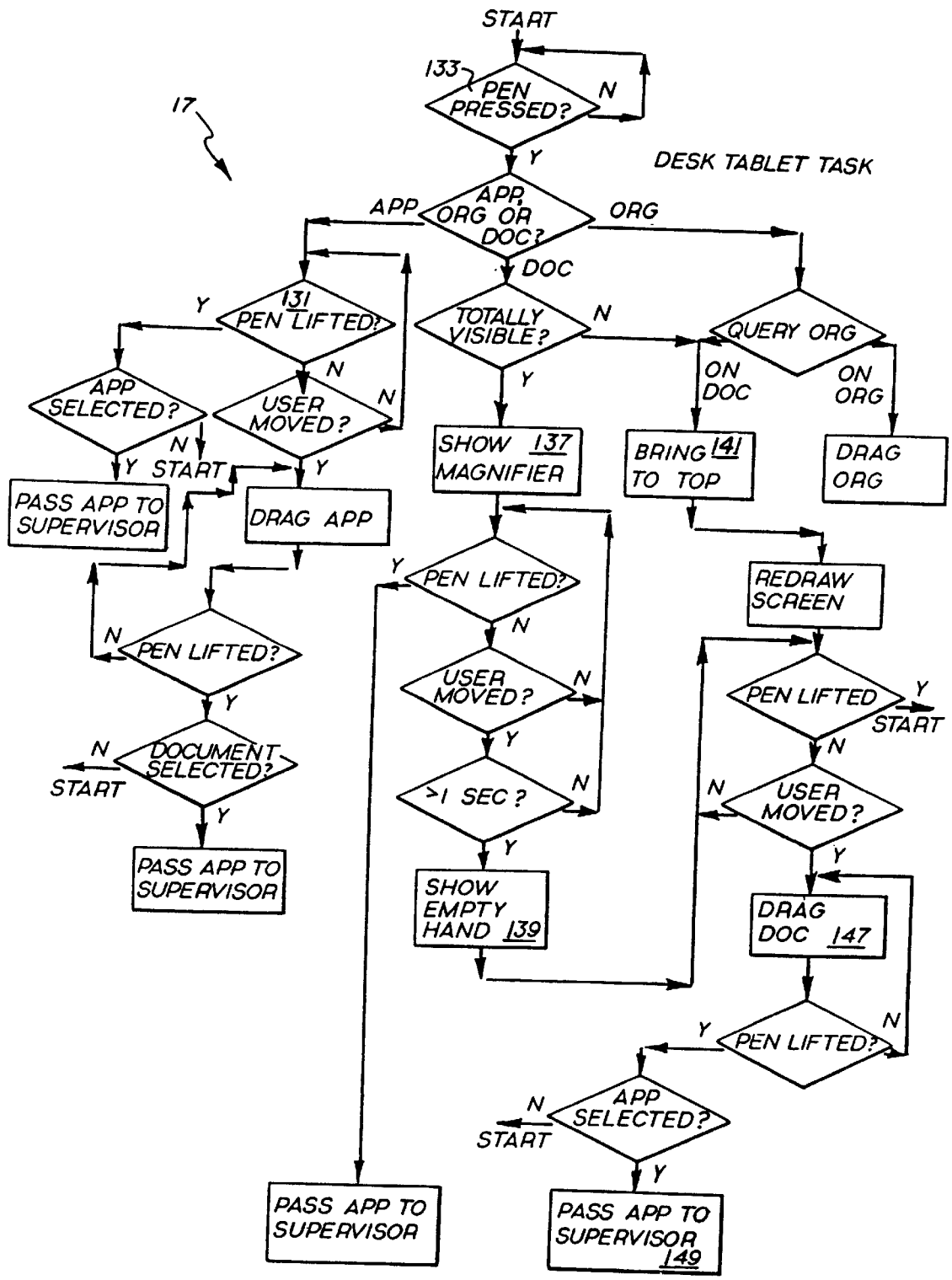
FIG. 19 is a flow chart of a tablet task for implementing the desk view of FIGS. 2f–2k.

Now making reference to FIG. 18 and the operation of the supervisor task 115 of the desk application 119 (FIG. 16), the basic purpose of the supervisor task 115 is to maintain the display of desk view 32. When the Applications Dispatcher gives control to the supervisor task 115, the supervisor task first determines if new documents and/or accessories and hence new stamps or icons need to be added to the system desk 36. If so the current bit map image 113 of the desk view 32 is updated and new entries in the desk list 192 for the new items are made accordingly. Once an updated display of the desk view 32 is provided on display unit 18, the supervisor task 115 adds to the In Box 63 of the user's system desk 36 the stamps 34 and/or icons of the newly received files from the annotator application 121 and/or note pad application 127 (FIG. 16), and enables the table task 117 (FIG. 19). Thereafter, the supervisor task 15 monitors the keyboard 12 (FIG. 1a) for entry of requests for desired applications and monitors the tablet task 117 for activity. If there is no activity from either the keyboard 12 or the tablet 16 via tablet task 117 then the supervisor 115 checks for incoming mail and performs other procedures at 129 in FIG. 18. If there is incoming mail or other user desired tasks to be performed (such as satisfying an order/request for a new item from the system catalogue of desk items), the supervisor task 115 passes the necessary files and control to the Applications Dispatcher. Upon return, the supervisor task 115 begins anew and puts the new mail and/or new items in the In Box 63 (or proper active tray 140 in the case of some mail) and continues to monitor the keyboard 12 and tablet task 117.

When the tablet task 117 or signals from keyboard 12 indicate that the user has selected an accessory or processor operation other than a desk tool, the supervisor task 115 disables the tablet task 117 and passes to the Applications Dispatcher an identifier of the selected processor operation and the file of any document on which the processor operation is to operate. Thereafter the Application dispatcher processes the requested processor operation.

The tablet task 117 (FIG. 19) follows the user's activity with the stylus 14 relative to table 16. The tablet task 117 is responsible for determining which icon or stamp was selected, redrawing the necessary parts of the desk view 32, displaying an icon or stamp being moved, relocating the icon or stamp, and passing a selected non-desk took processor operation (such as mail, printer and trash barrel applications) to the supervisor task 115. The tablet task 117 also determines which method of use of the stylus 14 the user is currently using.

The flow chart of FIG. 19 illustrates operation of tablet task 117. When a user places an end 28, 30 of the stylus 14 on table 16 within sensing range of tablet 16, the tablet task 117 displays an empty handed cursor to represent the present activity of the stylus 14. When the user positions the stylus end 28, 30 on the tablet position corresponding to a stamp 34 or icon in desk view 32, the tablet task 117 tests at 133 in FIG. 19 the pressure exerted on the active end of the stylus 14 to determine whether the user is intending to invoke a certain operation of the stylus 14 relative to the stamp 34 or icon. If the pressure exerted exceeds a predefined threshold then the tablet task 117 determines on which stamp 34 or on which type of icon (i.e. application or holding member such as tray or folder) the stylus 14 is acting. This is accomplished by the tablet task 117 starting at the beginning of the linked list 192 (FIGS. 17a–17b) and checking each entry 194 to see if the current cursor position is within the bounds stated in the position field 196 of the entry. The first entry found to have the current cursor position within the bounds of the position field 196 is selected.

In the case of a stamp 34 being detected as the subject, the tablet task 117 then determines which method of use of the stylus 14 is being used by testing for an intersection of the boundary of the entry 194 with boundaries of all prior entries. If there are no intersections, the subject stamp 34 is determined to be fully visible (i.e. not within a stack but possibly on top of a stack) and the cursor is changed to a magnifying glass 137 indicating that the associated document will be displayed if the user lifts his/her hand within the next second. Such displaying is handled by the annotation application routine which is called by the supervisor task 115 after the supervisor task 115 receives control from the tablet task 117. If the user does not lift his/her hand within that second, then the cursor is changed to an empty hand 139.

If there are any intersections between the entry's boundary with that of any previous entries 194 in list 192, then the stamp 34 is under other stamps 34 or icons and must be made visible 141 (i.e. brought to the top of the stack in which it lies). In the case of a holding member being the detected subject, if the stylus end is determined to be positioned on a stamp inside the holding member then that stamp is made totally visible (i.e. is brought to the top of the stack in the holding member), otherwise the holding member is moved in accordance with user movement of the stylus 14. A commonly known hidden surface algorithm is used to determine which parts of the stamp and/or icon are currently visible, and hence what area of the desk view 32 must be redrawn. The desk view 32 is preferably redrawn 143 by iterative clipping but other methods are suitable. The hidden surface algorithm is then used to determine which portions of the stamps/icons of the entries below the selected entry 194 must be drawn. After this determination the selected entry 194 is removed from the linked list 192.

At this point after either the redrawing 143 of desk 32 or the changing of the cursor from a magnifying glass to an open hand 139, if the user lists the stylus 14 from table 161, then the tablet task 117 is ended. In the case of having redrawn desk view 32, tablet task 117 is ended after the selected entry 194 is added to the beginning of the linked list 192. If the user, without lifting the stylus 14, moves the stylus end 28, 30 along the tablet surface, the tablet task 117 displays a grasping hand cursor and moves the image of the stamp at 147, but does not yet update the linked list 192. If the user subsequently releases the stamp on top of a processor operation icon of the activated with document type, the tablet task 117 at 149 passes to the supervisor task 115 the necessary information of the stamp and selected processor operation to have that processor operation performed. Thereafter the application routine which performs the proper operation replaces the stamp to its original location in desk view 32, but on top of any stack at that location.

If the user releases the stamp on top of other stamps or non-processor operation icons, the new location is noted in the position field 196 of the associated entry 194 for the stamp in linked list 192. If the new position of the stamp relative to the other stamps/icons is within predefined alignment limits, then a routine for snapping the stamps/icons to each other is performed. Any new aligned stack which results changes the type filed 198 of the associated entry 194. Further, the entry 194 corresponding to the newly positioned stamp/icon is made to be first in the linked list 192. It is noted that since there is no single operation to insert a stamp into a stack, the linked list 192 is not only ordered by last accessed by also by stack depth. That is, if the boundaries of the stamps/icons intersect, their order in the linked list 192 determines which is "on top of" the other.

If the detected subject is an icon of a desk accessory or processor operation then it is determined at 131 whether the user is operating the stylus in the "touch and lift" manner to select the processor operation or in the "touch and move" manner to reposition the icon of the processor operation. In the former situation, after the lifting of the stylus is detected, the tablet task 117 determines whether the subject icon represents a processor operation which is selectable without a stamp. If so, then the tablet task 117 passes the necessary information and control to the supervisor task 115. Otherwise the tablet task is ended and started anew with the detection of sufficient pressure on the stylus end.

If the stylus is being operated in the touch and move mode with respect to the subject processor operation icon, then tablet task 117 provides for the display of the icon moving in correspondence to user movement of the stylus. Thereafter if the stylus is lifted such that the subject icon is placed on a stamp then the tablet task 117 determines if the subject icon represents a processor operation which is activated with a stamp (the stamp being underneath the subject icon). If so, then the tablet task 117 passes to the supervisor task 115 control and necessary information for processing the process operation corresponding to the chosen icon and stamp. The application routine subsequently called by the supervisor task 115 replaces the icon to its original location in desk view 32.

The foregoing moving of a stamp or icon during any part of the tablet task 117 is accomplished by known methods which display the whole object in motion from an initial position through intermediate positions to a final position which are dictated by user operation of the stylus. Also such movement is exhibited in a one to one correspondence with user operation of the stylus which in turn provides a direct and natural sense of manipulation of the items on the system desk 36.

Loading Software

When the user executes the software program/file of system 20 (i.e. the Annotator-Desk task program), the operating system loads in the entire software package including the device drivers, the Listener 45 and Takeover 49 modules and the various application routines. The system program/file installs the Tablet and Timer drivers and passes control to the Listener 45. It then does a TSR (terminate and stay resident routine). This allows the system 20 software program/file to remain in local memory. Subsequent applications must run in the remaining part of local memory. Since the system program/file is large, this often prevents operation of other programs.

An alternative program/file for loading is available. It consists of a Listener 45 and a different Takeover module, the Tablet and Timer drivers and an image save/load module. When the user executes this file instead of the system program/file, the operating system loads in this small loading program/file. It installs the Tablet and Timer drivers but before giving control to the Listener 45, it loads the system program/file and determines the amount of local memory required to hold it. It then saves a copy of the local memory required to hold it. It then saves a copy of the local memory containing the system program/file to a disk file. This memory area is then declared free for future applications to use and control is given to the Listener 45. When the Takeover 49 module is activated, it saves the program stack, data area and program header as usual but before obtaining the video state, it needs to copy the disk file containing the system program/file back into local memory where it is expected to be. Before it does this, however, it must save that block of local memory to another disk file because it may contain the interrupted program and must not be damaged. The rest of the Takeover module continues as previously described.

While the invention has been particularly shown and described with reference to the illustrated embodiment thereof, it will be understood by those skilled in the art that various changes in form and details may be made therein without departing from the spirit and scope of the invention as defined by the appended claims. For example, although presently implemented in software, many of the details of the system may be implemented in hardware for faster operation. And many features of the system may be advantageously used without use of all features. For example, though the two-ended stylus is the illustrated annotation tool, an electronic mouse would also have some annotation utility, or a single ended stylus could operate in two different modes—writing and erasing, or erasure of penned annotations could be accomplished through the keyboard. In addition, though the illustrated implementation utilizes a stylus for input and control, the system desk has application to systems which are solely keyboard controlled and to systems which utilize a mouse for input. Also, the system desk may cooperate with application software other than the annotator. For example, the desk may serve as a filing system for conventional word processing and spreadsheet software.

What is claimed is:

1. A method of remotely controlling a local data processor, which is coupled through a local facsimile device to a telephone communication line, comprising the steps of:

transmitting, from a remote facsimile device to the local data processor via the local facsimile device, a facsimile image which specifies data processor commands to be executed by the local data processor, said local data processor receiving said facsimile image and responding to the receipt of the image by recognizing specified data processor commands contained within the received image, and executing the recognized specified data processor commands.

2. A method as set forth in claim 1 wherein the step of executing the recognized specified data processor commands further includes the step of executing a data processor command to retrieve specific data.

3. A method as set forth in claim 2 wherein the step of executing the recognized specified data processor commands further includes the step of executing a data processor command to manipulate the retrieved specific data.

4. A method as set forth in claim 3 wherein the step of executing the recognized specified data processor commands further includes the step of causing the data processor to transmit through a communication line the retrieved specific data to a remote location.

5. A method as set forth in claim 4 further including the step of receiving the retrieved specific data by a facsimile device coupled to the communication line.

6. A method as set forth in claim 5 wherein the facsimile device coupled to the communication line is the remote facsimile device from which the instructions for controlling the operation of the data processor originated.

7. A method as set forth in claim 4 further including the step of receiving the retrieved specific data by a data processing system.

8. A method as set forth in claim 4 wherein the retrieved specific data represents an image of a current view of a desk screen held in memory by the local data processor which is unique to a user of the local data processor.

9. A method of processing data comprising the steps of:

providing a data processor coupled through a local facsimile device to a telephone communications line;

at a location remote from said data processor, transmitting a facsimile image containing graphical or textual images to said data processor through a remote facsimile device;

said data processor recognizing certain of said graphical or textual images and retrieving and manipulating specific data in response to said graphical or textual images; and said data processor transmitting data, responsive to said recognized graphical or textual images, to a remote location.

10. A method as set forth in claim 9 wherein said remote location comprises a facsimile device.

11. A method as set forth in claim 9 wherein said remote location comprises a data processor.

12. A method as set forth in claim 9 wherein said data comprises an image of a current view of a desk screen held in memory by the data processor and unique to a user.

13. A method as set forth in claim 12 comprising the further step of receving the data from the data processor in the form of a facsimile image and transmitting a second facsimile image containing graphical or textual images to direct said data processor to transmit to a remote location, selected data.

14. A method as set forth in claim 13 wherein the remote location corresponds to said remote facsimile device.

15. A method of retrieving information stored in a data processing system, comprising the steps of:

receiving, at the data processing system, image data transmitted from a remote facsimile device in a facsimile data format;

the data processor recognizing information contained within the received image data as commands and in response thereto, retrieving stored information specified by the commands, and transmitting said retrieved information to said remote facsimile device.

16. The method as set forth in claim 15 wherein the image data transmitted from the remote facsimile device takes the form of a predefined instruction page.

* * * * *